United States Patent
Le Henaff et al.

(10) Patent No.: US 12,528,725 B2
(45) Date of Patent: Jan. 20, 2026

(54) TIME-VARIANT, MULTI-STAGE CONTROL SYSTEM

(71) Applicant: Massachusetts Institute of Technology, Cambridge, MA (US)

(72) Inventors: Anne-Claire Elisabeth Marie Le Henaff, Cambridge, MA (US); Wei He, Cambridge, MA (US); Grace Connors, Cambridge, MA (US); Simone Gelmini, Cambridge, MA (US); Amos G. Winter, Cambridge, MA (US); Jeffrey Dennis Costello, Cambridge, MA (US); Ian Marius Peters, Cambridge, MA (US); Kameron Conforti, Cambridge, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 896 days.

(21) Appl. No.: 17/770,450

(22) PCT Filed: Oct. 21, 2020

(86) PCT No.: PCT/US2020/056721
§ 371 (c)(1),
(2) Date: Apr. 20, 2022

(87) PCT Pub. No.: WO2021/081132
PCT Pub. Date: Apr. 29, 2021

(65) Prior Publication Data
US 2022/0401883 A1    Dec. 22, 2022

Related U.S. Application Data

(63) Continuation-in-part of application No. 16/999,974, filed on Aug. 21, 2020, now abandoned.
(Continued)

(51) Int. Cl.
B01D 61/54    (2006.01)
C02F 1/00    (2023.01)
(Continued)

(52) U.S. Cl.
CPC ............ C02F 1/4695 (2013.01); B01D 61/54 (2013.01); C02F 1/008 (2013.01); C02F 1/4693 (2013.01);
(Continued)

(58) Field of Classification Search
CPC ...... C02F 1/4695; C02F 1/008; C02F 1/4693; C02F 2103/06; C02F 2201/009;
(Continued)

(56) References Cited

U.S. PATENT DOCUMENTS 10,931,220 B2   2/2021   Gurkaynak et al.
2010/0314238 A1* 12/2010  Frolov ...................... C02F 1/14
                                                        203/10

(Continued)

FOREIGN PATENT DOCUMENTS

WO    2013167921 A1   11/2013
WO    2016181003 A1   11/2016
(Continued)

OTHER PUBLICATIONS

He, Wei, Natasha C. Wright, Susan Amrose, Tonio Buonassisi, Ian Marius Peters, and Amos G. Winter. "Preliminary field test results from a photovoltaic electrodialysis brackish water desalination system in rural India." In International Design Engineering Technical Conferences and Computers and Information in Engineering Conference, vol. 51760, p. V02BT03A020. American Society of Mechanical Engineers, 2018.
(Continued)

*Primary Examiner* — Charles R Kasenge
(74) *Attorney, Agent, or Firm* — Young Basile Hanlon & MacFarlane, P.C.

(57) ABSTRACT

A control system includes one or more levels of control of power and energy. At one level, a first controller optimally divides power between two or more processes, to maximize instantaneous production, for a given amount of currently available power. In the case of EDR desalination, electric power is optimally divided between ion exchange mem-
(Continued)

branes and pumps to maximize instantaneous production of desalinated water for a given amount of available electric power. Optionally, at another level, a second controller divides time-varying power between the processes fed by the first level controller and an energy storage unit, based on a prediction of future power availability and a function. In the EDR case, power generated by a photovoltaic array is divided between the EDR desalination process and a battery, based on a prediction of future PV power availability and a function, to ensure reliable water production in the future.

38 Claims, 31 Drawing Sheets

Related U.S. Application Data

(60) Provisional application No. 62/923,714, filed on Oct. 21, 2019.

(51) Int. Cl.
  *C02F 1/469* (2023.01)
  *G05B 13/04* (2006.01)
  *C02F 103/06* (2006.01)

(52) U.S. Cl.
  CPC ...... *G05B 13/048* (2013.01); *B01D 2313/367* (2022.08); *C02F 2103/06* (2013.01); *C02F 2201/009* (2013.01); *C02F 2201/46135* (2013.01); *C02F 2201/4614* (2013.01); *C02F 2201/46145* (2013.01); *C02F 2201/46165* (2013.01); *C02F 2209/008* (2013.01); *C02F 2209/40* (2013.01); *C02F 2209/44* (2013.01)

(58) Field of Classification Search
  CPC .... C02F 2201/46135; C02F 2201/4614; C02F 2201/46145; C02F 2201/46165; C02F 2209/008; C02F 2209/40; C02F 2209/44; C02F 2209/001; B01D 61/54; B01D 2313/367; B01D 2313/70; B01D 2313/701; B01D 2313/702; G05B 13/048
  See application file for complete search history.

(56) References Cited

U.S. PATENT DOCUMENTS

| | | |
|---|---|---|
| 2017/0050868 A1 | 2/2017 | Sharbatmaleki et al. |
| 2017/0315523 A1 | 11/2017 | Cross et al. |
| 2019/0225506 A1 | 7/2019 | Peng et al. |

FOREIGN PATENT DOCUMENTS

| | | | | |
|---|---|---|---|---|
| WO | WO-2018069810 A1 * | 4/2018 | ........... | B01D 61/025 |
| WO | 2021081132 A1 | 4/2021 | | |

OTHER PUBLICATIONS

He, Wei, Anne-Claire Le Henaff, Susan Amrose, Tonio Buonassisi, and Ian Marius Peters. "Voltage-and flow-controlled electrodialysis batch operation: Flexible and optimized brackish water desalination." Desalination 500 (2021): 114837.

Le Henaff, Anne-Claire, Wei He, Tonio Buonassisi, Amos G. Winter, and Ian Marius Peters. "Flexible operation of photovoltaic electrodialysis (PV-ED) low-cost community-scale desalination systems." In 2019 IEEE 46th Photovoltaic Specialists Conference (PVSC), vol. 2, pp. 1-5. IEEE, 2019.

Ramalingam, Karthick, Qiang Wei, Fuming Chen, Kaixiang Shen, Mengjun Liang, Jinhong Dai, Xianhua Hou et al. "Achieving High-Quality Freshwater from a Self-Sustainable Integrated Solar Redox-Flow Desalination Device." Small 17, No. 30 (2021): 2100490.

Flexible operation of photovoltaic electrodialysis (PV-ED) low-cost community-scale desalination systems Authors: Le Henaff Anne-Claire, He Wei, Buonassisi Tonio, Winter Amos G, Peters Ian Marius Publication data: 2019 IEEE 46th Photovoltaic Specialists Conference (PVSC),,Jun. 16, 2019, IEEE Source info: pp. 1-5.

Using feed forward voltage-control to increase the ion removal rate during batch electrodialysis desalination of brackish water Authors: Shah Sahil R, Walter Sandra L, Winter Amos G Publication data: Desalination,,May 1, 2019, Elsevier, Amsterdam, NL Source info: vol. 457, pp. 62-74.

International Search Report for PCT Application No. PCT/US2020/056721, mailed Jul. 4, 2021 (6 pages).

"A Robust Model of Brackish Water Electrodialysis Desalination with Experimental Comparison at Different Size Scales", Desalination, (May 2018), vol. 443, pp. 27-43.

W. He et al., "Field Demonstration of a Cost-Optimized Solar Powered Electrodialysis Reversal Desalination System in Rural India", Desalination, (Feb. 15, 2020), vol. 476, p. 114217.

"Technology review and data analysis for cost assessment of water treatment systems Authors: Bhojwani Sumay, Topolski Kevin, Mukherjee Rajib, Sengupta Debalina, El-Halwagi Mahmoud M Publication data: Science of The Total Environment,, Oct. 10, 2018, Elsevier, Amsterdam, NL Source info: vol. 651, pp. 2749-2761".

D. Bian et al., "Optimization and design of a low-cost, village-scale, photovoltaic-powered, electrodialysis reversal desalination system for rural India", Desalination, (2019), vol. 452, pp. 265-278.

K. James et al., "Particle swarm optimization", Proceedings of the IEEE International Conference on Neural Networks, (1995), pp. 97-102.

Muthamizhan T. and R. Ramesh, "PV Powered Direct Torque Controlled Induction Motor Without AC Phase Current Sensors", International Journal of Advanced Research in Electrical, Electronics and Instrumentation Engineering, vol. 3, pp. 255-262 (2014).

Gnana Jegha et al., "A High Gain DC-DC Converter with Grey Wold Optimizer Based MPPT Algorithm for PV Fed BLDC Motor Drive," Appl. Sci., 10, 2797 (2020).

Ouada et al., "Optimization photovoltaic pumping systems based BLDC using Fuzzy Logic MPPT Control," IEEE, 978-1-4673-6734-7/13 (2013).

* cited by examiner

TIME-VARIANT, MULTI-STAGE CONTROL SYSTEM

CROSS-REFERENCE TO RELATED APPLICATIONS

This application is a U.S. National Phase of PCT/US2020/056721, filed on 21 Oct. 2020 titled "TIME-VARIANT, MULTI-STAGE CONTROL SYSTEM," which claims the benefit of U.S. Provisional Patent Application No. 62/923,714, filed 21 Oct. 2019, titled "TIME-VARIANT OPERATION OF SOLAR-POWERED ELECTRODIALYSIS SYSTEMS". International Application No. PCT/US2020/056721 is also a continuation-in-part of U.S. patent application Ser. No. 16/999,974, filed 21 Aug. 2020, titled "Time-Variant Operation of Electrochemical Desalination System". U.S. application Ser. No. 16/999,974 also claims the benefit of U.S. Provisional Patent Application No. 62/923,714, filed 21 Oct. 2019, titled "TIME-VARIANT OPERATION OF SOLAR-POWERED ELECTRODIALYSIS SYSTEMS]". The entire contents of each of these applications are hereby incorporated by reference herein, for all purposes.

STATEMENT REGARDING FEDERALLY SPONSORED RESEARCH OR DEVELOPMENT

This invention was made with U.S. Government support under Grant No. 6938981 awarded by the U.S. Bureau of Reclamation. The U.S. Government has certain rights in the invention.

BACKGROUND

Technical Field

The invention relates to control systems, such as industrial control systems, and more particularly to a control system that, at a first level, allocates a time-varying currently available resource, such as photovoltaic electric power, between a plurality of processes to maximize instantaneous aggregate output of the processes, and optionally at a higher level allocates the time-varying currently available resource between the plurality of processes and storage for future use, based on predicted future availability of the resource and a function.

Related Art

In many parts of the world, potable water is scarce. To meet a growing water demand for drinking and irrigation, ever more ground water is extracted, leading to increased salinity of remaining ground water. Although desalination technologies are available, many desalination systems produce large quantities of brine, which is difficult to mitigate, particularly inland. Therefore, higher desalination recovery rates are desirable, to reduce brine production.

Current desalination technologies include electrodialysis reversal (EDR) and reverse osmosis (RO). EDR is an electrically driven desalination process, in which ions move across ion exchange membranes. When these ion exchange membranes are arranged in an alternating manner, channels of diluate and concentrate are formed therebetween. A production rate of desalinated water depends on the voltage applied to the membranes and a rate at which water flows through the channels.

In general, EDR provides a higher recovery rate than RO, especially at small scales, such as in small village and individual dwelling settings. In addition, EDR is more energetically efficient at low salinity ranges, which are typical for groundwater. Thus, EDR is well suited for reducing the salinity of groundwater with less energy consumption and less brine production than RO.

Solar-powered photovoltaic panels and wind mill electric generators provide logical power sources for EDR systems, particularly in resource-constrained regions, such as parts of India and Africa. However, wind varies, sometimes erratically. Similarly, solar irradiance at low latitudes on earth varies over the course of a day, generally following a bell curve, peaking around mid-day, and subject to irregular cloud cover. Thus, oversized photovoltaic panels are required to produce sufficient electric power during morning and evening time periods, when solar irradiance is low, or large batteries are required to store electric energy produced during mid-day for use during periods of low or no solar irradiance. Either strategy, i.e., oversizing generating equipment or oversizing energy storage equipment, makes for an expensive installation, often too expensive for a resource-constrained region.

A low cost, energy efficient desalination system would be highly desirable.

SUMMARY OF EMBODIMENTS

An embodiment of the present invention provides a control system. The control system includes an input port 3510, a plurality of output ports 3512-3516 and, a first controller 3500. The input port 3510 is configured to receive time-varying electric power 3502. Each output port of the plurality of output ports 3512-3516 is configured to supply electric power to a respective associated process 3504-3508 of a plurality of processes. The first controller 3500 is configured to automatically allocate, in real time, at least a portion of the time-varying electric power 3502 received at the input port 3510 between respective output ports 3512-3516 of the plurality of output ports, based on respective characteristics of the plurality of processes 3504-3508, so as to maximize instantaneous aggregate production by the plurality of processes 3505-3508.

Optionally in any embodiment, a first process 3504 of the plurality of processes 3504-3508 includes an electrochemical desalination process 4202, and a second process 3506 of the plurality of processes 3504-3508 includes a pumping process 4204 configured to pump a fluid within the first process 3504.

Optionally in any embodiment that includes an electrochemical desalination process 4202 and a pumping process 4204, the first controller includes a feedforward controller configured to solve a system of equations at an interval. The system of equations includes:

$$\begin{cases} i(V) = r_i i_{lim}(Q), \\ P_{el}(V) + P_{pump}(Q) = P_{sol}(t) \end{cases}$$

where:
V(t) is a voltage applied to a stack in the electrochemical desalination process (4202);
Q(t) is a flow rate of water through the stack in the pumping process 4204;
i is local current density in the stack;
i_lim is limiting current density of the stack;

r_i is a predetermined fraction less than 1;
P_pump is pumping power of the pumping process 4204;
P_el is electric power utilized by the stack; and
P_sol (t) is instant available power available from the time-varying electric power 3502.

Optionally in any embodiment that is configured to solve the system of equations, the first controller is configured to calculate $P_{el}$ according to $P_{el}=V$, using a previous resistance of the stack, where l is total current drawn by the stack.

Optionally in any embodiment, production by at least one process of the plurality 3504-3508 of processes is non-linear, with respect to power input into the process.

Optionally any embodiment also includes a predictor 3614, an electric energy storage unit 3604; and a second controller 3600. The predictor 3614 is configured to automatically predict future availability 3608 of the time-varying electric power 3502. The second controller 3600 is configured to automatically allocate, in real time:

(a) a first portion 3618 of the time-varying electric power 3502 received at the input port 3510 to the electric energy storage unit, (b) a second portion 3620 of the time-varying electric power received at the input port to the first controller 3500 for allocation to the plurality of processes 3504-3508 and (c) a third portion 3622 of power from the electric energy storage unit 3604 to the first controller 3500 for allocation to the plurality of processes 3504-3508.

The second controller 3600 is configured to allocate the first 3618, second 3620 and third 3622 portions based on the predicted future availability 3608 of the time-varying electric power 3502 and a function 3610.

Optionally in any embodiment that includes a second controller 3600, the second controller 3600 includes a model predictive controller.

Optionally in any embodiment that includes a second controller 3600, the second 3600 controller includes an optimal controller.

Optionally in any embodiment that includes a second controller 3600, the second controller 3600 is configured to allocate the first, second and third portions 3618-3622 so as to minimize the function 3610.

Optionally in any embodiment that includes a second controller 3600, the function 3610 is a cost function.

Optionally in any embodiment that includes a second controller 3600, the function 3610 is an objective function.

Optionally in any embodiment in which the second controller 3600 is configured to allocate the first, second and third portions 3618-3622 so as to minimize the function 3610, the function 3610 is configured to represent a cost of failing to meet a predetermined aggregate production goal by the plurality of processes 3504-3508.

Optionally in any embodiment that includes a second controller 3600, the second controller 3600 is configured to allocate the first, second and third portions 3618-3622 so as to meet a predetermined aggregate production goal by the plurality of processes 3504-3508.

Optionally in any embodiment that includes a second controller 3600, the second controller 3600 is configured to allocate the first, second and third portions 3618-3622 so as to meet a predetermined aggregate production goal by the plurality of processes 3504-3508 currently and in the future.

Optionally in any embodiment that includes a second controller 3600, the function 3610 is configured to represent a likelihood of meeting a predetermined aggregate production goal by the plurality of processes 3504-3508.

Optionally in any embodiment in which the function 3610 is configured to represent a likelihood of meeting a predetermined aggregate production goal by the plurality of processes 3504-3508, the second controller 3600 is configured to allocate the first, second and third portions 3618-3622 so as to maximize the likelihood of meeting the predetermined aggregate production goal.

Optionally in any embodiment in which the function 3610 is configured to represent a likelihood of meeting a predetermined aggregate production goal by the plurality of processes 3504-3508, the second controller is configured to allocate the first, second and third portions 3618-3622 so as to maximize the likelihood of meeting the predetermined aggregate production goal currently and in the future.

Optionally in any embodiment that includes a second controller 3600, the second controller 3600 is configured to allocate the first, second and third portions 3618-3622 so as to maximize the function 3610.

Optionally in any embodiment in which the second controller 3600 is configured to allocate the first, second and third portions 3618-3622 so as to maximize the function 3610, the function 3610 is configured to represent reliability of at least one process of the plurality of processes 3504-3508.

Optionally in any embodiment that includes a second controller 3600, the predictor 3614 includes a data-driven algorithm.

Optionally in any embodiment that includes a second controller 3600, the predictor 3614 includes a model of solar irradiance variance over a day.

Optionally in any embodiment that includes a second controller 3600, the predictor 3614 includes a model of solar irradiance variance over a year.

Optionally in any embodiment that includes a second controller 3600, the predictor 3614 includes a weather forecast that includes predicted cloud cover information.

Optionally in any embodiment that includes a second controller 3600, the predictor 3614 is configured to receive weather forecasts via a radio link.

Optionally in any embodiment that includes a second controller 3600, the predictor 3614 is configured to receive weather forecasts via a computer network link.

Optionally in any embodiment that includes a second controller 3600, the predictor 3614 is configured to automatically predict the future availability of the time-varying electric power 3502 at least in part based on current weather.

Optionally in any embodiment that includes a second controller 3600, the electric energy storage unit 3604 includes a battery.

Optionally in any embodiment that includes a second controller 3600, the electric energy storage unit 3604 includes a capacitor.

Optionally in any embodiment that includes a second controller 3600, the electric energy storage unit 3604 includes a mechanical energy storage unit configured to convert between electrical and mechanical energy.

Optionally in any embodiment that includes a second controller 3600, a first process 3504 of the plurality of processes 3504-3508 includes an electrochemical desalination process 4202, and a second process 3506 of the plurality of processes 3504-3508 includes a pumping process 4204 configured to pump a fluid within the first process 3504.

Optionally in any embodiment in which the first process 3504 includes an electrochemical desalination process 4202 and the second process 3506 includes a pumping process 4204, a third process 3508 of the plurality of processes 3504-3508 is configured to fill a tank with irrigation water.

Optionally in any embodiment that includes a second controller 3600, production by at least one process of the plurality of processes 3504-3508 is non-linear, with respect to power input into the process.

Optionally any embodiment that includes a second controller 3600 also includes a product storage unit 3624 coupled to at least one process of the plurality of processes 3504-3508 and configured to store, for future use, a product produced by the process. In this case, the second controller 3600 is configured to allocate the first, second and third portions 3512-3516 based at least in part on capacity of the product storage unit 3624.

Optionally any embodiment that includes a second controller 3600 also includes a product storage unit 3624 coupled to at least one process of the plurality of processes 3504-3508 and configured to store, for future use, a product produced by the process. In this case, the second controller 3600 is configured to allocate the first, second and third portions 3512-3516 based at least in part on an amount of product currently stored in the product storage unit 3624.

Optionally any embodiment that includes a second controller 3600 also includes a data-driven control algorithm 3616 configured to automatically adjust parameters, according to which the second controller 3600 allocates the first, second and third portions 3512-3516.

Optionally any embodiment that includes a second controller 3600 also includes a data-driven control algorithm 3616 configured to automatically adjust parameters, according to which the first controller 3500 allocates the second and third portions 3620-3622 between the respective output ports.

Another embodiment of the present invention provides a non-transitory computer-readable medium. The medium is encoded with instructions. When executed by a processor, the instructions establish processes for performing a computer-implemented method. The processes include a process configured to receive time-varying electric power 3502 at an input port 3510. A process is configured to output power at a plurality of output ports 3512-3516. Each output port is configured to supply electric power to a respective associated process 3504-3508 of a plurality of processes. A process is configured to automatically allocate, in real time, at least a portion of the time-varying electric power 3502 received at the input port 3510 between respective output ports 3512-3516 of the plurality of output ports, based on respective characteristics of the plurality of processes 3504-3508, so as to maximize instantaneous aggregate production by the plurality of processes 3505-3508.

Optionally, the processes also include a process configured to automatically predict future availability 3608 of the time-varying electric power 3502, a process configured to send and receive electric power to and from an electric energy storage unit 3604 and a process configured to automatically allocate, in real time:

(a) a first portion 3618 of the time-varying electric power 3502 received at the input port 3510 to the electric energy storage unit, (b) a second portion 3620 of the time-varying electric power received at the input port to the first controller 3500 for allocation to the plurality of processes 3504-3508 and (c) a third portion 3622 of power from the electric energy storage unit 3604 to the first controller 3500 for allocation to the plurality of processes 3504-3508, wherein the second controller 3600 is configured to allocate the first 3618, second 3620 and third 3622 portions based on the predicted future availability 3608 of the time-varying electric power 3502 and a function 3610.

Yet another embodiment of the present invention provides a control system. The control system includes an input port 3510, a predictor 3614, a plurality of output ports 3512-3516, an electric energy storage unit 3604, a first controller 3500 and a second controller 3600. The input port 3510 is configured to receive time-varying electric power 3502. The predictor 3614 is configured to automatically predict future availability 3608 of the time-varying electric power 3502. Each output port 3512-3516 is configured to supply electric power to a respective associated process of a plurality of processes 3504-3508. The second controller 3600 is configured to automatically allocate, in real time:

(a) a first portion 3618 of the time-varying electric power 3502 received at the input port 3510 to the electric energy storage unit 3604, (b) a second portion 3620 of the time-varying electric power 3502 received at the input port 3510 to the plurality of processes 3504-3508 and (c) a third portion 3622 of power from the electric energy storage unit 3604 to the plurality of processes 3504-3508.

The second controller 3600 is configured to allocate the first, second and third portions 3618-3622 based on the predicted future availability 3608 of the time-varying electric power 3502 and a function 3610.

The first controller 3500 is configured to automatically allocate, in real time, the second and third portions 3620-3622 between respective output ports of the plurality of output ports 3512-3516, based on respective characteristics of the plurality of processes 3504-3508, so as to maximize instantaneous aggregate production by the plurality of processes 3504-3508.

An embodiment of the present invention provides a method for sizing components of a system. The system includes a plurality components that perform a plurality of processes. The system is controlled by a controller according to a plurality of operational parameters. Various sized components have respective associated costs. The method includes automatically modeling 4504 operation of the system over a time period, for each combination 4502 of component sizes and operational parameters, of a plurality of combinations of component sizes and operational parameters. The modeling includes modeling 4508 an input port configured to receive time-varying electric power. The modeling also includes modeling 4510 a predictor. The predictor is configured to automatically predict future availability of the time-varying electric power. A plurality of output ports is modeled 4512. Each output port is configured to supply electric power to a respective associated process of a plurality of processes. An electric energy storage unit is modeled 4514. A second controller is modeled 4516. The second controller is configured to automatically allocate, in real time:

(a) a first portion of the time-varying electric power received at the input port to the electric energy storage unit, (b) a second portion of the time-varying electric power received at the input port to the plurality of processes and (c) a third portion of power from the electric energy storage unit to the plurality of processes.

The second controller is configured to allocate the first, second and third portions based on the predicted future availability of the time-varying electric power and a function.

A first controller is modeled 4518. The first controller is configured to automatically allocate, in real time, the second and third portions between respective output ports of the plurality of output ports, based on respective characteristics of the plurality of processes, so as to maximize instantaneous aggregate production by the plurality of processes.

Production by the plurality of processes is modeled 4520.

A combination of component sizes and operational parameters, of the plurality of combinations of component sizes and operational parameters, is selected 4524. The modeled production by the plurality of processes meets a predetermined criterion, and cost of the modeled components is minimal.

Another embodiment of the present invention provides a control system. The control system includes an input port 3510, a plurality of output ports 3512-3516 and, a first controller 3500. The input port 3510 is configured to receive time-varying power 3502. The time-varying power 3502 may be electric power, mechanical power, hydraulic power or another form of power. Each output port of the plurality of output ports 3512-3516 is configured to supply power to a respective associated process 3504-3508 of a plurality of processes. The first controller 3500 is configured to automatically allocate, in real time, at least a portion of the time-varying power 3502 received at the input port 3510 between respective output ports 3512-3516 of the plurality of output ports, based on respective characteristics of the plurality of processes 3504-3508, so as to maximize instantaneous aggregate production by the plurality of processes 3505-3508.

Optionally any embodiment also includes a predictor 3614, an energy storage unit 3604; and a second controller 3600. The predictor 3614 is configured to automatically predict future availability 3608 of the time-varying power 3502. The second controller 3600 is configured to automatically allocate, in real time:

(a) a first portion 3618 of the time-varying power 3502 received at the input port 3510 to the energy storage unit, (b) a second portion 3620 of the time-varying power received at the input port to the first controller 3500 for allocation to the plurality of processes 3504-3508 and (c) a third portion 3622 of power from the energy storage unit 3604 to the first controller 3500 for allocation to the plurality of processes 3504-3508.

The second controller 3600 is configured to allocate the first 3618, second 3620 and third 3622 portions based on the predicted future availability 3608 of the time-varying power 3502 and a function 3610.

BRIEF DESCRIPTION OF THE DRAWINGS

The invention will be more fully understood by referring to the following Detailed Description of Specific Embodiments in conjunction with the Drawings, of which:

FIG. 7 shows the experimental daily water production achieved for six different solar power profiles. FIG. 8 shows each daily solar profile can be characterized by the total PV energy generated by the solar panels and the PV power variability. The six experiments represent a wide range of PV energy and PV output variability. FIGS. 9-11 compare the average performance of flexible and constant operation over six days and show the standard deviation for each performance indicator. FIG. 9 shows the fraction of solar energy directly used, both for the flexible ("F") and the constant ("C") operation modes. It is much higher in flexible operation, with negligible deviation over the six experiments. FIG. 10 shows the minimum battery capacity needed to achieve the same daily production in flexible and constant operation. Flexible operation requires on average less than 10% the battery capacity needed for constant system. FIG. 11 shows the daily operation time.

DETAILED DESCRIPTION OF SPECIFIC EMBODIMENTS

Embodiments of the present invention solve the problem of temporal mismatch between electric power generation by photovoltaic (PV) arrays and electric power consumption by electrodialysis reverse (EDR) desalination systems, without resorting to oversized PV arrays, batteries, etc. For simplicity, descriptions herein refer to PV arrays, but these descriptions also apply to other time-varying power sources, such as windmills, hydroelectric generators, ocean wave powered electric generators, etc. Similarly, these descriptions apply to other processes, such as irrigation water production, manufacturing processes, other electrochemical processes, particularly nonlinear processes, etc.

Figure 35:
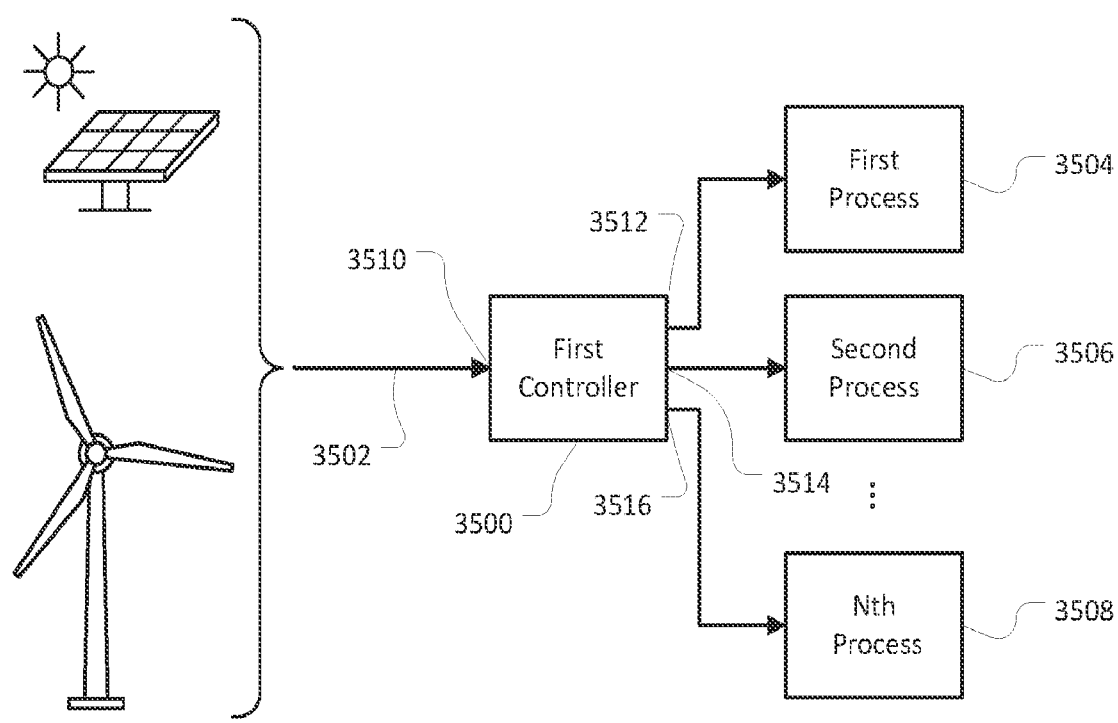
FIG. 35 is a schematic block diagram of a one-level control system, according to an embodiment of the present invention.

Controllers in these embodiments provide one or more levels of control of power and energy within each system. At one level, as illustrated in FIG. 35, a first controller 3500 optimally divides power 3502 between two or more processes, represented by processes 3504, 3506 and 3508, to maximize instantaneous production, for a given amount of currently available power. In the case of EDR, electric power is optimally divided between the ion exchange membranes and pumps to maximize instantaneous production of desalinated water for a given amount of available electrical power.

Figure 36:
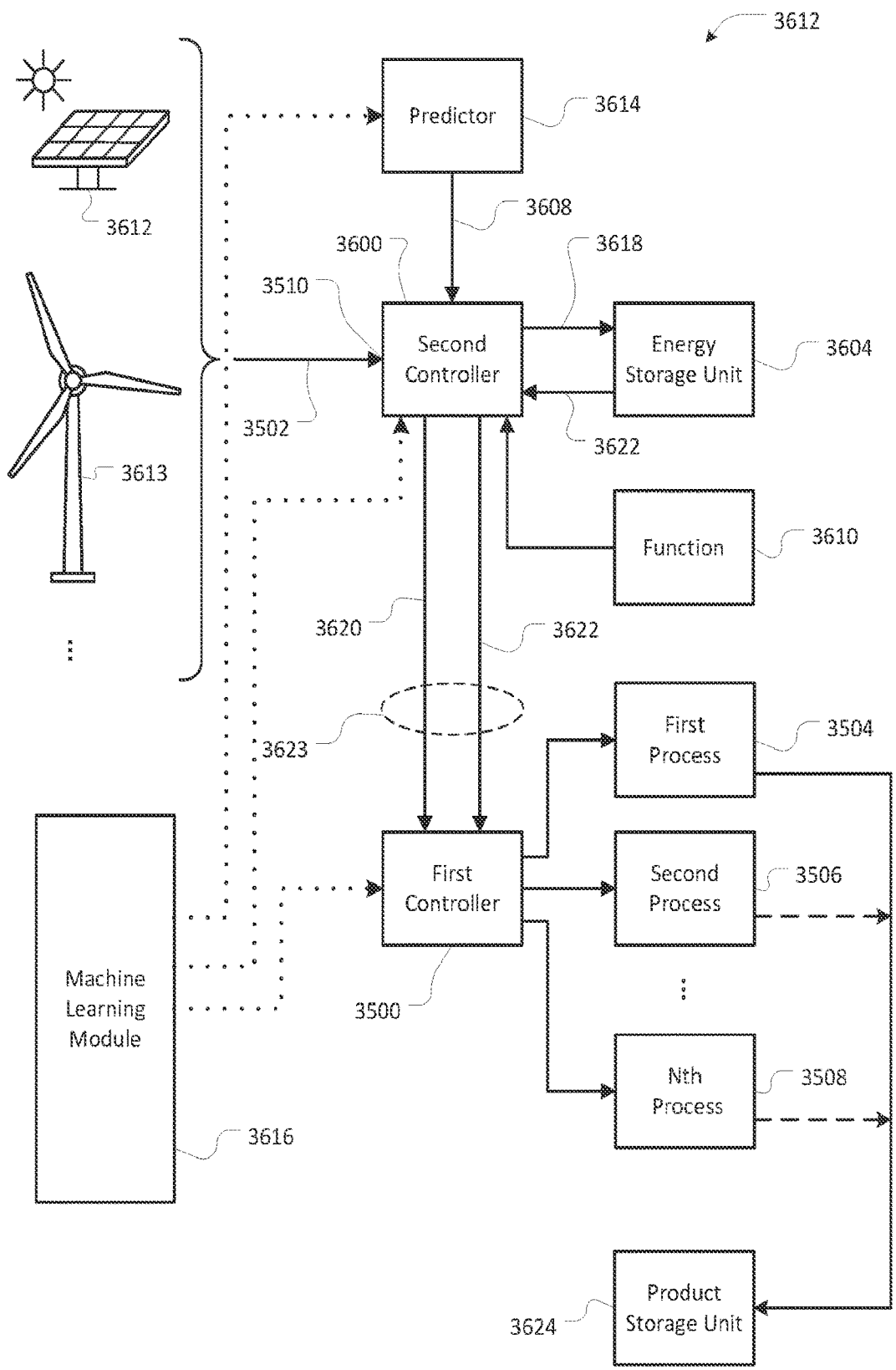
FIG. 36 is a schematic block diagram of a multi-level control system, according to an embodiment of the present invention.

Optionally, as illustrated in FIG. 36, at another level, a second controller 3600 divides the time-varying electric power 3502 between the processes 3504-3508 fed by the first level controller 3500 and an energy storage unit 3604, based on a prediction 3608 of future power availability and a function 3610. In the EDR case, power generated by a PV array 3612 is divided between the EDR desalination process and a battery, based on a prediction 3608 of future PV power availability and a function 3610, to ensure reliable water production in the future. Reliability can be a measure of the likelihood of having sufficient electric power from the PV array 3612 and/or the energy storage unit 3604 to produce a predetermined amount of desalinated water each day.

Definitions

Model predictive control (MPC) is a well-known advanced method of process control that is used to control a process while satisfying a set of constraints. It has been in use in the process industries in chemical plants and oil refineries since the 1980s. In recent years it has also been used in power system balancing models and in power electronics. Model predictive controllers rely on dynamic models of the process, most often linear empirical models obtained by system identification. The main advantage of MPC is the fact that it allows the current timeslot to be optimized, while keeping future timeslots in account. This is achieved by optimizing a finite time-horizon, but only implementing the current timeslot and then optimizing again, repeatedly, thus differing from Linear-Quadratic Regulator (LQR). Also MPC has the ability to anticipate future events and can take control actions accordingly. PID controllers do not have this predictive ability. MPC is nearly universally implemented as a digital control, although there is research into achieving faster response times with specially designed analog circuitry. Generalized predictive control (GPC) and dynamic matrix control (DMC) are classical examples of MPC.

Optimal control theory is a well-known branch of mathematical optimization that deals with finding a control for a dynamical system over a period of time such that an objective function is optimized. It has numerous applications in both science and engineering. For example, the dynamical system might be a spacecraft with controls corresponding to rocket thrusters, and the objective might be to reach the moon with minimum fuel expenditure. An optimal controller is a controller that is based on the optimal control theory.

Desalination

Figure 2:
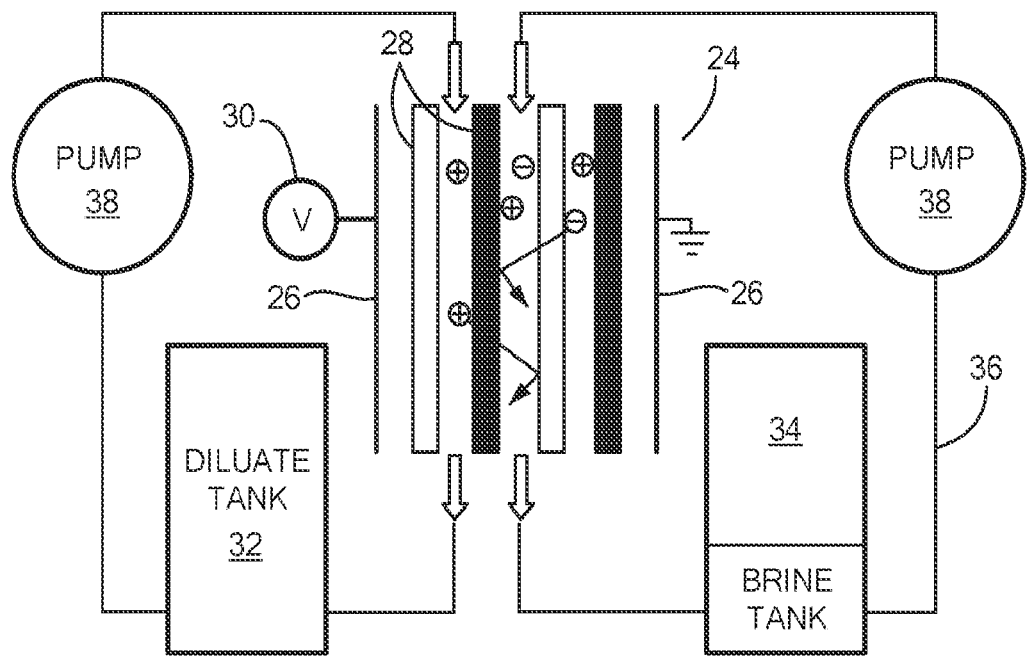
FIG. 2 is a schematic illustration of a batch ED module that generate the profile shown in FIG. 1.

As noted, and as schematically illustrated in FIG. 2, EDR is an electrically driven desalination process, in which ions move across ion exchange membranes 28. When these ion exchange membranes 28 are arranged in an alternating manner, channels of diluate and concentrate are formed therebetween. A production rate of desalinated water depends on the voltage applied to the membranes by electrodes 26 and a rate at which water flows through the channels. The water is made to flow by pumps 38.

Batch recirculation is a method for operating EDR systems. In batch recirculation mode, water passes through the system multiple times, until a target salt concentration is reached. Batch mode allows the system to be operated in a very efficient manner, because the voltage applied to the ion exchange membranes 28 can vary throughout a batch, and from batch to batch, to closely match the voltage needed for desalination to a desired target concentration, and not more.

Figure 37:
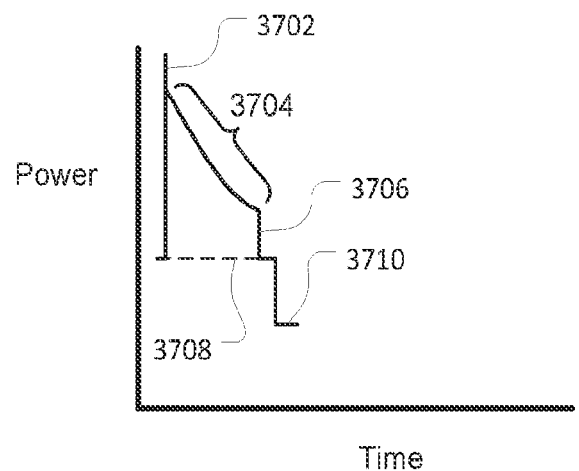
FIG. 37 is a graph that plots power utilized over a single batch by an EDR system, such as the system of FIG. 2, as controlled by the first controller of FIG. 35, according to an embodiment of the present invention.
Figure 38:
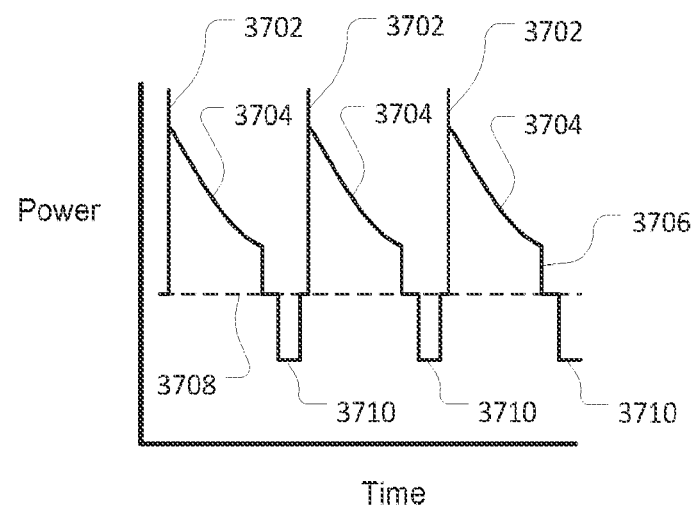
FIG. 38 is a graph that plots power utilized over three successive batches by an EDR system, such as the system of FIG. 2, as controlled by the first controller of FIG. 35, according to an embodiment of the present invention.

FIG. 37 is a graph that plots power utilized over a single batch by an EDR system, such as the system of FIG. 2, as controlled by the first controller 3500 of FIG. 35. At the beginning of the batch, power utilization, as a result of a voltage applied to the ion exchange membranes 28 via the electrodes 26, very briefly peaks, as indicated at 3702. However, as the diluate stream becomes progressively less concentrated, the voltage supplied by the first controller 3500 is progressively lowered, as indicated during time period 3704, and thus the power directed towards the electrodes progressively decreases. At the end of the batch, as indicated at 3706, the power directed to the membranes 28 is reduced to zero. The power 3708 directed towards the pump is constant throughout the batch, but the power directed to the pump is less 3710 when filling or emptying tanks between batches. FIG. 38 is a graph that plots power utilized over three successive batches by the EDR system.

Figure 39:
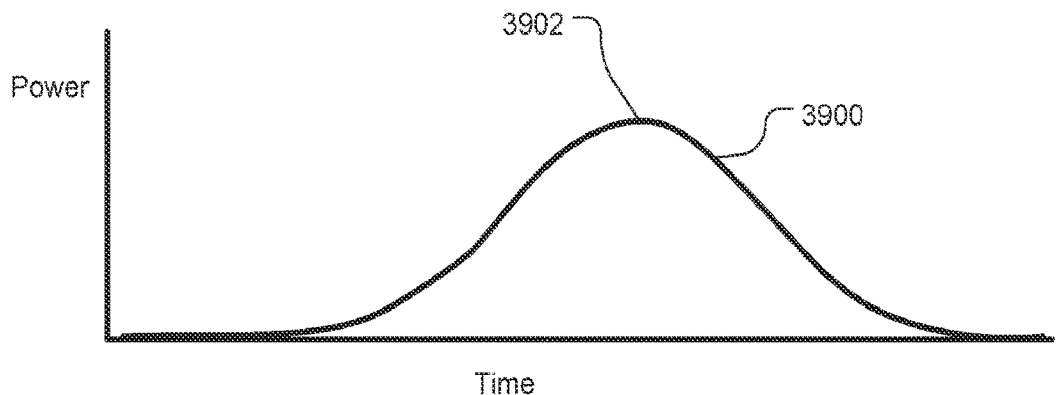
FIG. 39 is a graph that plots approximate typical solar irradiance over the course of a single day, as measured at a low latitude on earth, assuming no cloud cover, solar eclipse, etc.

FIG. 39 is a graph 3900 that plots approximate typical solar irradiance over the course of a single day, as measured at a low latitude on earth, assuming no cloud cover, solar eclipse, etc. The graph 3900 has a characteristic bell shape, peaking at midday 3902, and is representative of temporal availability of power from a PV array 3612 (FIG. 36) and many other non-constant power sources, such as windmills 3613, hydroelectric systems, ocean wave power generating systems, etc., although windmills and other non-constant power sources may have aperiodic graphs.

Figure 40:
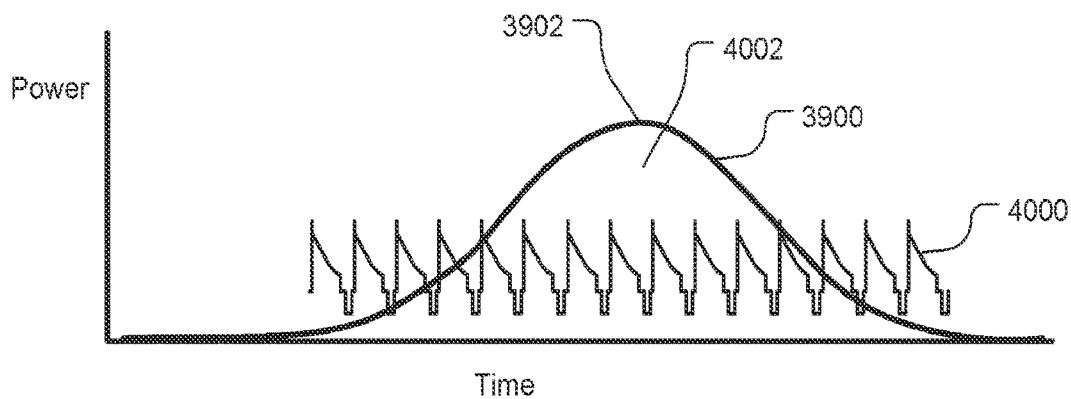
FIG. 40 is a graph that superimposes, on the graph of FIG. 39, plots of power utilized over several successive batches by an EDR system, such as the system of FIG. 2, as controlled by the first controller of FIG. 35, according to an embodiment of the present invention.

As evident from FIG. 40, the daily irradiance graph 3900 does not match the power requirements 4000 of a set of successive equally-powered batches processed by the EDR system over the course of a day. We refer to successive equally-powered EDR batches as having "constant PV-EDR control." Thus, in order to use all the solar power available from the PV array 3612, and desalinate as much water as possible, a constant PV-EDR control system would require large batteries to store excess energy 4002 collected by the PV array during the day and use the stored energy from the batteries to desalinate water later, at night and early the next morning.

First Level Controller

Figure 41:
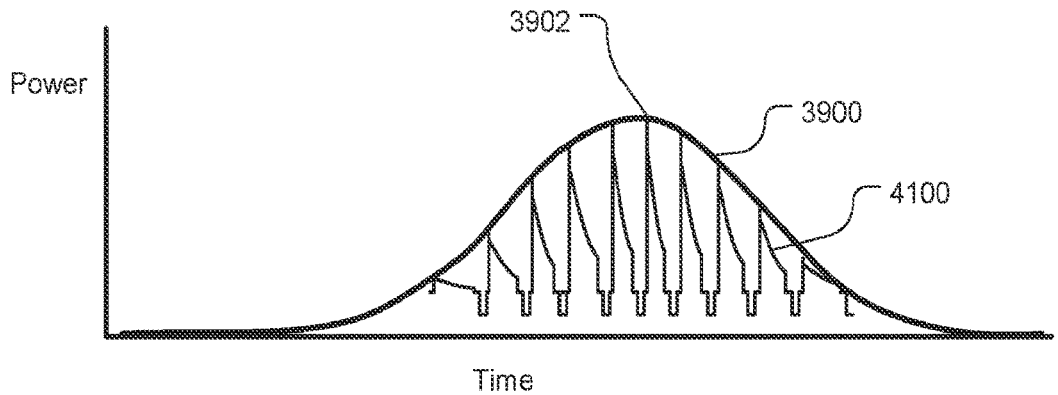
FIG. 41 is a graph that superimposes, on the graph of FIG. 39, plots of power utilized over several successive batches by an EDR system, such as the system of FIG. 2, as controlled by the first and second controllers of FIG. 36, according to an embodiment of the present invention.

One possible control strategy results in a set of successive unequally-powered batches processed by the EDR system over the course of a day, as illustrated in FIG. 41. In this strategy, which we call "time variant operation," the batches are powered so each batch consumes as much power as is produced during the batch. This strategy involves varying the voltage applied to the electrodes 26. Consequently, some batches, i.e., the more energetically powered batches, take less time to complete than other batches. This is evident from some batch plots 4100 being taller, but narrower, than others. At least theoretically, such a scheme does not require a battery to store excess power to be used for EDR during low light or darkness, although some battery storage may be required to keep at least a timer operating to restart the EDR system the next day. Experimental data indicate this strategy utilizes about 75% more solar power than constant PV-EDR control. Consequently, a smaller PV array may be used than in a constant PV-EDR controlled system.

Figure 42:
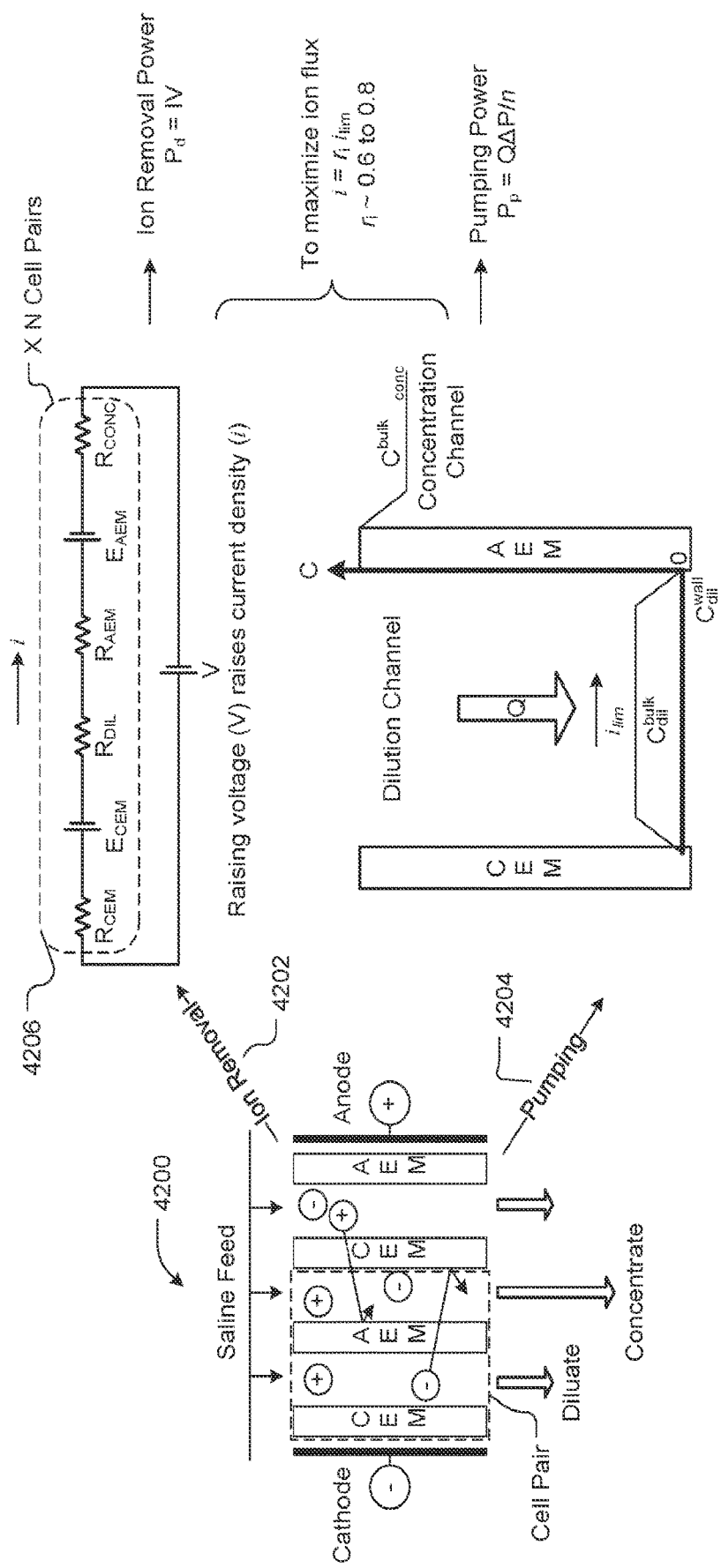
FIG. 42 is a partially schematic drawing of an EDR system controlled by the first and second controllers of FIG. 36, according to an embodiment of the present invention.

FIG. 42 facilitates understanding such a control strategy. As shown in FIG. 42, an electrodialysis stack 4200 involves two mechanism: an electrochemical process of ion removal 4202, and a flow of water through the stack 4204.

The ion removal 4202 aspect of the electrodialysis stack 4200 can be represented by an equivalent electric circuit 4206. Applying a voltage V to the circuit 4206 creates a current density i, i.e., a current per unit membrane area. Integrating this current density i across the stack yields a total current I. Power $P_d$ consumed in the ion removal process 4202 is I times V.

Pumping water through the electrodialysis stack 4200 constitutes the other mechanism 4204. As the water flow rate increases, concentration polarization decreases, which increases limiting current density in the electrodialysis stack 4200. However, the pumps 38 (FIG. 2) must overcome the pressure drop through the electrodialysis stack 4200. Thus, pumping power $P_p$ equals the flow rate multiplied by the pressure drop, divided by pump efficiency.

Thus, we have two control variables: the voltage V applied to the electrodialysis stack 4200, and the flow rate. Above a limiting current density, water splitting occurs in ion-depleted boundary layers. Therefore, the control system requires two constraints. Because in EDR the limiting current density should not be exceeded, a first constraint is: current density should be some fixed fraction of the limiting current density. We use a fraction of between about 0.6 and about 0.8. The second constraint is the total power that is available, i.e., the power available 3502 from the photovoltaic array 3612 (FIG. 36).

In an embodiment, the available PV power is sensed periodically, such as about every 3 seconds, and for each available PV power measurement, a control process solves for new values of voltage (V) and flow rate (power to the pumps 38). As shown in FIG. 35, the first controller 3500 includes an input port 3510 configured to receive time-varying electric power 3502, such as from a PV array, windmill, etc. The first controller 3500 also includes a plurality of output ports, represented by output ports 3512, 3514 and 3516. Each output port 3512-3516 is configured to supply electric power to a respective associated process 3504-3508 of a plurality of processes. In an embodiment of the first controller 3500 for EDR, the plurality of processes includes the ion removal process 4202 and the pumping process 4204.

The first controller 3500 is configured to automatically allocate, in real time, at least a portion of the time-varying electric power 3502 received at the input port 3510 between respective output ports 3512-3516 of the plurality of output ports, based on respective characteristics of the plurality of processes, so as to maximize instantaneous aggregate production by the plurality of processes 3504-3508, as described herein. Here, "real time" means after performing necessary calculations and before the next time interval for allocating the time-varying electric power 3502. Real time allocation involves allocating the portions of power on a continuing basis, not merely once, although not necessarily continuously. That is, the allocations may discrete and the allocations may be spaced-apart in time.

As discussed herein, one process 3504 of the plurality of processes 3504-3508 may be an electrochemical desalination process 4202, and another process 3506 of the plurality of processes 3504-3508 may be a pumping process 4204 (FIG. 42) configured to pump a fluid within the first process 3504. As discussed herein, the ion removal process 4202 is nonlinear, with respect to energy consumption. Thus, production by at least one process 4202 of the plurality of processes 3504-3508 is non-linear, with respect to power input into the process 4202.

Figure 43:
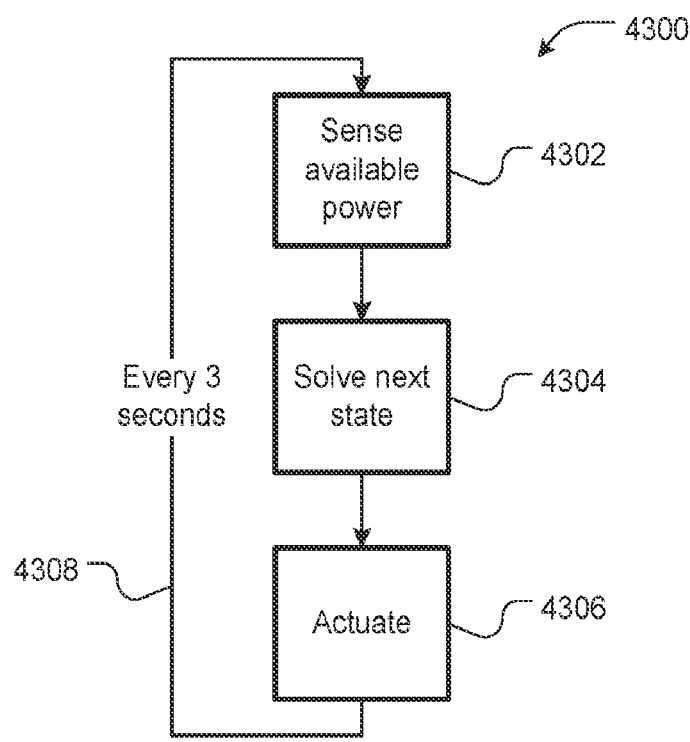
FIG. 43 contains a flowchart that schematically illustrates a looping control process performed by the first controller of FIG. 35, according to an embodiment of the present invention.

FIG. 43 contains a flowchart that schematically illustrates a looping control process 4300 performed by the first controller 3500. At 4302, the available PV power 3502 is sensed. At 4304, the first controller 3500 uses the available PV power 3502, along with conductivity measurements, to solve for the voltage (V) and the flow rate for the next time step. At the next time step, the sum of the pumping power and desalination power should equal the available power Pa:

$$P_p + P_d = P_a$$

As noted, the first controller 3500 requires that the ratio of applied current to limiting current density is fixed. Once the first controller 3500 has solved the new system state, the first controller 3500 sends the flow rate and voltage commands to the pumps and power supply. At 4306, the calculated voltage and flow rate are implemented, i.e., the calculated amounts of power are supplied, via the output ports 3512-3516, to the respective processes 3504-3508. In essence, the first controller 3500 shifts the applied and limiting current density together at all times, subject to the available power 3502.

In other embodiments, the available PV power 3502 may be sensed at other intervals, for example based on an anticipated maximum rate at what the available PV power 3502 may change. In some embodiments, the sense interval varies over time. In some embodiments, a circuit (not shown) automatically detects a change in the power available from the PV array, for example by sensing voltage of the signal from the PV array, and whenever the available power changes by more than a predetermined amount, a loop through the process 4300 of FIG. 43 is triggered.

Figure 3:
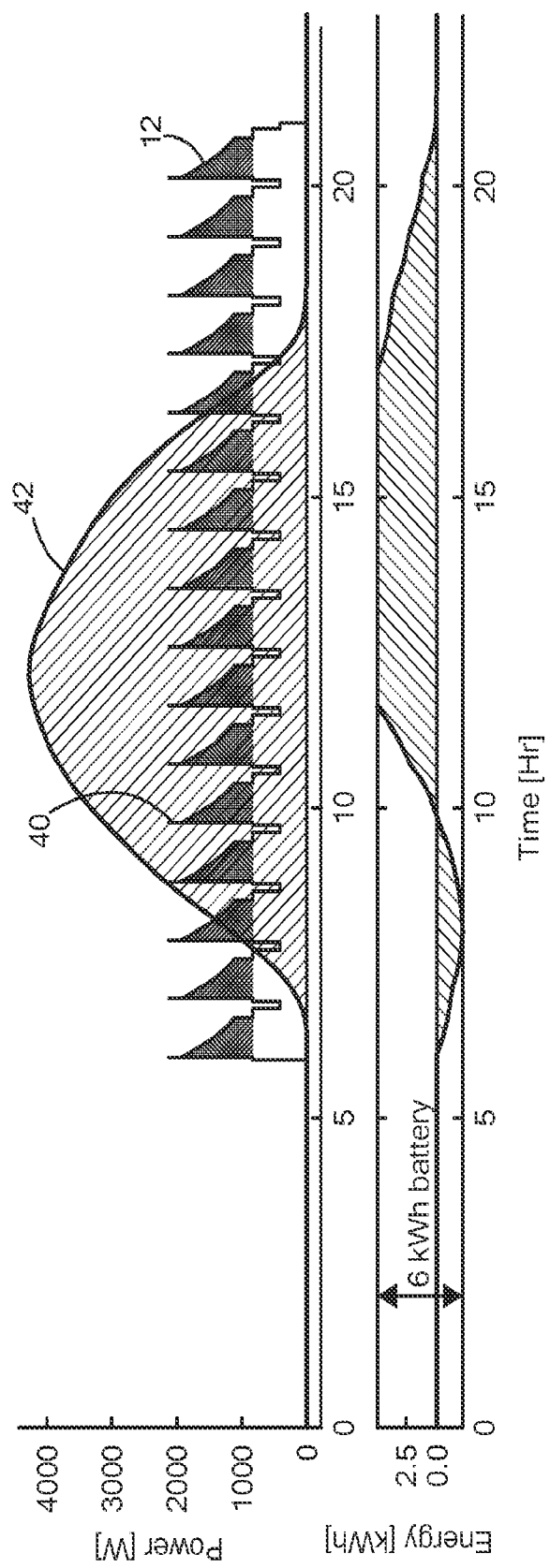
FIG. 3 plots daily PV and ED power profiles when solar panels are coupled to an ED module in constant operation; the mismatch between the solar power and the ED power profiles requires a 6-kWh battery capacity for dispatching the solar energy, and the corresponding integrated flow into the battery during the day is shown via shading 44.

We tested this strategy for several weeks at the Brackish Groundwater National Desalination Research Facility (BGNDRF), in Alamogordo, New Mexico. The first controller 3500 executed a computer program written in the Python programming language. FIG. 3 illustrates performance of a time variant EDR control system and performance of a constant PV-EDR control system. The key results of the tests show that 76% of the solar energy is captured during time-variant operation, as compared to 40% in constant operation. Needed battery capacity is reduced by 92%, as compared to constant operation. However, there are current overshoots at the beginning of each batch, which requires some battery capacity to account for. The rate of desalination is up to 54% faster in flexible operation, as compared to constant operation. Thus, it is clear that time-variant operation can significantly improve PV-EDR performance, and lower cost through cutting battery capacity.

Moreover, the results indicate that this system can produce nearly double the water, compared to constant PV-EDR control. Therefore, the desalination system size could be halved, thus drastically reduce the cost of PV-EDR.

However, using all available power to maximize water production may be suboptimal, from a reliability of water supply viewpoint. For example, although it may be possible to meet a production goal for a given sunny day, if the next day or two are cloudy, it may not be possible to meet the production goal on the second or third day, which can have dire consequences. Therefore, a better strategy would be to take a longer view, regarding energy management. In many cases, it would be preferable to operate the desalination process longer, at a lower power level, and therefore more energy efficiently, and thereby be able to store some energy in a battery for the subsequent day(s), than to operate the desalination process so as to maximize short term production.

Second Level Controller

We have identified two main trade offs in PV-EDR. First, specific energy consumption is not constant for different water production rates. The more power the stack uses to produce more water, the less efficiently water is produced. Thus, the ion removal process 4202 (FIG. 42) is nonlinear, with respect to energy consumption. Second, available solar power depends on the weather conditions and daytime duration, which are both subject to seasonal and day-to-day variations.

These counteracting items increase the complexity of deciding how to use the available solar energy. In fact, increasing water production means increasing energy consumption, which reduces the energy available in low-irradiance days or times. On the other hand, increasing energy storage reduces the energy available for producing water, which might prevent the system meeting its daily desalination target. If people depend on daily production of potable water from the system, a failure to meet the target on a given day could be catastrophic.

The two-level control system 3612 described with respect to FIG. 36 addresses these issues. The two-level control system 3612 adapts water production over time by optimizing: (a) the power that is directly used for water production and (b) the power that is stored for future use. Once the second controller 3600 has optimized the amount of power the stack 4200 can use, the first controller 3500 maximizes the amount of water produced by controlling voltage and flowrate. Essentially, the second controller 3600 allocates long-term power, and the first controller 3500 allocates short-term (immediate or near immediate) power.

Thus, the second controller 3600 is in charge of overall energy management for the system, maximizing solar power use while optimizing battery usage, and the first controller 3500 controls the pump speed and the voltage supply, maximizing water production for the power available to the first controller 3500. The control loop in the first controller 3500 typically operates at a higher rate, such as about every 1-3 seconds, than a control loop in the second controller 3600, typically about every 5-30 minutes, because the available power 3502 typically does not vary rapidly. The second controller 3600 loop frequency should be selected according to how often the available power 3502 varies, as discussed with respect to the first controller 3500.

Returning to FIG. 36, the second controller 3600 may be implemented with a model predictive control (MPC), an optimal controller or other suitable control. As noted, an MPC allows the current timeslot to be optimized, while keeping future timeslots in account. In a sense, the second controller 3600 operates like a chess player, in that the second controller 3600 control action, like a chess move, is optimized at each time step, predicting the system response within a prediction horizon.

MPC is well suited for the second controller 3600 for several reasons. For example, MPC can successfully handle constraints. This feature is of value, especially when accounting for actuator saturation and unachievable state conditions. Pursued objectives can be explicitly framed in a mathematical setting. This feature facilitates system design and performance evaluation, as goals and constraints can be updated on the fly, based on possibly changing or unforeseen needs.

A predictor 3614 is configured to automatically predict future availability of the time-varying electric power 3502. The predictor 3614 may be configured to repeatedly predict the future availability, such as weekly, daily, hourly or at any other desired period, or aperiodically. Thus, each prediction can be different from an immediately preceding prediction. In some embodiments, the predictor 3614 predicts the future availability upon demand from the second controller 3600, and in some embodiments the predictor 3614 predicts the future availability without being triggered.

In one embodiment, the predictor 3614 predicts the future availability based on expected solar irradiance, such as by using the graph of FIG. 39, or another graph or table selected for applicability to the source of the time-varying electric power 3502, such as a table of expected seasonal wind speeds or tides. This graph or table may be modified seasonally, quarterly, monthly, weekly or daily, to account for changes in the underlying data throughout the year. In some embodiments, the predictor 3614 includes a model of solar irradiance variance over a day, year or over another period of time.

Figure 44:
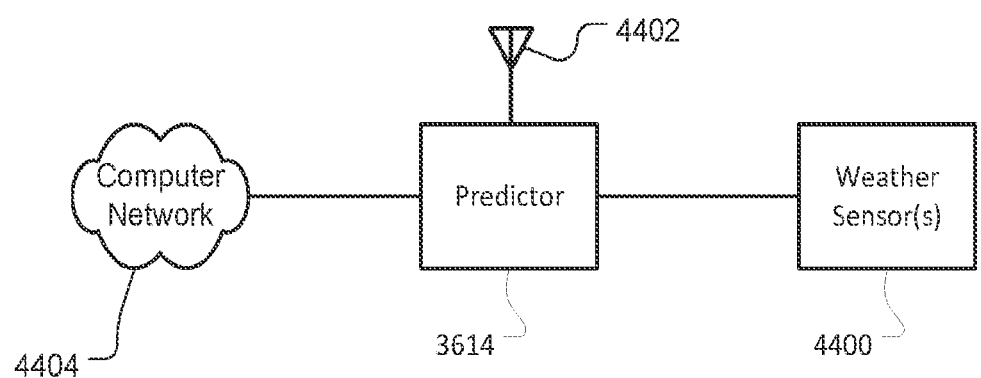
FIG. 44 is a schematic block diagram illustrating a predictor of FIG. 36, along with optional sensors that may be coupled to the predictor, according to embodiments of the present invention.

In some embodiments, the predictor 3614 includes a weather forecast that includes predicted cloud cover information. In some embodiments, the predictor is configured to automatically predict the future availability of the time-varying electric power at least in part based on current weather. As shown in FIG. 44, in some embodiments, the predictor 3614 is coupled to one or more weather sensors 4400, such as an anemometer, thermometer, barometer, wind vane, hygrometer and/or rain gauge, and the predictor 3614 is configured to predict irradiance or cloud cover, based on signals from the sensor(s) 4400.

In some embodiments, the predictor 3614 is coupled to a radio antenna 4402 and is configured to receive irradiance forecasts and/or weather forecasts via a radio link, such as forecasts broadcast by the U.S. National Weather Service. In some embodiments, the predictor 3614 includes a weather forecast that includes predicted cloud cover information.

Optionally or alternatively, the predictor 3614 is coupled to a computer network 4404, such as the Internet, and is configured to receive irradiance forecasts and/or weather forecasts via a computer network link, such as textual weather data available from the U.S. National Weather Service.

In some embodiments, the predictor 3614 includes or accesses a data-driven algorithm, such as a machine learning module configured to predict weather, cloud cover and or solar irradiance, such as based on past data. In some embodiments, the predictor 3614 includes a model that includes a data set, such as a data set fed to a machine learning module 3616.

As noted, the second controller 3600 is coupled to an electric energy storage unit 3604, such as a rechargeable battery or a capacitor. The term "electric energy storage unit" means any energy storage unit that accepts and provides electric power, regardless how the unit stores energy. For example, the electric energy storage unit may include a mechanical energy storage unit, such as a spring, mass or compressible gas, and be configured to convert between electrical and mechanical energy.

As discussed herein, the second controller 3600 is configured to automatically allocate, in real time, a first portion 3618 of the time-varying electric power 3502 received at the input port 3510 to the electric energy storage unit 3604. The second controller 3600 is configured to automatically allocate, in real time, a second portion 3620 of the time-varying electric power received at the input port 3510 to the first controller 3500 for allocation to the plurality of processes 3504-3508. The second controller 3600 is configured to automatically allocate, in real time, a third portion 3622 of power from the electric energy storage unit 3604 to the first controller 3500 for allocation to the plurality of processes 3504-3508. Thus, in aggregate, the second controller 3600 allocates a sum of the second and third portions 3620 and 3622 to the first controller 3500. This aggregate is indicated by dashed ellipse 3623. Two separate lines 3620 and 3622 are shown extending from the second controller 3600 to the first controller 3500 for simplicity of explanation. However, in practice, a single line, as suggested by 3623, may be used.

The second controller 3600 is configured to allocate the first 3618, second 3620 and third 3622 portions based on the predicted future availability 3608 of the time-varying electric power 3502 and a function 3610. For example, in some embodiments, the function 3610 allocates as much of the available power 3502 to the first controller 3500 as the first controller 3500 can use to desalinate water, as discussed with respect to FIG. 41, and the function 3610 allocates remaining available power to the energy storage unit 3604.

In some embodiments, the second controller 3600 is configured to allocate the first, second and third portions 3618-3622 so as to minimize the function 3610. In some embodiments, the function 3610 is a cost function. In some embodiments, the function 3610 is an objective function. In some embodiments, the function 3610 is configured to represent a cost of failing to meet a predetermined aggregate production goal by the plurality of processes 3504-3508. The predetermined aggregate production goal may, for example, be to produce a predetermined amount, such as 3 cubic meters, of potable water per day. In some embodiments, the second controller 3600 is configured to allocate the first, second and third portions 3618-3622 so as to meet a predetermined aggregate production goal by the plurality of processes 3504-3508.

In some embodiments, the second controller 3600 is configured to allocate the first, second and third portions 3618-3622 so as to meet a predetermined aggregate production goal by the plurality of processes 3504-3508 currently and in the future. The predetermined aggregate production goal may, for example, be to produce a predetermined amount, such as 3 cubic meters, of potable water per day, every day.

In some embodiments, the function 3610 is configured to represent a likelihood of meeting a predetermined aggregate production goal by the plurality of processes 3504-3508. In some embodiments, the second controller 3600 is configured to allocate the first, second and third portions 3618-3622 so as to maximize the likelihood of meeting the predetermined aggregate production goal. In some embodiments, the second controller is configured to allocate the first, second and third portions 3618-3622 so as to maximize the likelihood of meeting the predetermined aggregate production goal currently and in the future.

In some embodiments, the second controller is configured to allocate the first, second and third portions 3618-3622 so as to maximize the function. In some embodiments, the function is configured to represent reliability of at least one process of the plurality of processes 3504-3508. As noted, reliability can be a measure of the likelihood of having sufficient electric power from the PV array 3612 and/or the energy storage unit 3604 to produce a predetermined amount of desalinated water each day.

Although the term power is used in describing the first, second and third portions 3618-3622 and allocation by the first and second controllers 3500 and 3600, as used in these contexts, the term power means power or energy.

The fact that only first, second and third portions 3618-3622 of power are described as being allocated by the second controller 3600 does not necessarily mean only exactly three portions are allocated. Thus, the second controller 3600 may allocate additional portions (not shown).

Similarly, although two processes 3504 and 3506 are described in detail, i.e., ion removal 4202 and flow of water through the stack 4204, the first controller 3500 may allocate power to two, three, four or more processes. For example, a third process of the plurality of processes 3504-3506 may be configured to fill a tank with irrigation water, without necessarily desalinating the irrigation water, or after desalinating the water to a lesser degree than to make the water potable.

As shown in FIG. 36, optionally, one or more of the processes 3504-3508 may output their product to a product storage unit 3624, such as a tank for holding potable drinking water. Thus, the product storage unit 3634 may be coupled to at least one process of the plurality of processes 3504-3508, and the product storage unit 3634 may be configured to store, for future use, a product produced by the process. For example, if the desalination system of FIG. 2 produces one day's supply of potable water per day, but demand for the water exceeds supply of the water early in the day, such a tank can store one or more day's supply of water after an initial startup period, during which no or little water is drawn from the system.

In this case, the second controller 3600 may be configured to allocate the first, second and third portions 3618-3622 based at least in part on capacity of the product storage unit 3624 or on an amount of product currently stored in the product storage unit 3624.

In some embodiments, goals, constraints and other parameters used by the predictor 3614, the first controller 3500 and/or the second controller 3600 are automatically adjusted by a data-driven control algorithm, such as a machine learning, deep learning or other artificial intelligence module, represented by machine learning module 3616 (FIG. 36). In this framework, machine learning is used to predict solar irradiance in the prediction horizon, helping the second controller 3600 to best use the solar energy available in the near future. Machine learning also simplifies the software, hardware and expertise required to obtain an accurate prediction. Machine learning also cuts cost, by reducing number, sophistication and/or sensitivity of sensors and computational power required to predict weather.

Generalization

Although controllers have been described that allocate time-varying electrical power, concepts, systems and methods described herein are applicable to allocating non-time-varying electrical power, as well as non-electrical power, such as mechanical power, hydraulic power and other forms of power. Furthermore, these concepts, systems and methods are applicable to allocating resources, such water, even if the resource is not used to power a process.

Method for Sizing Components of a System

Modeling operation of a system having one or both of the controllers 3500 and/or 3600 facilitates designing a minimal system that meets a production goal. For example, modeling a desalination system for a year of simulated operation shows whether, under the modeled weather conditions, the system operates reliably, i.e., produces sufficient potable water every day. Modeling various combinations of PV array sizes, electrodialysis stack sizes, operating voltages, pump capacities, battery capacities, and other system component sizes, as well as expected operating conditions, such as weather, shows which combinations of these component sizes reliably meet the production goal under expected weather conditions, and which of these combinations is least expensive.

Figure 45:
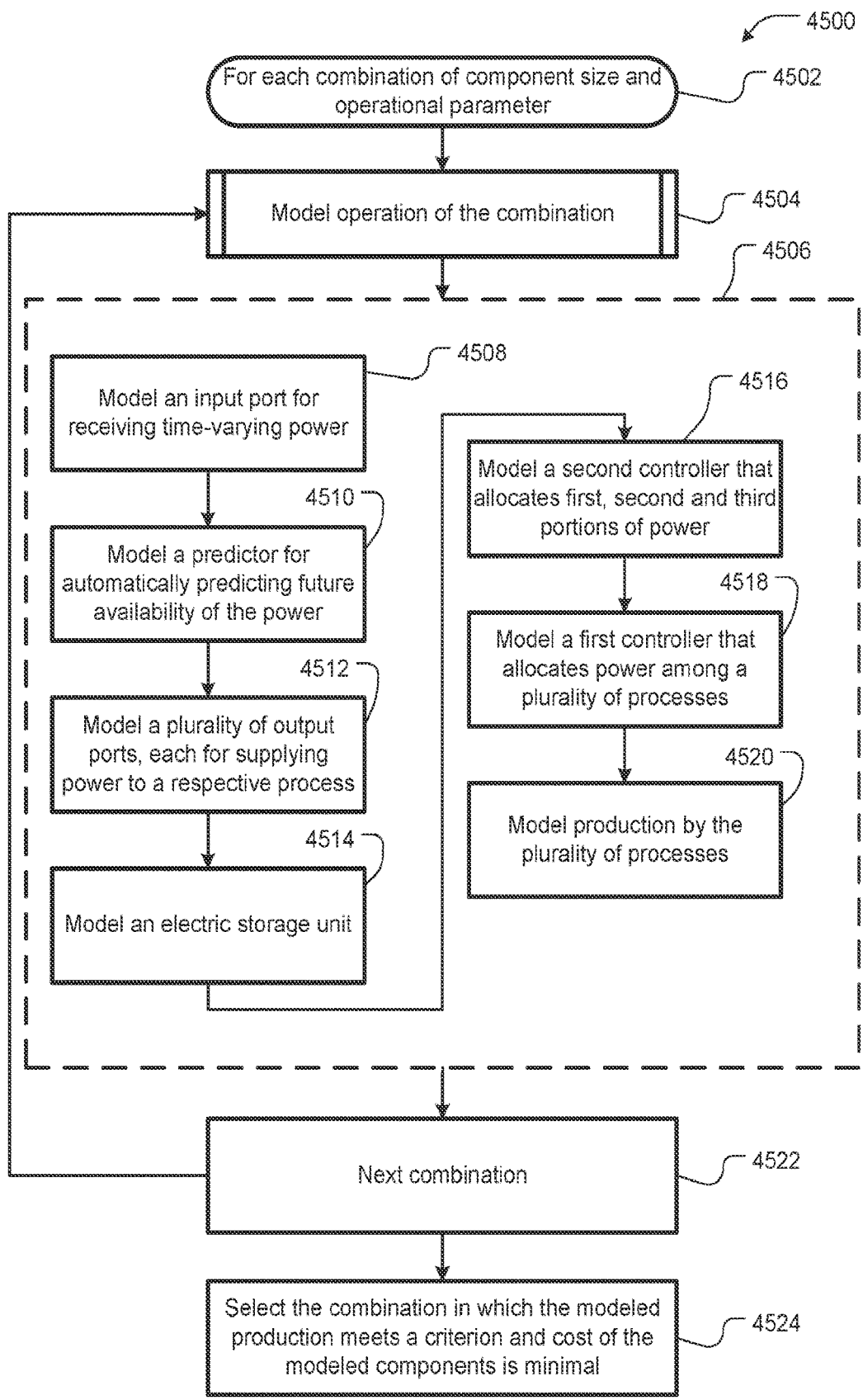
FIG. 45 is a flowchart schematically illustrating a method for sizing components of a system, according to embodiments of the present invention.

FIG. 45 is a flowchart schematically illustrating a method 4500 for sizing components of a system. The system includes a plurality of components that perform a plurality of processes. The processes are controlled by a controller according to a plurality of operational parameters. Various sized components have respective associated costs.

At 4502, for each combination of component sizes and operational parameters, operation of the system is automatically modeled over a time period. This involves a loop, in which successive combinations are selected, and each combination is modeled for a model period, typically one year to model all seasons, although other time periods can be modeled.

At 4504, a combination is modeled. Modeling the combination involves operations within dashed box 4506.

At 4508, an input port is modeled. The input port is configured to receive time-varying electric power. The input port may be the input port 3510 described with reference to FIG. 35 or FIG. 36.

At 4510, a predictor is modeled. The predictor is configured to automatically predict future availability of the time-varying electric power. The predictor may be the predictor 3614 described with reference to FIG. 36.

At 4512, a plurality of output ports is modeled. Each output port is configured to supply electric power to a respective associated process of a plurality of processes. The output ports and the processes may be the output ports 3512-3516 and the processes 3504-3508 described with reference to FIG. 35.

At 4514, an electric energy storage unit is modeled. The electric energy storage unit may be the electric energy storage unit 3604 described with reference to FIG. 36.

At 4516, a second controller is modeled. The second controller is configured to automatically allocate, in real time: (a) a first portion of the time-varying electric power received at the input port to the electric energy storage unit, (b) a second portion of the time-varying electric power received at the input port to the plurality of processes and (c) a third portion of power from the electric energy storage unit to the plurality of processes. The second controller is configured to allocate the first, second and third portions based on the predicted future availability of the time-varying electric power and a function. The second controller, first, second and third portions and function may be the second controller 3600, first, second and third portions 3618-3622 and function 3610 described with reference to FIG. 36.

At 4518, a first controller is modeled. The first controller is configured to automatically allocate, in real time, the second and third portions between respective output ports of the plurality of output ports, based on respective characteristics of the plurality of processes, so as to maximize instantaneous aggregate production by the plurality of processes. The first controller may be the first controller 3500 described with reference to FIGS. 35 and 36.

At 4520, production by the plurality of processes is modeled.

At 4522, the next combination is selected, and control returns to 4504. If, however, all the combinations have been modeled, control passes to 4524. At 4524, a combination of component sizes and operational parameters is selected, in which the modeled production by the plurality of processes meets a predetermined criterion, and cost of the modeled components is minimal.

Additional Details

Recent surveys indicate that we are far from the UN targets in terms of access to potable water. According to the recently updated Aqueduct Water Risk Atlas by the World Resource Institute, 17 countries that are home to a quarter of the world's population face "extremely high" water stress. Diarrhea, which causes dehydration, is an example of a significant sanitation concern magnified by water scarcity, with reports of 1,000 children dying due to diarrheal diseases daily. In June 2019, Chennai, the sixth-most populous Indian city, ran out of water due to delayed monsoon, suggesting that water stress will likely be catalyzed by climate change. Water shortage also intrinsically relates to energy insecurity because of the high energy consumption by water treatment processes. As a proof of this water-energy nexus, the water sector's current energy usage roughly amounts to all the energy used by Australia. Water-related challenges must be tackled urgently, but they cannot be addressed in isolation from their energy requirements; integrated solutions should be implemented for long-term water and energy security.

Water scarcity is particularly severe in developing countries, such as India, where up to 17% of the daily salary of an average worker in rural areas is spent on water. This cost escalation is, in part, due to the inaccessibility of piped water in rural households worldwide, with only 18 to 20% of households in India relying on piped water. Additionally, there is often no reliable grid power for abstracting and treating water. In 2016, among the 14% of the world's population lacking access to electricity, 84% lived in rural areas. This proportion is even higher in India, where over 200 million people living in rural areas do not have access to the grid. Even in electrified villages, the reliability of grid power is poor. During 'bad' months in Bihar, India, according to one report, inhabitants receive 1.3 hours of grid power per day on average. The lack of reliable access to electricity means that a community-scale water-treatment plant designed to operate ten hours per day would only meet 13% of the daily demand.

Despite the magnitude of the water crisis, there are a number of opportunities for increasing access to potable water in remote areas, such as abundant groundwater resources. Groundwater is the largest available store of global freshwater, and the volume of modern groundwater is equivalent to a body of water with a depth of about 3 m spread over the total continental land area. Groundwater is already relied upon by more than two billion people for drinking. However, these resources are being depleted by excessive withdrawal, with approximately 1.7 billion people worldwide currently living in regions where groundwater is under stress, 60% of whom are in India and China. In addition, fresh groundwater is subject to increasing salinization due to natural and anthropic factors, causing it to become brackish or saline and, thereby, non-potable.

Water is referred to as brackish when it has a total dissolved solid (TDS) content between 500 mg/L and 10,000 mg/L, and water is referred to as saline when it has a TDS above 10,000 mg/L. When combining brackish groundwater with the existing saline groundwater store, which is about 56% of the world groundwater, the resulting volume of underground water with TDS above portability level is already significantly higher than the volume of directly drinkable underground water. The same is true at the country level in India where the brackish or saline water underlies 60% of the land area. This data means that desalination of brackish water is needed to maintain drinking-water supply from groundwater at today's level. It also means that brackish and saline groundwater can potentially multiply the currently available sources for drinking water by more than twofold and be instrumental for solving the water crisis, provided they can be desalinated with minimal wastage. A recent study reveals that underground water fluxes are expected to have relatively long response times to climate change especially in arid countries, providing a promising water source for counterbalancing the short-term water stress caused by climate change.

Because failure in reliable energy supply increases water scarcity, energy security is an essential part of the solution to water challenges. Today, renewable energies are a promising avenue for reliably powering small-scale water treatment systems because the most-effective water and energy scheme for providing potable water to remote or grid edge locations is a distributed infrastructure in which water is collected and treated locally. In areas with no piped access to water, decentralized water systems, such as the village-scale dams or reverse osmosis (RO) plants installed in India, have been found to be the most-effective solutions. In peri-urban areas, these decentralized systems are also a more-resilient solution than centralized megaplants relying on a single, localized, and uncertain feedwater source.

Renewable energy resources, such as solar and wind, are particularly suited for powering a distributed water infrastructure in water-stressed countries. A majority of these countries benefit from well-distributed solar and wind resources, and the cost of PV and wind turbines has significantly decreased—the levelized cost of utility-scale solar PV fell by 73% between 2010 and 2017, and onshore wind power has become one of the most-competitive sources of new generation. Distributed renewable systems are often preferred over grid extensions for electrifying remote areas, as they are estimated to minimize the cost of supplying electricity to nearly three-quarters of the people living in remote areas of sub-Saharan Africa, the population that is considered the most difficult to serve worldwide. Their deployment off-the-grid or their integration in microgrids has therefore accelerated, incentivized by national policies. In India, renewables are predicted to contribute 60% of the electrification rate increase between now and 2030, mostly through mini-grids for a total capacity of 500 megawatts. Renewables are therefore a cost-effective and reliable energy source a priori for powering small-scale water desalination systems in rural areas.

Variable-powered electrochemical desalination systems, control systems therefor, and methods of use are described herein, where various embodiments of the apparatus and methods may include some or all of the elements, features and steps described below.

A variable-powered electrochemical desalination system includes a power module configured to generate electrical power based on variable inputs. The system also includes an electrochemical desalination module, comprising first and second electrodes, selectively permeable ion-exchange membranes that define diluate and concentrate channels for liquid flow between the membranes and between the membranes and the electrodes, and at least one pump configured to drive flow of a feed liquid through the channels. The system further includes a control system configured to control flow rates of the feed liquid through the channels and to control distribution of electrical power from the power module to generate and apply a control voltage to at least one of the electrodes to generate an electrical charge in response to variations in power or an absence of power generated by the power module or to achieve optimized production of product water from the diluate channels. In a method for optimizing operation of an electrochemical desalination module powered by a power module, electrical power is received in the electrochemical desalination module from the power module. The electrical power is applied as a voltage to generate a charge at at least one of a first electrode and a second electrode. A feed liquid is passed through channels defined by selectively permeable ion-exchange membranes between the electrodes, wherein ions in the feed liquid are selectively drawn through the ion-exchange membranes by the charge at at least one of the electrodes. The electrical power received from the power module is measured; and at least one of (a) the voltage applied to at least one of the electrodes and (b) a flow rate of the feed liquid through the channels is adjusted as a function of the electrical power received from the power module or an absence of power generated by the power module or to achieve optimized production of product water from the diluate channels.

Though much of the description of the methods and apparatus herein are directed to an electrodialysis system and method, the teachings herein provided can similarly be applied to other electrochemical desalination systems, such as ion concentration polarization systems and methods, which may use only anionic or cationic exchange membranes. Likewise, much of the description is targeted to the use of a photovoltaic solar module as the power source, though other variable power sources, such as wind turbines, microgrids, or variable cost power sources (where electricity is more expensive at different times of the day), as well as other fixed-output sources, can alternatively be used as the power source.

Particularly described herein is a fully flexible operation of batch photovoltaic (PV) electrodialysis reversal (EDR) systems for desalinating brackish ground water in off-grid communities. The ED power consumption can be matched to the available solar power at any time by actively controlling voltage and flow rate. As a result, the system can dynamically adapt its desalination rate to the solar-irradiance profile, producing freshwater in synchronization with sun irradiance while minimizing the need for batteries. The proposed operation method can significantly reduce the levelized cost of water (LCOW), which, in turn, can increase the availability of clean water in off-grid areas worldwide, thereby offering a huge potential for directly impacting countries, such as India, where the combined poverty level and water scarcity in rural areas drive the cost of water up to 17% of the daily salary and prevent 15% of the rural population from accessing basic drinking-water service. This work shows that renewable-powered water treatment can be an affordable alternative to grid-tied systems, and thus provide a long-term solution for both water and energy security.

The contributions of this work include a feed-forward control strategy of the EDR module for actively adapting its power consumption to time-variant input power levels while maximizing desalination rate. This control strategy is referred to herein as the "optimized control strategy". The contributions also include a model of photovoltaic electrodialysis (PV-ED) behavior in direct-drive operation, coupling a time-variant solar-power input with the real-time control strategy and associated time-variant electrodialysis model. This operation mode is referred to as "flexible operation" herein.

Potential advantages of the systems and methods described herein include the capacity for providing affordable, reliable water access in remote locations. Further, the levelized cost of water (LCOW) achieved by the PV-EDR systems described herein can be competitive with current commercial solutions (small-scale on-grid RO systems); and the company or NGO operating the plant may be able to cover the system costs over its lifetime with a selling price of $3.15/m³ for product water, which is the selling price for government-subsidized installations. In order to limit the payback period to five years or less (a more acceptable loan term in developing countries), the LCOW can be targeted to be below $1.6/m³. The recovery ratio for a given water composition can be maximized in order to minimize water wastage and brine management needs. The PV-EDR system can reliably answer the daily community water needs (based on a required amount per capita) every day despite seasonal variations in renewable-energy generation. The biological and chemical contaminants can also be reduced to levels recommended by the World Health Organization (WHO), and total dissolved salts (TDS) can be reduced to less than 500 mg/L.

The fully flexible operation of photovoltaic electrodialysis reversal systems, as described herein, can disrupt current state-of-the-art solutions for desalinating brackish groundwater in remote areas by significantly lowering the cost of the water produced. With the optimized control strategy for a PV-EDR system in direct-drive operation, the desalination rate and solar-energy utilization can be maximized at every instant. The full-scale pilot experiment validated that this control strategy can almost eliminate battery needs while maintaining similar daily freshwater production to conventional systems in constant operation. Combining the findings from an assessment of adding a small battery capacity in the system into an optimal control strategy for flexible PV-EDR systems with a battery, we ran a system-level design optimization to find the lowest levelized cost of water achieved by a PV-EDR system that answers the water demand in Chelluru, India. By analyzing the cost-optimal system, we showed that flexible operation brings a 22% cost reduction compared to state-of-the-art PV-EDR systems and, most importantly, achieves cost competitiveness with the commercial standard in Indian villages today [i.e., on-grid reverse-osmosis (RO) plants].

Herein, we elucidated how the ED stack voltage and pumping flow rate should be controlled in real time in the PV-EDR system so that the instantaneous desalination rate is maximized, subject to the solar power available. By coupling the control strategy with a simulation framework for time-variant ED systems, we explored the benefits of this flexible operation compared to the conventional operation where voltage and flow rate are held constant and where batteries are needed to power the desalination load. We predict that the PV-EDR system in flexible operation can consume directly more than 80% of the solar energy available, and, therefore, can reduce the required battery capacity from 4.8 kWh to less than 0.1 kWh. We then assessed the feasibility and performance of flexible operation in real conditions. We designed a control architecture, comprising dedicated hardware and software for dynamically controlling the ED stack voltage and pumping-flow rate. In an experimental analysis, the system was run in fully flexible operation during six full days with various levels of total daily solar energy and PV output variability. The analysis of the experimental data showed that, on average, the system was able to capture directly 76.5% of the solar energy, which was 91% more than with constant operation for a similar daily water output. This led to 92% reduction in battery capacity requirements and also allowed the daily water production to flexibly scale with the total energy captured both on low and high-irradiance days.

Some limits of a pure direct-drive operation were identified based on the results of simulations and experiments. The direct utilization of solar energy is limited to 90% in practice. Additionally, exploring the relationship between electrodialysis specific energy consumption and operating power revealed that desalination performance decreases as ED power increases, and therefore directly consuming the high mid-day solar power can be detrimental to water production. We, therefore, investigated the potential benefits of adding a 3-kWh battery to the experimental PV-EDR system, where it was shown that, with foreknowledge of the solar irradiance, the battery can be used to reshape the solar-power profile into an optimal ED-power operating profile that, on average, increases water production by 25% compared to the direct-drive. We then implemented a machine-learning algorithm able to decide the optimal ED operating power in real-time, based on current and past irradiance data only. Simulations of this online battery management strategy predicted that the daily water production that is achieved is within one percent of the optimal water production and suggested that this strategy can be successfully implemented in a real PV-EDR system with batteries.

Furthermore, we assessed the concrete impact of these novel control strategies leveraging a fully flexible desalination load for accommodating the intermittency of renewable power without requiring a large, expensive battery capacity. This analysis focused on rural India, where water challenges are critical today and, more particularly, the village of Chelluru, India (near Hyderabad), which is representative of remote areas where brackish groundwater and solar resources are available. Using a system-level optimization framework running year-long simulations of water production for various system designs, we determined a PV-EDR-system design that minimizes the levelized cost of water produced while meeting Chelluru's daily demand with 99% reliability during one year. These practices and teachings are likewise applicable globally in various environments. The results show that, as of today, flexible PV-EDR systems can reduce the levelized cost of desalinating brackish water by 22% compared to state-of-the-art PV-EDR systems and by 46% compared to conventional off-grid systems. Flexible PV-EDR systems can even be cost-competitive with current community-scale, on-grid RO-desalination solutions in India (and elsewhere). Moreover, photovoltaic electrodialysis technology can bring significant improvements for freshwater supply in remote areas in the near and far-off future. The high recovery ratio achieved by electrodialysis compared to reverse osmosis implies that the cost benefits of electrodialysis are even more significant when including the capital cost of evaporation ponds installed for managing brine. As the production of electrodialysis systems scales up, a drop in ED-membrane cost similar to the one previously observed for RO membranes is expected. We predicted that the levelized cost of water for PV-EDR systems could become as low as 60% of the cost achieved by on-grid RO systems today. Finally, these renewable-powered systems achieve such economic improvements with greatly reduced environmental cost and offer a resilient solution to energy insecurity.

Consequently, the flexible PV-EDR technology presented herein has the potential to provide access to affordable potable water in remote locations by enabling a new generation of water-treatment systems specifically designed for insufficient- or no-grid access. The approach taken herein is applicable globally. 85% of countries currently face water-scarcity and/or water-quality issues today; there is over 20% more brackish than fresh groundwater throughout the world, and the system and methods described herein can help to meet the urgent need that exists to shift to renewable-energy sources.

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise herein defined, used or characterized, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially (though not perfectly) pure, as practical and imperfect realities may apply; e.g., the potential presence of at least trace impurities (e.g., at less than 1 or 2%) can be understood as being within the scope of the description. Likewise, if a particular shape is referenced, the shape is intended to include imperfect variations from ideal shapes, e.g., due to manufacturing tolerances. Percentages or concentrations expressed herein can be in terms of weight or volume. Processes, procedures and phenomena, described below, can occur at ambient pressure (e.g., about 50-120 kPa—for example, about 90-110 kPa) and temperature (e.g., −20 to 50° C.—for example, about 10-35° C.) unless otherwise specified.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly. In addition, where a range of values is provided, each subrange and each individual value between the upper and lower ends of the range is contemplated and therefore disclosed.

We have identified a desalination technology involving electrodialysis reversal (EDR) that can leverage the opportunities of renewable-energy production and decentralized energy production and that may be used to desalinate groundwater using clean energy and to disrupt the current water status. This technology is distinct from RO, which pressurizes and forces the feed-water stream through a polymer membrane while its constitutive ions are blocked by the membrane. Instead, an ED module comprises a stack of ion-exchange membranes and uses an electric field to move ions from the diluate flow channels to the brine flow channels in-between each membrane, as is shown in the schematic illustration of a batch photovoltaic electrodialysis reversal (PV-EDR) system in FIG. 2. ED can trade the high pumping power required to pressurize water in RO for the electrical power required to move ions. ED is, therefore, particularly suited for brackish water, where ion concentration is much lower than seawater (35,000 mg/L).

Figure 1:
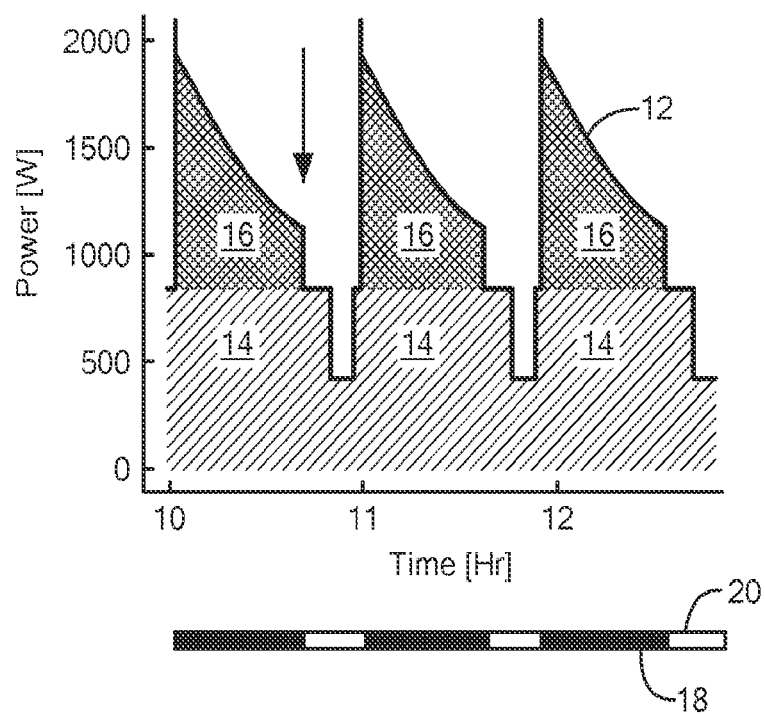
FIG. 1 is a plot of a typical electrodialysis (ED) power consumption profile 12 with a mismatch in power generated and power consumed (via pumping 14 and electrical power 16 for electrodialysis) for a batch photovoltaic electrodialysis reversal (PV-EDR) system in constant operation.

As shown in FIG. 2, the batch PV-EDR system includes an electrodialysis stack 24, including electrodes 26 connected with a voltage source 30 and ion-selective membranes 28 sandwiched therebetween. The output from diluate and concentrate channels defined by the membranes 28 are respectively pumped through conduits 36 by pumps 38 to a diluate tank 32 and a brine tank 34. A typical ED power-consumption profile 12 for a batch PV-EDR system is s shown in FIG. 1, where electrical power consumption 16 and pumping power consumption 14 are both plotted as a function of time through batch operation periods 18 and drain/fill periods 20. Daily PV 42 and ED 12 power profiles when the solar panels are coupled to the ED module in constant operation are provided in FIG. 3. The mismatch between the solar power 42 and the ED power 12 profiles predicates the use of a 6-kWh battery capacity for dispatching the solar energy. The corresponding integrated flow 44 into the battery during the day is shown, below.

Various authors have shown that ED has a lower specific energy consumption than RO for salinity levels lower than 5,000 mg/L and for flow rates relevant to the village scale (1,000 LPH). Using these numbers, inventor Amos Winter and Natasha Wright predicted that an ED module could be coupled with solar panels in a cost-effective way [N. Wright, et al., "Justification for Community-Scale Photovoltaic-Powered Electrodialysis Desalination Systems for Inland Rural Villages in India," 352 Desalination 82-91 (2014) (hereafter "Wright 2014")]. They also showed that ED minimizes water wastage, achieving water recovery of up to 90%. We concluded that photovoltaic electrodialysis reversal (PV-EDR) systems have a high potential to treat brackish groundwater sustainably, at low cost.

The main challenge in designing low-cost renewable energy-powered systems is managing the intermittency of power generation. When conventional systems designed for steady-state operation are directly connected to solar panels, water production drops significantly due to solar-power variability, leading to prohibitively high water costs. ED in particular does not have the capital-expenditure advantage of a mass-produced technology (the estimated ED equipment market size was less than 6% of the RO market in 2019). This work provides technical innovations that can lead to significant cost reductions.

The present work investigates how to design a small-scale electrodialysis system that can adapt to the intermittency of solar energy. This study builds on prior work of our group by addressing a major challenge in designing PV-powered desalination systems: the mismatch between the intermittent renewable power generation of PV panels and the inflexible power consumption of conventional, steady operation desalination systems. Conventional electrodialysis batch systems are usually operated on-grid with a constant operational voltage and flow rate optimized to achieve a satisfactory energy efficiency. This operation is further referred to as "constant" or "conventional" operation.

The constant flow rate value can be increased by raising the number of membranes in the ED stack to speed up freshwater production, synchronizing operation hours with solar availability, and using less batteries. However, the battery capacity savings have been found to not compensate for the higher membrane cost, and running longer hours has been found to be more cost-effective for the constant-operation case.

To further reduce cost, we have created a time-variant, flexible operational strategy in which the ED-system power consumption follows the solar-power profile and is optimally used to desalinate brackish water, without requiring additional membrane area. This methodology implements real-time control of the ED load coupled with PV power and flexibly achievable load shaping while maintaining target desalination performance and water production.

By combining this operation technique with system-level design optimization to realize a system sized appropriately for an Indian village, this study demonstrates a cost-competitive solution relative to the leading commercial standard for small-scale, grid-powered RO desalination plants. Therefore, this system and methodology tackles a compelling challenge in the water-energy nexus—increasing global access to potable water in areas with limited freshwater, energy and economic resources.

Further discussed herein is the time-variant operation for PV-EDR systems, where the ED system power consumption can be flexibly matched to the solar power profile and used optimally to desalinate brackish water at every instant. Described first are the working principles of batch electrodialysis and methods by which the power consumption and desalination rate can be varied. Using these principles, we then explain how the ED system can be controlled in order to maximize the instantaneous ion removal rate given a certain solar power available. Using simulation, we then explore the potential of this control strategy for reducing battery needs on a daily time scale.

Working Principles of Batch Electrodialysis

As shown in FIG. 2, a batch ED system includes two closed-loop system, each one comprising a tank 32/34 and a stream of water that circulates through the ED stack 24 and comes back to the tank 32/34. During each pass through the ED stack 24, the brine-stream conductivity increases and the diluate conductivity decreases until the concentration of the diluate tank 32 water finally reaches the target salinity level. Wright, et al., previously built and validated a robust model of batch electrodialysis, which we use as the basis for our analysis ["A Robust Model of Brackish Water Electrodialysis Desalination with Experimental Comparison at Different Size Scales," 443 Desalination 27-43, (May 2018) (hereafter "Wright 2018"]. Salt removal from the diluate channels in the stack comes from ion transport through alternating cation- and anion-exchange membranes. Energy is provided firstly to recirculate water using pumps and secondly to move ions from the diluate to the brine streams by applying a voltage potential perpendicular to the water flow.

The instantaneous power consumption of the system is the sum of the following:

the pumping power, $P_{pump}$, which depends on the recirculation flow rate, Q, $$P_{pump} = \frac{Q\Delta P}{\eta_{pump}}, \tag{1}$$

where $\Delta P$ is the pressure drop across the recirculation flow path (including the ED stack), and $\eta_{pump}$ is the efficiency of the pump; and the electrical power, $P_{el}$, utilized by the stack via the voltage, V, applied to its electrodes, $$P_{el} = \frac{IV}{\eta_{power\,supply}}, \tag{2}$$

where I is the total current drawn by the ED stack, and $\eta_{power}$ supply is the efficiency of the power supply.

Ohm's laws imply that l directly scales with the voltage, V, as follows:

$$V = V_{el} + V_{mem} + iR, \text{ where } i = \frac{I}{A}, \tag{3}$$

where Vel is electrode potential difference; Vmem is the potential across all membrane pairs; and A is the active area of a single membrane. In real systems, there are spatial-concentration and current-density variations within the stack. A finite difference model, previously validated in Wright 2018, was used to account for this phenomenon. The present work uses simplified equations since this model is not fundamental to the reader's understanding. The exact equations including spatial discretization for time-variant ED systems can be found in the work published by W. He, et al., "Field Demonstration of a Cost-Optimized Solar Powered Electrodialysis Reversal Desalination System in Rural India," 476 Desalination 114217 (15 Feb. 2020) (hereafter, "He").

In the ED stack, ion removal from diluate channels in the stack is driven by the local current density $$i = \frac{I}{A}.$$

The back-diffusion in the membrane channels and the salt accumulation in the stack are negligible compared to the current-driven mass transfer. Hence, the diluate-tank instant desalination rate is proportional to the total current, I, and, therefore, scales with voltage, V, as follows:

$$\frac{dC_{d,tank}}{dt} = \frac{N\phi I}{zFV_d} = \frac{N\phi I}{zFA} \frac{V - V_{el} - V_{mem}}{R}. \tag{4}$$

We derive here the optimal voltage and flow rate control strategy for maximizing the desalination rate while utilizing all the instantaneous solar power available to the PV-EDR system. At any instant, t, the solar power, $P_{sol}(t)$ (or fixed power or wind power, etc.) can be fully and directly consumed by choosing V(t) and Q(t) such that $$P_{el}(V(t)) + P_{pump}(Q(t)) = P_{sol}(t) \tag{5}$$

where $P_{sol}(t)$ is the instant solar power available. Even though salt removal and power consumption can be independently controlled with V and Q, the limiting current density adds a constraint on the salt removal rate in brackish water ED. The current density, i, must not exceed the limiting current density, $i_{lim}$:

$$i \leq i_{lim} = \frac{zFkC_d}{t^{MEM} - t}, \tag{6}$$

with $k \propto \sqrt{Q}$ (for the type of membrane spacers considered), where z is the valence of the ion, where k is the boundary-layer mass transfer coefficient, where $t_{MEM}$ is the transport number of the counterion in the AEM or CEM membrane, and where t is the transport number of the ions in the bulk solution, where their concentration is $C_d$. The specific values for those parameters can be found in Wright 2018. Above limiting-current density, water splitting occurs in ion-depleted boundary layers. This phenomenon enforces a flow-rate-dependent upper bound for the stack voltage. To maximize the rate of ion transport, we choose to always operate at a high but safe fraction, $r_i$, of $i_{lim}$. Hence, $$i(V(t))=r_i i_{lim}(Q(t)). \qquad (7)$$

It follows from Eq. (5) and Eq. (7) that, for a given solar power availability, there is a unique V(t), Q(t) combination that will maximize the salt-removal rate. We refer to this combination as the "optimal" control strategy. It can be implemented by a feedforward controller that uses the available power, $P_{sol}(t)$, as an input and solves the following system of equations (8) at a fixed interval, Δt.

$$\begin{cases} i(V) = r_i i_{lim}(Q), \\ P_{el}(V) + P_{ump}(Q) = P_{sol}(t). \end{cases} \qquad (8)$$

Using this strategy, He experimentally validated that actively controlled electrodialysis systems can concomitantly (1) flexibly operate at arbitrary power levels instead of needing to follow the decreasing power-consumption pattern observed in constant operation and (2) maximize desalination performance with reduced batch times. Herein, we leverage these results for an intermittent solar-power input, which means that the desalination load can follow the shape of any daily solar profile, $\{Psol(t)\}_{t=0\ldots 12AM(24\ hrs)}$, and desalinate faster under high irradiance in order to produce the required freshwater volume only using direct energy from the sun. This operation is further referred to as "flexible operation."

Here, we explore, with simulations, the potential of the instantaneous optimal control strategy for increasing the daily performance of PV-EDR. A PV-EDR system in flexible operation is simulated by interfacing the feedforward controller, described above, with the model of time-variant PV-EDR, using Python 3.6 programming. The objective is to benchmark flexible operation against constant operation for the case of a typical community-scale PV-EDR system and predict how voltage and flow rate are actively controlled through the day to achieve high levels of direct renewable energy utilization, adapt desalination rate to solar power level, and thereby reduce desalination time and battery needs compared to constant operation. The PV-EDR system design and local conditions (irradiance and feedwater salinity) for this simulation are the same as for the experimental set up eventually used and summarized infra.

Figure 4:
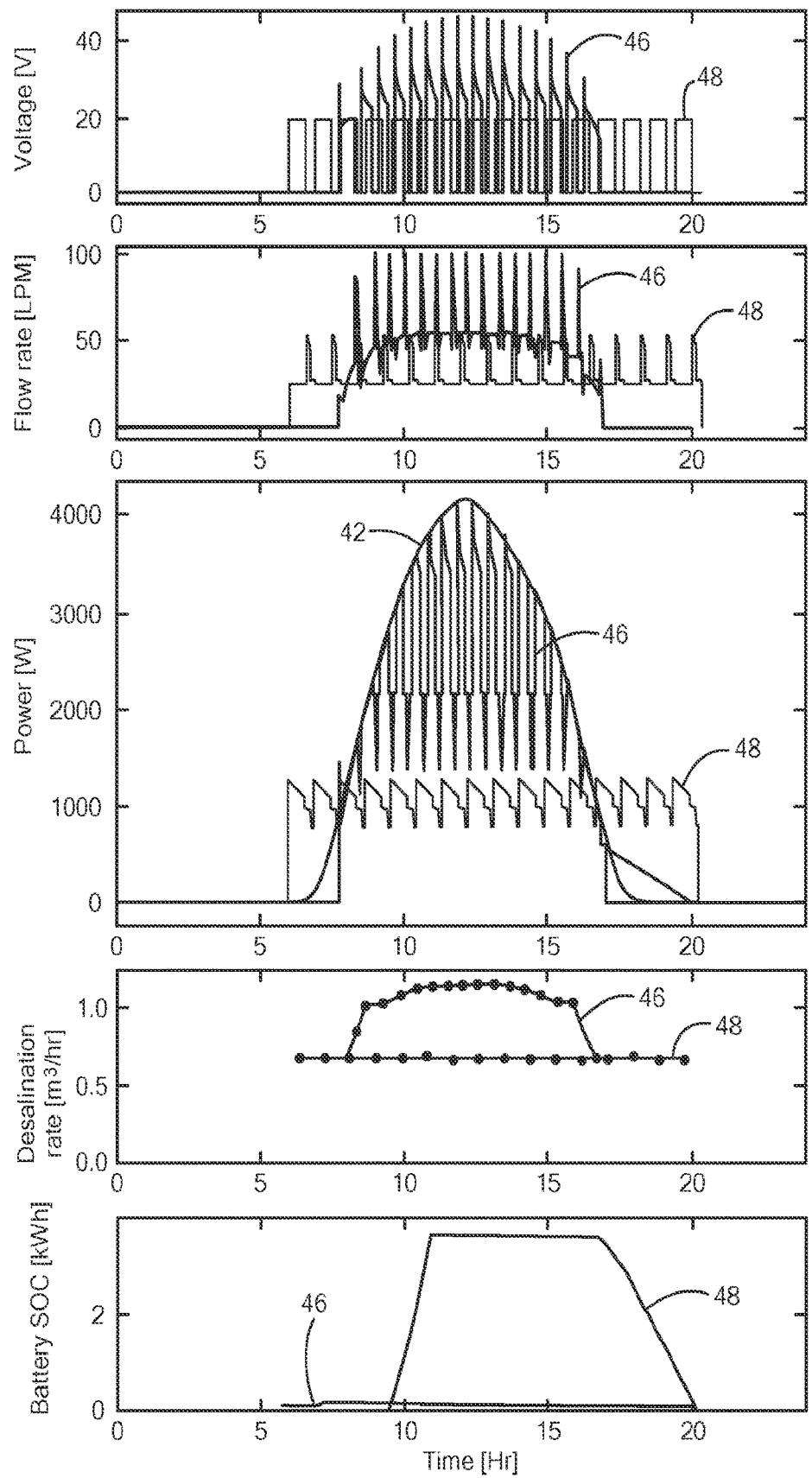
FIG. 4 is a series of plots from a simulation of the daily time-variant operation of a PV-EDR system using a flexible control strategy. The voltage and flow are adjusted in real-time to maximize desalination rate while using all the instant solar power available. As a result, the ED power consumption closely follows the solar power profile, consuming 82% of the solar energy directly to generate the same amount of water only within daytime, 1.76 times faster compared to the traditional ED constant operation. The required battery capacity 46 in flexible operation is 1.6% the battery capacity 48 required in constant operation, as showed by state of charge (SOC).

FIG. 4 shows how flow rate and voltage are varied through the day in flexible operation. At every instant, the ED module consumes a maximum portion of solar energy available while always operating at limiting current density. As a result, the batch average desalination rate adapts to the solar energy available, which guarantees higher water throughput in the middle of the day to eventually maximize total freshwater production during solar hours. It was predicted that this new operational strategy allows the flexible PV-EDR system (plot 46) to capture 82% of the solar energy available for direct use, which is almost twice that of the constant operation scheme 48 (42% for direct use). By doing so, it produces 6.7 m³ in 56% of the time taken by the conventional system, and the required battery capacity for sustaining this production is reduced from 4.84 kWh to 0.08 kWh compared to constant operation. The predicted performance of flexible operation is particularly promising in terms in cost savings—a small battery capacity implies substantially lower capital expenditure (capex) and a reduced operation time decreases operator cost.

The simulation of the daily time-variant operation of the PV-EDR system using the flexible control strategy includes plots of (from top to bottom) voltage, flow rate, power, desalination rate, and battery state of charge (SOC), each as a function of time. Voltage 46 (top plot) and flow rate 46 (second-from-top plot) in the flexible operation are adjusted in real-time to maximize the desalination rate while using all of the instant solar power available 42 (third-from-top plot). As a result, the ED power consumption 46 (also in third-from-top plot) in the flexible operation closely follows the solar power profile 42, consuming 82% of the solar energy directly to generate the same amount of water only within daytime, 1.76 times faster compared to the traditional ED constant operation 48 (shown in each plot). The required battery capacity in flexible operation is 1.6% of the battery capacity required in constant operation, as showed by state of charge (SOC) 46 in the flexible operation.

Pilot-Scale Validation of the Flexible Direct Solar Energy Utilization and Significant Reduction in Battery Needs After creating the relevant control theory for flexible PV-EDR systems, we experimentally validated its feasibility and performance using a full-scale pilot PV-EDR system at the Brackish Groundwater National Desalination Research Facility (BGNDRF) in Alamogordo, NM In this section, we present the software- and hardware-control architecture that was designed and built for realizing the flexible operation with a time-variant voltage and flow rate. We then describe the full-day experiments that were run for assessing the performance of the flexible PV-EDR under various solar conditions. Finally, we discuss the experimental results in terms of direct solar energy utilization, flexibility of water production, battery savings, and reduction in operation time.

Figure 5:
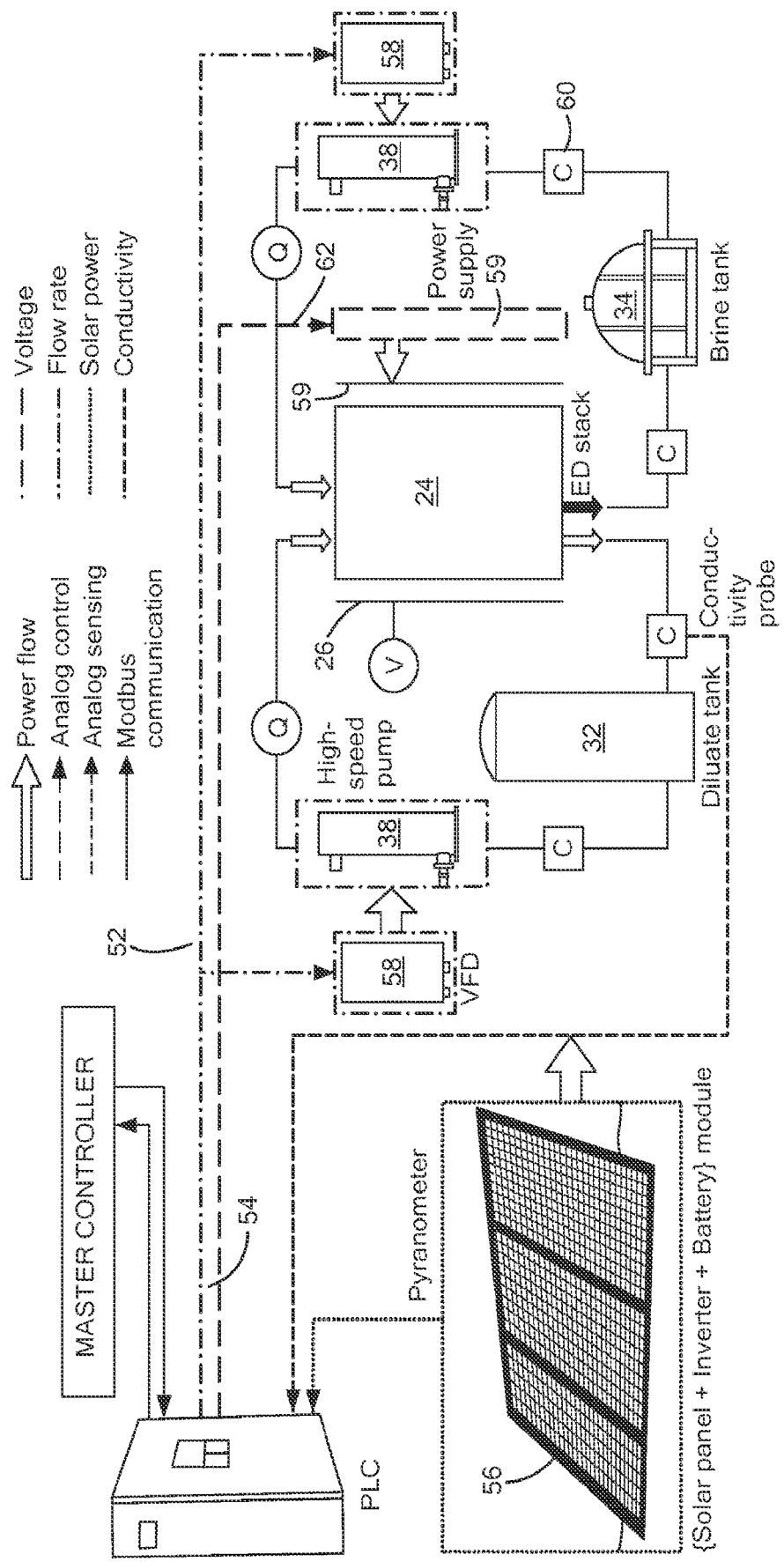
FIG. 5 shows an exemplification of the hardware and software PV-EDR control architecture designed and built at the Brackish Groundwater National Desalination Research Facility (BGNDRF), New Mexico, US. It implements in real-time the optimal control strategy created for varying the ED stack voltage and pumping flow rate.

An exemplification of hardware and software control architecture for a PV-EDR system is shown in FIG. 5. It implements in real-time the optimal control strategy created for varying the ED stack voltage and pumping flow rate. Details about the hardware components (brand, model) can be found in Table 1, below. As shown therein, the controller is in the form of a programmable logical controller (PLC, running software—e.g., in the form of PYTHON code) in communication with a pyranometer that monitors a module including solar panels, an inverter, a battery, variable-frequency drives (VFD), a power supply, and a conductivity probe.

The real-time monitoring and control architecture to implement flexible operation, detailed in FIG. 5, includes the following:

a feed-forward, model-based master controller 52 running in Python 3.6 code in real time; it uses sensor readings (obtained with a 100-Hz sampling rate) and the time-variant ED control theory to compute the optimal pumping flow rate (and corresponding pump speed, σ) and ED stack voltage, V, that maximizes desalination rate and instantaneous solar energy consumption, every three seconds;

a programmable logic controller 54 communicating (1) with the master controller 52, sending sensor readings and receiving optimal values for V and σ, and (2) with the system control hardware, sending analog control signals for V and σ and sampling analog signals from the sensors 60 and 62;

a pyranometer located at the center of the solar array 56, wherein the pyranometer senses the incoming irradiance on the solar array 56 and is calibrated to convert that irradiance into the generated solar power;

four inline probes 60 sensing the diluate and brine conductivities at the inlet and outlet of the ED stack;

a programmable DC power supply 59 that supplies the voltage, V, dictated by the PLC signal to the ED stack 24, using an internal feedback control loop; and two variable-speed controllers 58 that control the motor speed of two high-speed pumps 38, with an internal feedback control loop using the PLC signal as a reference.

The specific hardware components used for these experiments are detailed in Table 1, below.

TABLE 1

Detailed hardware used in the experimental setup

| Component | Model | Manufacturer |
|---|---|---|
| ED module | | |
| ED stack 24 | AQ3-1-2-50-35 | Suez Water Technologies |
| pump 38 | 3SV-11 (60 Hz) | Xylem Goulds |
| Power module | | |
| mobile solar-power system 56 | MOJAVE-3 (4.6 rated kW) | Solarover |
| Sensors | | |
| conductivity probe 60 | CDCE-90 | Omega |
| conductivity controller | CDCE-91 | Omega |
| pyranometer | SP-215-SS | Apogee Instrument |
| flow meter 62 | FP1400 | Omega |
| pressure transducer | PX309 | Omega |
| Controls | | |
| variable-frequency drive (VFD) 58 | AQUAVAR IPC | Xylem Centripro |
| DC power supply 59 | GEN60-25 Full Rack | TDK-Lambda |
| programmable logic controller (PLC) 54 | C0-04AD-1, C0-04AD-2, C0-04DA-2 | ClickPLC |

The experimental system (Table 3, infra) closely reflects typical design parameters and operational conditions for a community-scale PV-EDR system sized for producing 6 m$^3$ of freshwater per day. Real groundwater from a well at BGNDRF was used as feed water, with an average starting salinity of 970 mg/L. The composition of this groundwater is provided in Table 2, below.

TABLE 2

The major constituents in brackish groundwater from a well in BGNDRF

| Parameters | Value |
|---|---|
| $Na^+$ [mg/L] | 293 |
| $Mg^{2+}$ [mg/L] | 12.6 |
| $Ca^{2+}$ [mg/L] | 54.6 |
| $Cl^-$ [mg/L] | 38.1 |
| $SO_4^{2-}$ [mg/L] | 504 |
| alkalinity, carbonate [mg/L] | 161 |
| total dissolved solids (TDS) [mg/L] | 995 |
| conductivity [μS/cm] | 1,500 |

This pilot system was built with a battery capacity of 20 kWh, which is more than the capacity needed for constant operation according to simulation results. This arrangement allowed us to seamlessly run tests in either constant or flexible operation to compare their performance. A conservatively low recovery ratio of 60% was chosen because the experimental set up did not include an automated acid rinse for mitigating scaling in brine channels. The benefits of flexible operation were assessed independently from the recovery value, while long-term testing run in parallel at Tata Projects Ltd. headquarters in India confirmed that an ED module with acid rinse can achieve 80% recovery in practice.

TABLE 3

Design and operation parameters for the experimental PV-EDR set-up built and operated at the BGNDRF, Alamogordo, NM, US

| Design Variables | Value |
|---|---|
| ED module | |
| Membrane Width [cm] | 19.7 |
| Membrane Length [cm] | 168 |
| Number of ED cell pairs | 30 |
| ED Batch volume [m$^3$] | 0.42 ± 0.01 |
| Recovery ratio | 60% |
| Power module | |
| Solar panel area [m$^2$] | 37 |
| Solar panel inclination angle | 30° |
| Battery capacity [kWh] | 20 |
| Operational parameters | |
| Voltage (constant operation) [V] | 19 ± 0.1 |
| Flow rate (constant operation) [LPM] | 25 ± 1 |
| Linear flow velocity (constant operation) [cm/s] | 10 |
| Limiting current density safety factor, $r_i$ | 70% |
| Control interval [s] | 3 |
| Sampling interval [s] | 0.01 |
| Logging interval [s] | 1 |

Figure 8:
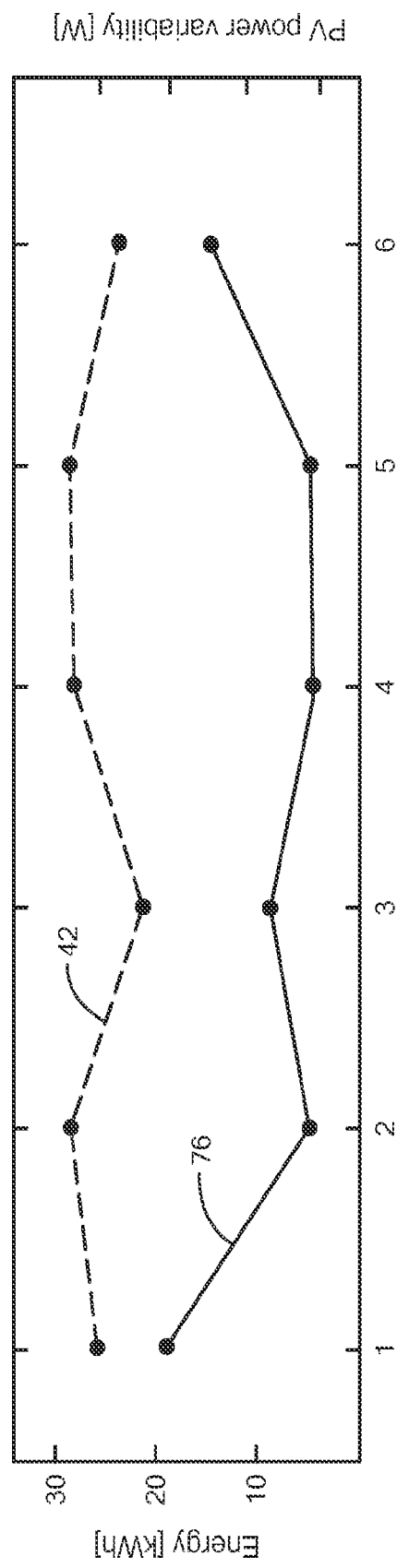

The system was operated using the flexible strategy over six full days under various weather conditions accounting for a broad spectrum of daily input solar power profiles, both in terms of total solar energy available 42 for the day and variability of solar power 76 (FIG. 8). The solar power available 42, power consumption 46/48 of the ED system and cumulative water production were recorded every one second during the whole duration of the operation (on average 8.9 hours). For a benchmark, the system was also run during one day in constant operation. Constant and flexible operations could not be run on the same day; however, in constant operation, voltage and flow rate repeatedly take the same value every batch; and, thus, each batch exhibits the same power-consumption pattern 48. The power-consumption profile for achieving a given number of batches is independent of the shape of the input solar power; and single-batch data can, therefore, be extended to multiple batches and compared with flexible operation on any day.

Figure 6:
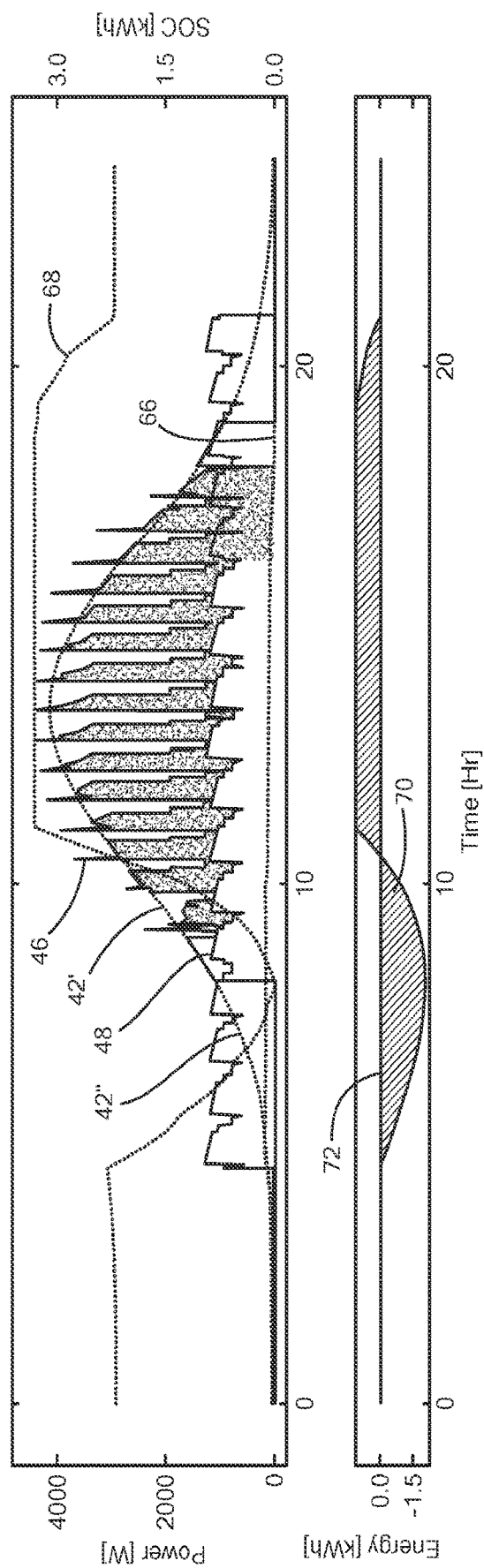
FIG. 6 plots experimental results from two daily tests (one day of constant operation and one day of flexible operation) on a full-scale flexible-operation PV-EDR pilot system in New Mexico. Raw power profiles are extrapolated to a complete and common full day. The difference between generated and consumed power over time is analyzed to derive the integrated flow into batteries, the minimum battery capacity required by a real installation to produce the desired water demand and the corresponding state of charge.

The results of a full-day experiment in flexible operation from two daily tests (comparing a constant-operation day with a flexible-operation day) on a full-scale flexible-operation PV-EDR pilot system in New Mexico are presented in FIG. 6. Raw power profiles 46 are extrapolated to a complete and common full day. The difference between generated and consumed power over time is analyzed to derive the integrated flow 72 into batteries (by contrast, the integrated flow 70 into batteries is much greater in constant operation), the minimum battery capacity required by a real installation to produce the desired water demand and the corresponding state of charge 66/68. The raw ED- and solar-power profiles validate the performance of the model-based control strategy for matching the instant power consumption to the solar power available. During the experiment, the PV-EDR system was able to use directly 75% of the solar energy for desalination.

In practice, this fraction is limited because the maximum pumping speed limits flow rate and, therefore, voltage during high-power desalination batches around midday. Similarly, there is a safe maximum flow rate during filling and draining of recirculation tanks, which then limits power consumption. Although these limits are accounted for in simulations, the experimental fraction of solar-energy use is lower than the simulated one due to longer fill/drain cycles in manual operation. At the beginning of each batch, the controller-estimated current drawn by the ED stack has higher uncertainty and leads to the power overshoots observed. However, the duration of these overshoots is low enough that a small battery capacity would be sufficient for sustaining operation. For quantifying the exact battery capacity required during a full day, the raw solar profile is extrapolated beyond the experimental schedule using a Gaussian fitting method.

The solar profile 42 is then used as input for simulating the extended ED power consumption (FIG. 6), which plots experimental solar power 42', extrapolated solar power 42" (Gaussian fit), ED-flexible-power consumption 64 (extrapolated when not filled) ED-constant-power consumption 12 (extrapolated when not filled), battery SOC 66 in flexible operation (back-calculated), and battery SOC 68 in constant operation (back-calculated) in the top plot. The bottom plot of FIG. 6 tracks integrated flow 70 into the battery (constant operation) and integrated flow 72 into the battery (flexible operation). The constant-operation power profile 48 that achieves the same water production is extrapolated from the raw results of the constant-operation test. For each operation, the difference between generated and consumed power over time is analyzed to derive the integrated flow into the batteries (assuming 100% battery charge and discharge efficiency). This difference determines the minimum battery capacity that would be required by a real installation to sustain these flows. Based on our analysis, on that specific day, 17 desalination batches can be achieved in 10.8 hours using only a 0.11 kWh battery, which is only 3% of the capacity needed to achieve a similar water production in constant operation and a 33% reduction in daily operation time.

Performing this analysis over multiple daily experiments allowed us to verify that flexible operation consistently achieves significant performance (in terms of the daily volume of water produced 74) increase compared to constant operation under variable weather conditions (FIGS. 7-11). We present here the quantitative benefits of flexible operation derived from the six-day experimental data and discuss their implications for realizing low-cost, flexible PV-EDR systems.

Figure 9:
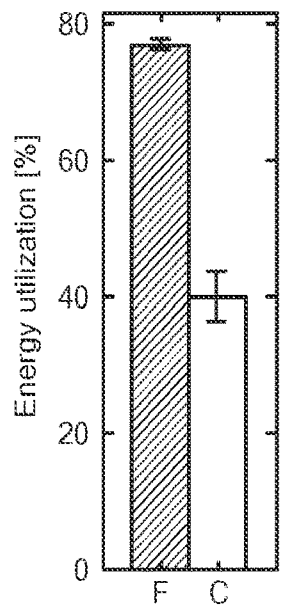

The flexible PV-EDR system was able to directly capture, on average, 76.5% of the solar energy available during the experimental operation time (FIG. 9, which plots the direct solar energy utilization for flexible, F, and constant, C, operation). This fraction was 91% higher in flexible operation than in constant operation, when only 40% of the solar energy available was directly captured on average. Moreover, despite significant variations in the solar-profile shape (as shown by the plots of a representative solar profile 42 and solar power output variability 76 in FIG. 8) over the six days, a consistent fraction of solar energy was utilized, which means that the amount of energy effectively used for desalination can scale with the solar availability and is not limited by a set battery capacity on high-irradiance days. This capacity for scaling reduces the amount of solar energy "wasted" compared to constant operation and, therefore, potentially reduces the required solar-panel area.

Figure 7:
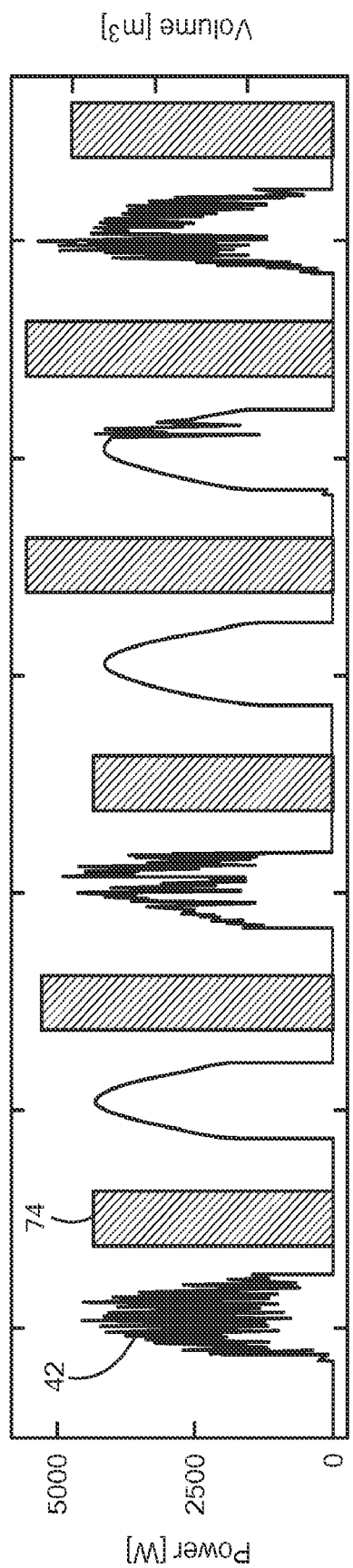
FIGS. 7-11 are plots of experimental performance of flexible operation of a PV-EDR system compared to constant operation over six days. The experiments were run at BGNDRF.

Because the solar-energy utilization reaches similar levels independently of the daily amount of solar energy, the total water production is greater on a day with a high amount of solar energy available and a suitable power profile. In the same way, the desalination rate is adaptive to time-varying solar power at small time scales, water production flexibly follows solar input at the daily time scale (FIG. 7). This flexibility can be leveraged for answering a constant water demand by using a tank to store water from one day to the other. This is a priori a much cheaper storage method than batteries used in conventional solar-powered systems for storing energy in between days. For a specific energy consumption (SEC) of 2 kWh/m$^3$, which is the order of magnitude of SEC for community-scale EDR systems of interest, storing the equivalent of 1 m$^3$ of water in batteries costs $600 while a 1-m$^3$ storage tank is estimated to cost $98. (Table 4, infra). This alternative storage method already contributed to reducing the capex of constant, community-scale PV-EDR; and even greater benefits can be anticipated in the flexible operation case.

Figure 10:
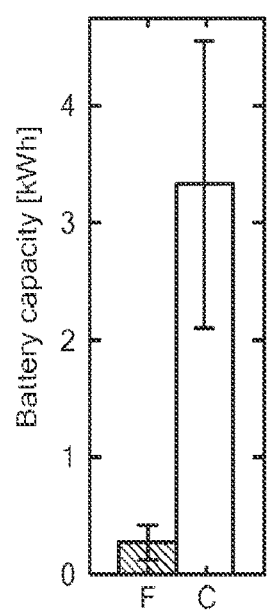

The minimal battery capacity that would have been needed to sustain each daily operation is reduced by 92% in flexible (F) operation (on average, 0.27 kWh) compared to constant (C) operation (on average, 3.3 kWh) (FIG. 10). In these experiments, the small battery is still used for energy buffering on timescales on the order of seconds, especially at the beginning of the batch.

Figure 11:
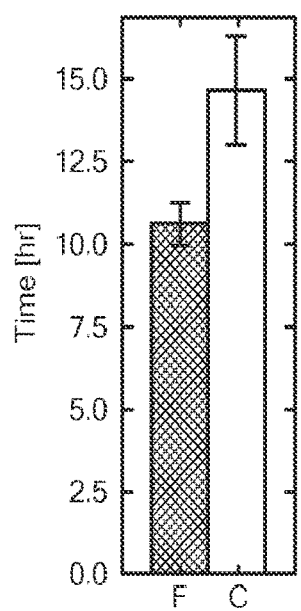

The flexible (F) ED system is up to 54% faster than constant (C) operation for achieving the daily freshwater production (FIG. 11, which plots daily operation time). Indeed, flexible operation maximizes the desalination rate subject to the solar power available and can speed up desalination at high-irradiance times. The reduction in operation time can proportionally reduce operator costs.

Balancing Flexibility with ED Desalination Efficiency with Batteries

Eliminating batteries presents a number of advantages given that they generate high upfront costs and tend to degrade quickly in hot climates. However, both simulation and experiments of the flexible PV-EDR system behavior reveal that adding one or more batteries may bring a significant improvement to the PV-ED system performance. Thus, the use of a battery may potentially reduce the LCOW of the water produced despite increased capital expenditures.

Because of gaps in peak-power operation caused by the fill/drain cycles, as well as the practical limitations in flow rate mentioned in the previous section, the fraction of daily solar energy directly used by the PV-EDR system is limited to a value between 75% and 90%. This value depends on the duration of filling and draining cycles and, therefore, the level of automation in the system, as well as the relative sizing of solar panels and pumps. Even with an optimal design and a fully automated direct-drive system, at least 10% of the solar energy would be wasted. One strategy to re-use this energy is to store it in batteries and keep it for later use in water production.

The experimental results (FIG. 6) show that the power consumption of the ED system sometimes overshoots the solar energy available, especially at the beginning of the batch. The voltage step applied to the ED Stack generates a transient in the stack outlet conductivities with a characteristic time smaller than the control time step. The conductivity readings are used by the controller to predict the current, I, using an ED model. Furthermore, the transients appear at the conductivity sensor after a time delay because the sensor is located in piping outside the stack. Therefore, the controller-estimated current drawn by the ED stack has higher uncertainty and leads to the power overshoots observed. Managing these overshoots involves either of the following approaches:

refining the control strategy at the beginning of the batch by modeling the transient behavior in the feedforward control or implementing closed-loop control of the power consumption with feedback; or adding a capacitor or a small battery capable of powering these overshoots with stored energy from previous batches. We showed experimentally that the order of magnitude of the battery capacity required is 0.1 kWh. If a battery is already installed, it can easily be used for managing this phenomenon without significantly increasing the battery cost.

The specific energy consumption (SEC) measures the total amount of energy required for desalinating 1 m³ of feed water and, therefore, the efficiency of converting energy into water. The SEC of electrodialysis processes increases with the ED-power PED. This phenomenon can be understood intuitively by remembering that the scaling relationships for consumed power and desalination rate are presented, above. In general, pumping power scales with $\Delta PQ$; and the affinity laws for centrifugal pumps show that, in our case, it scales with $Q^3$. Instead, the desalination rate scales with $\sqrt{Q}$ when the ED module is optimally controlled to operate as close as possible to the limiting current density. As a result, the ED system pays a high marginal pumping energy cost for increasing the desalination rate. Under high irradiance, the additional power draw largely stems from increased pumping speed while the current profile (and, therefore, desalination rate) flattens (FIG. 4).

Figure 12:
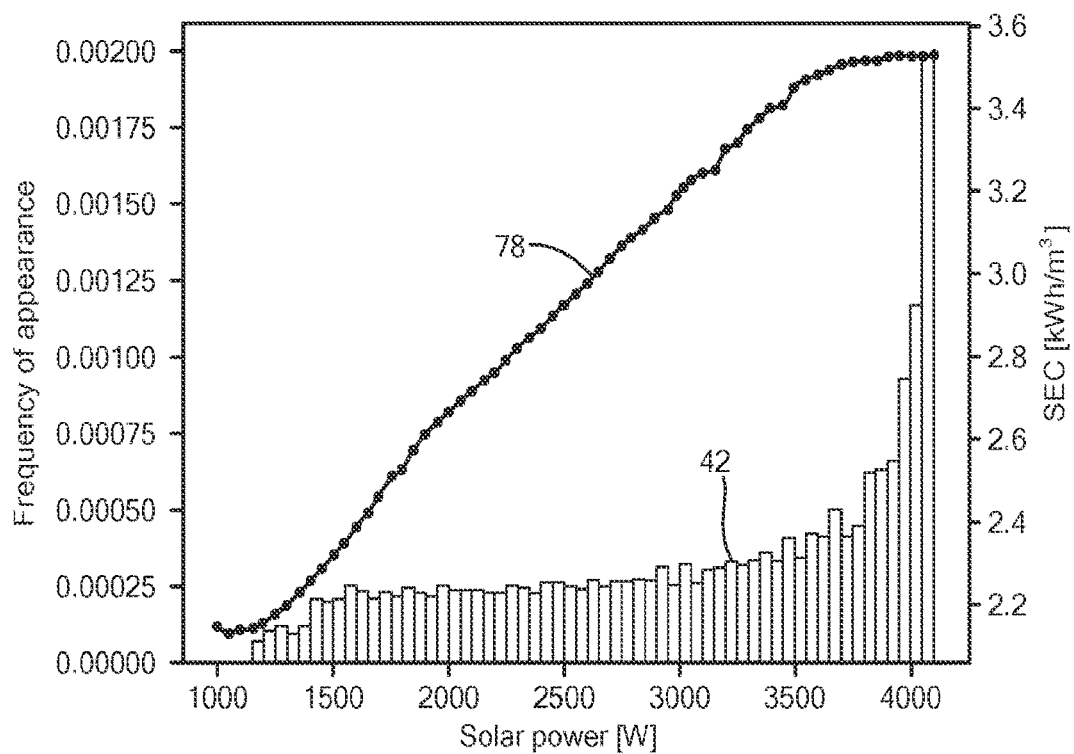
FIG. 12 plots specific energy consumption and experimental frequency of appearance as a function of solar power in a PV-EDR system.

In FIG. 12, which plots specific-energy consumption and experimental frequency of appearance as a function of ED power, we superimposed a histogram of the solar powers 42 experimentally recorded with the electrodialysis SEC curve 78. In a direct-drive system where the ED power matches the solar power available, a major part of the operation occurs at power levels where the efficiency of converting energy to water is low (high SEC). Instead, a maximum power threshold can be implemented for limiting the ED-power consumption. Solar power exceeding this threshold can be stored in a battery and used later at a lower operating power and at a lower SEC to produce a greater volume of desalinated water.

These considerations justify examining the addition of a battery in the PV-EDR system. In the rest of this section, we investigate how to adapt the flexible control strategy for PV-EDR systems in the presence of a battery in order to optimally use its capacity. We address the feasibility of implementing this new control strategy in practice by presenting a weather-prediction algorithm, and discuss the benefits in terms of water production and the trade-off between increased capital cost and reduced operating cost.

Below, we consider a flexible PV-EDR system with a given ED module; solar area, $A_{sol}$; battery capacity, $C_{batt}$; and latest shut-down time, $T_{end}$. The additional battery can be used to achieve the following:

store the energy that should not be directly used by the ED module to avoid desalinating at high ED power levels, and store the energy that cannot be directly used by the ED module because of practical limits in power consumption.

Controlling a PV-EDR system with a battery is a more-complex problem than a direct-drive control. At every control time step, a control decision is made that determines the three-way split of the solar power between the ED power supply, the ED pumps, and the batteries. At a given time, t, the control objective is not an instantaneous performance objective, such as maximizing the instant desalination rate, but rather is a daily objective—maximizing the daily water production: $V_{day,0 \rightarrow t_{end}}$. A daily objective guarantees that future returns are considered—namely, that there is a benefit to store a fraction of the solar power now to use it later, more efficiently.

As long as the total ED power remains the same, the specific balance between pumping power (via Q) and electrical power (via V) does not affect the behavior of the battery. The control problem can, therefore, be considered as a two-stage decision, detailed as follows:

given the solar power generated by the solar panels, $P_{sol}(t)$, and the battery state of charge, SOC(t), an optimal amount of power, PED,op(t), is provided to the ED system so that the global objective, $V_{day,0 \rightarrow t_{end}}$, is maximized; and given the power, $P_{ED,op}(t)$, provided to the ED system, the optimal ED stack voltage, V(t), and flow rate, Q(t), are computed for maximizing the instant desalination rate.

The control subproblem 2, above, has already been discussed and solved, above. We, therefore, focus here on subproblem 1, which can be formalized as follows:

$$\max_{P_{ED,op}(t)} V_{day,0 \rightarrow t_{end}} \quad (9)$$
$$\text{s.t. } (P_{ED,op}(t) - P_{sol}(t)).dt \leq SOC(t);$$

In other words, the battery is used to reshape the daily solar profile, {Psol}, into a more-suitable ED-power profile {$P_{ED,op}$} for maximizing the daily amount of water produced.

The control problem formulated above (Eq. 9) is easier to solve if the solar irradiance profile, {Psol}, is known in advance. In this case, the iterative decisions on $P_{ED,op}(t)$ can be made all at once, before starting the day. For a given daily solar power profile, {Psol}, we elucidated the optimal reshaped power profile, {$P_{ED,op}$}, under the following assumptions:

- the battery is only used for reshaping the solar power within one day; we therefore assume that the battery is empty at the beginning and at the end of the day;
- the battery has 100% charge and discharge efficiency;
- the aging of the battery is not a function of input/output energy flows and, therefore, not modeled as an additional cost;
- the ED module cannot fully consume the allocated power, $P_{ED,op}$, due to practical limitations; for every $P_{ED,op}$, the corresponding power effectively used by the ED module, $P_{ED,eff}$, was simulated; the complementary is not withdrawn from the battery;
- the ED module performance only depends on the average ED power, $P_{ED,op,avg}$, and not the specific power profile; and
- all of the solar energy generated, $E_{sol,day}$, should be consumed to avoid any energy loss.

Figure 13:
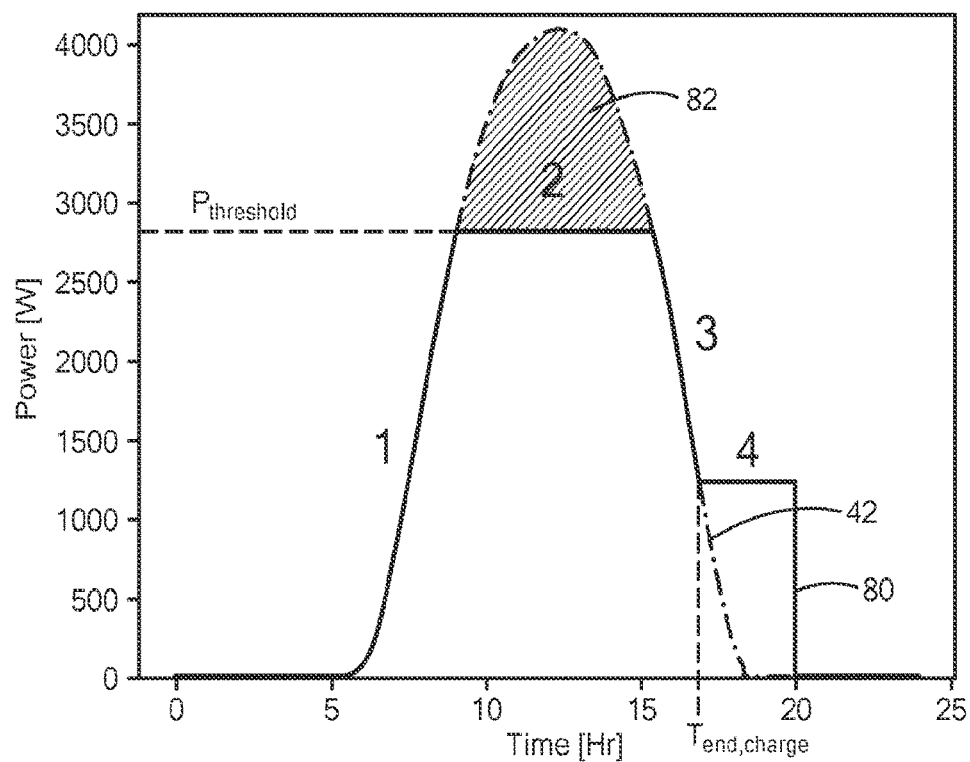
FIGS. 13 and 14 are plots of optimal reshaped profiles {PED,op} (in black) on a high-irradiance day (FIG. 13) and a low-irradiance day (FIG. 14). The power threshold varies from 2825 W to 610 W. The PV-EDR-system uses a solar panel area, $A_{sol}=37$ m$^2$ (similar as the experimental set-up in BGNDRF) and a battery capacity $C_{batt}=2$ kWh. On the high-irradiance day (FIG. 13), the average power is reduced by 21% compared to the direct-drive operation. On the low-irradiance day (FIG. 14), the average power is reduced by 17% compared to the direct-drive operation.
Figure 14:
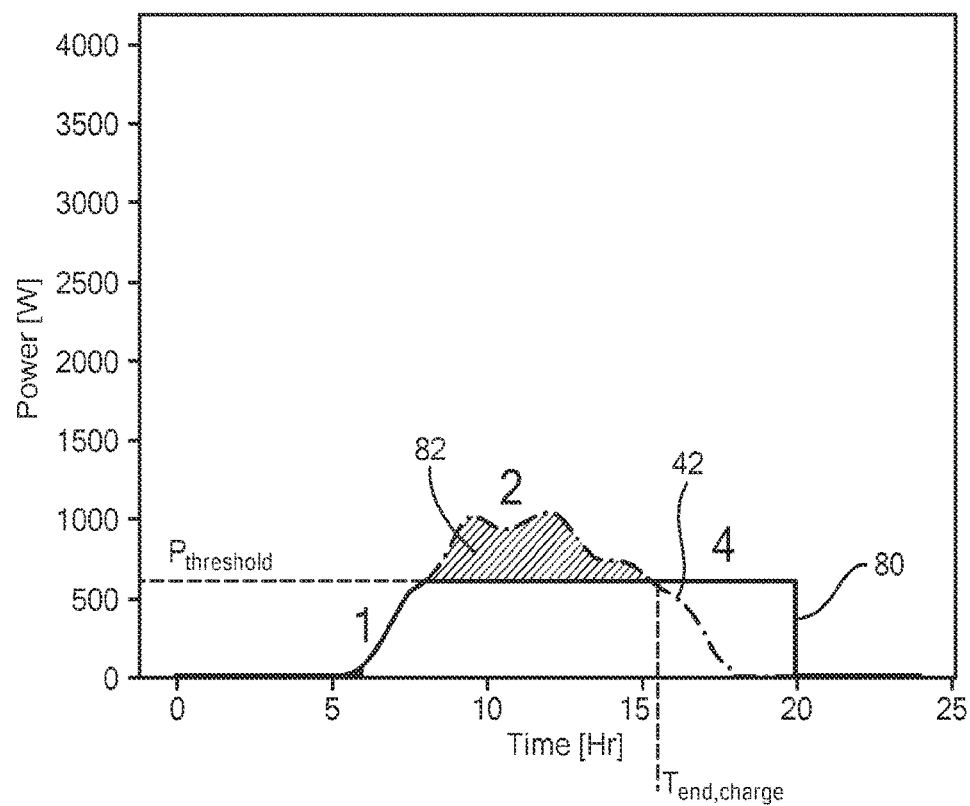

We have shown that the SEC is minimal when the ED power is minimal (FIG. 12). Thus, for a given daily amount of solar energy consumed, the total volume produced, $V_{day,0 \to t_{end}}$, is maximal when the average daily ED power, $P_{ED,op,avg}$, is minimal. It can be lowered by operating over a longer period than in the direct-drive case. If the shutdown time is $T_{end}$, the minimum $P_{ED,op,avg}$ achievable is expressed as follows:

$$P_{ED,op,avg} = \frac{E_{sol,day}}{T_{end} - T_{start}}, \quad (10)$$

where $T_{start}$ is the starting time of operation, fixed by the average solar-irradiance profile for a given system. There are many possible power profiles that have the same time-average. The optimal profile for $P_{ED,op}$ is the unique one that achieves the target average while minimizing flows in/out of the battery. This reshaped, optimal profile 80 is shown in FIGS. 13 and 14 for the following two extreme cases: a high-irradiance day (FIG. 13) and a low-irradiance day (FIG. 14). This profile 80 is referred to as "ideal" in the rest of this section, and the energy 82 transmitted to the battery is highlighted.

Battery usage is minimized by setting a day-dependent threshold, $P_{threshold}$, such that:
- below $P_{threshold}$, $P_{ED,op}$ follows $P_{sol}$ (Phase 1);
- after and until the battery is fully charged or charged enough to sustain the rest of the system operation, $P_{ED,op}=P_{sol}$; the battery stops charging at $T_{end,charge}$ (Phase 2);
- after $T_{end,charge}$, $P_{ED,op}$ follows $P_{sol}$ until reaching a power level that can be maintained until the end of the day using the energy stored in the battery (Phase 3); and
- the end of the operation occurs at that last power level (Phase 4).

An important feature of the reshaped power profile is that it can be fully described as follows:
- by a single parameter ($P_{threshold}$) offline—i.e., with full knowledge of the solar irradiance; and
- by two parameters ($P_{threshold}$, $T_{end,charge}$) online when only the current solar power, $P_{sol}(t)$, is known.

In other words, if the system can estimate these parameters online, it can derive the optimal ED operating power, $P_{ED,op}(t)$, at any time, t.

The method explained, above, assumes that the solar-power profile for each day is known in advance, which, in practice, is not the case. For implementing this method in the field, an online prediction allowing the system to vary the power threshold, $P_{threshold}$, depending on the daily solar profile is used. Ideally, the inputs to this online prediction routine are easily accessible data that do not require an internet connection so that the online method can be effectively used in remote areas. We sought a prediction algorithm taking PV-EDR design parameters, past irradiance data, and current system status (day, time, battery SOC, current solar irradiance) as input for predicting the optimal $P_{threshold}$ and corresponding $T_{end,charge}$ moving forward. As explained in the last section, knowing these two parameters suffices to compute the optimal ED operating power, now $P_{ED,op}(t)$. We investigated primarily machine learning (ML) algorithms for this prediction task.

An additional difficulty arises from the error on algorithm predictions in an online implementation. If at t−1, the algorithm predicted a $P_{threshold}$ lower than the ideal value, the battery will have charged more than it should have between t−1 and t. It will, therefore, become full before reaching $T_{end,charge}$; and the additional energy to be stored will be simply wasted. We, therefore, wrote a postprocessing routine that takes into account the current battery SOC, compares it to the remaining energy to be stored in the battery in the ideal scenario, and re-adjusts $P_{threshold,raw}$ into a new value, $P_{threshold}(t)$. In our example, $P_{threshold}(t) > P_{threshold,raw}$ in order to decrease the battery charge between t and t+1 compared to the ideal scenario and, therefore, counterbalance the error at the previous time step. Because the post-processing routine uses as input the remaining energy to be stored in the battery, $\Delta SOC_{t-T_{end}}$, this metric should also be predicted by the online algorithm. Using the new $P_{threshold}(t)$ and the predicted $T_{end,charge}$, the new optimal ED operating power is deduced.

Figure 15:
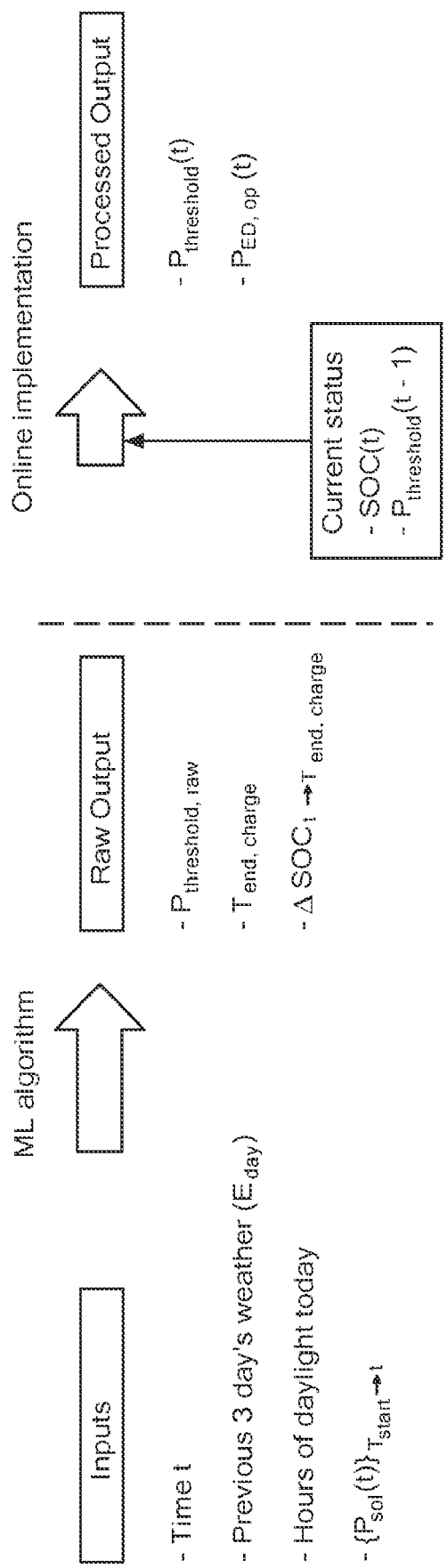
FIG. 15 illustrates a routine for implementing online the optimal control strategy of PVEDR-battery systems. $P_{threshold}(t)$ is updated every hour. Using the latest value of $P_{threshold}(t)$, $P_{ED,op}(t)$ is updated every 3 seconds.

The structure of the online implementation is shown in FIG. 15, which shows a routine for implementing online the optimal control strategy of PV-EDR-battery systems. $P_{threshold}(t)$ is updated every hour. Using the latest value of $P_{threshold}(t)$, $P_{ED,op}(t)$ is updated every 3 seconds.

The output of this algorithm is not irradiance specifically since we want to implement an end-to-end prediction of the power threshold. However, $P_{threshold}$ is directly linked to the solar irradiance, as indicated, above, and, therefore, should be predictable using similar techniques. A literature review of various methods used for irradiance prediction was done in order to select the prediction algorithm [Long, et al., "Analysis of daily solar power prediction with data-driven approaches," Applied Energy, pages 1-9 (2019)]. For the prediction horizon (1-10 hours) and type of input data considered, the most promising results are usually obtained using two types of supervised ML algorithms, a random forest (RF) and a fully connected neural network (NN). Scikit-learn, Ensemble Methods <scikit-learn.org/stable/modules/ensemble.html> and Neural Network Models <scikit-learn.org/stable/modules/neural_networks_supervised.html> provide an in-depth explanation of these algorithms.

As a preliminary investigation of strategies for battery management, we chose to implement the prediction algorithm in a simple case where $P_{threshold}(t)$ (output of the full routine) is re-computed every hour. We also trained a different ML predictive model for every hour between 6 AM and 8 PM. We therefore trained 14 models: $M_1$ (prediction at 6 AM), $M_2$ (prediction at 7 AM), ... $M_{14}$ (prediction at 7 PM).

A five-year data set of solar irradiance in Chelluru, India (2011-2014) was used for training and testing the two ML models (the process of generating this data set from available global irradiance data time series is further described, infra). For each day, j, the ground truth data were generated by computing the ideal reshaped ED power profile $\{P_{ED,op}\}j$ based on the solar power profile, and the corresponding parameters ($P_{threshold,j}$, $T_{end,charge\ j}$, $\Delta SOC_{t \to Tend}$). The mapping between input data and ($P_{threshold,j}$, $T_{end,charge,j}$) was then used as one data point in each model, M. For example, Mio uses the high-irradiance day in FIG. 13 to create the following data point:

INPUT:$t$=10 AM,$(E_{day-3}, E_{day-2}, E_{day-1})$,8 hrs, $\{P_{sol}\}_{T_{start} \to t}$ OUTPUT:$P_{threshold}$=2960 W,$T_{end,charge}$=5 PM,$\Delta SOC_{t \to T_{end}}$=1.8 kWh (11)

For each model, $M_i$, there are, therefore, 365*5=1825 examples, 90% of which are used for training, while the remaining 10% are used for testing. Training took in-total 15 minutes on average.

Figure 16:
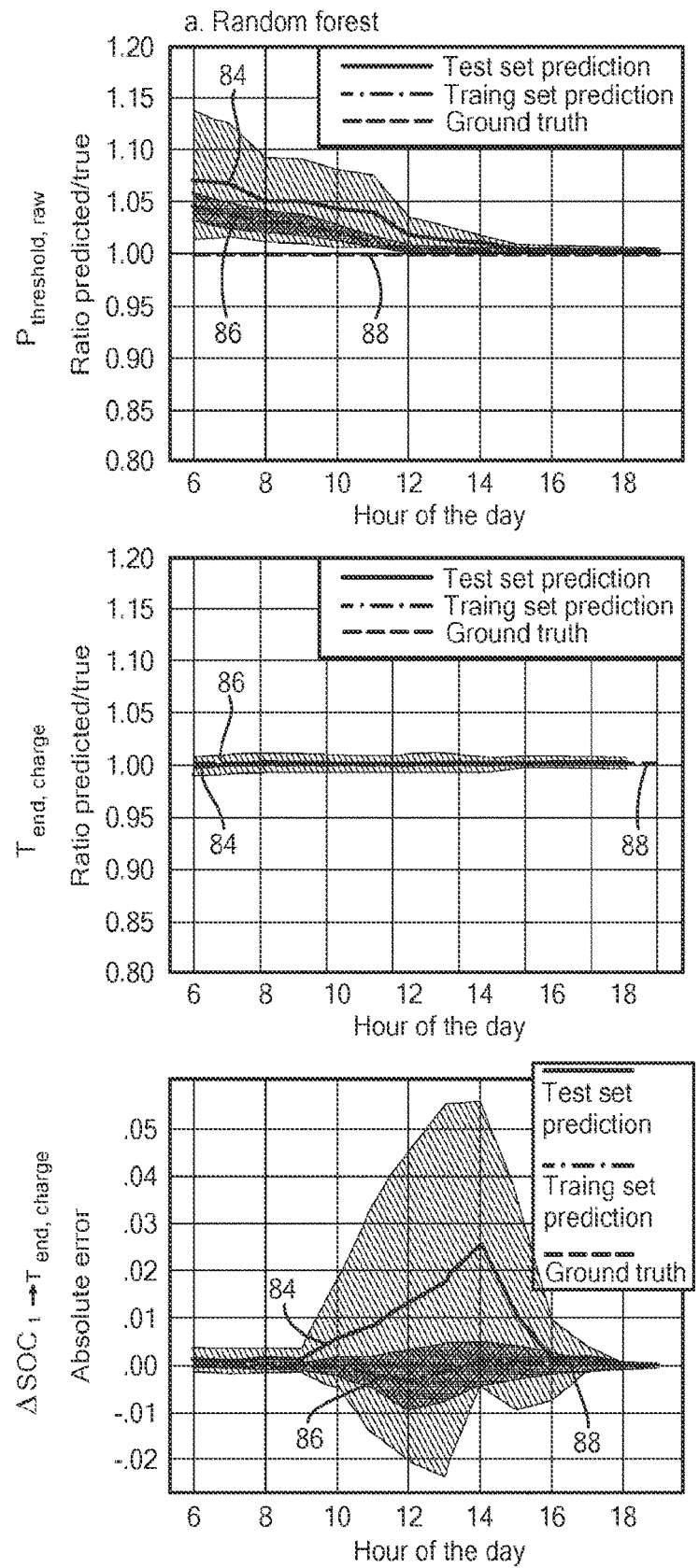
FIG. 16 includes plots of the raw performance of the machine-learning (ML) prediction algorithms (Random forest and Neural Network), detailed per output type. The lines represent the average performance across the test set, while the shaded areas represent the standard deviation.
Figure 16:
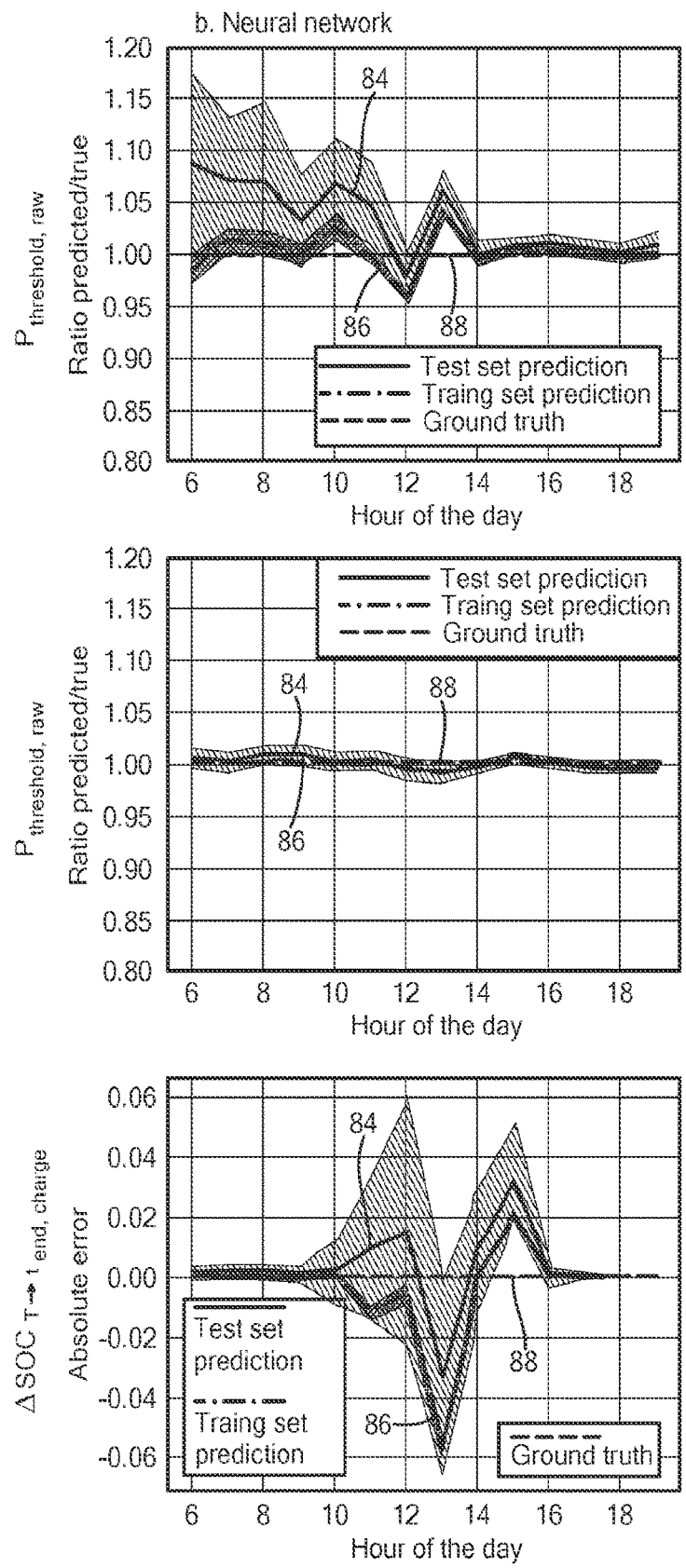

The performance of the two ML algorithms was assessed on 182 examples for every model, $M_i$, i=1 . . . 14. FIG. 16 shows the average and standard deviation of the prediction performance as a function of the time range of the models, $M_i$, for each of the three model outputs, where the raw performance of the ML prediction algorithms (Random forest and Neural Network) are detailed per output type. The lines represent the average performance across the test set, while the shaded areas represent the standard deviation, specifically for test set prediction 84, training set prediction 86, and ground truth 88. The prediction performance is either the ratio of predicted to ground truth value or the difference between predicted and ground truth value.

For both algorithms, the relative error is within 15% for the predicted threshold power and within 2% for the predicted end time of battery charge. The estimation error on $\Delta SOC_{t \to T_{end}}$ is less than 2% of the total battery capacity. As expected, these errors decrease as a function of time of the day—later in the day, a major part of the daily irradiance profile is known and used as input to the prediction. Although they can be significantly improved by refining the design and training of ML algorithms, these first results are satisfactory; and we used them in an online simulation of the PV-EDR-battery system behavior.

Figure 17:
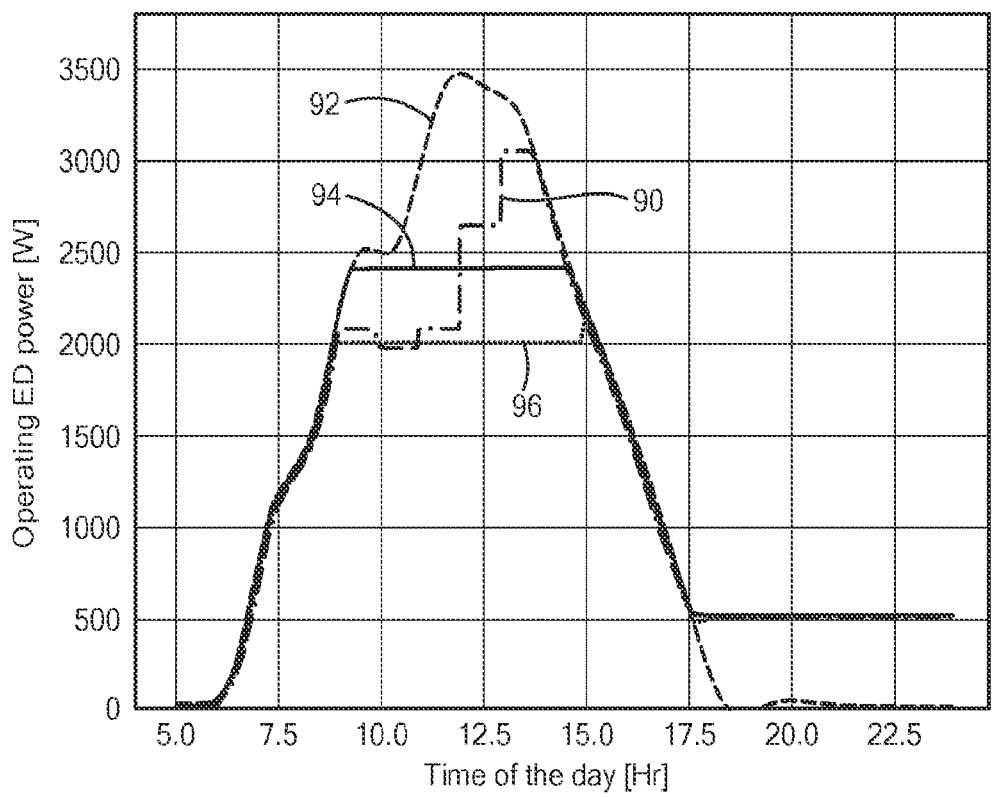
FIG. 17 plots a reshaped profile of ED operating power $P_{ED,op}$ on two different days, providing a comparison between various control strategies of a PV-EDR-battery system. In this scenario, the latest system shut-down time was set to 12 AM.
Figure 17:
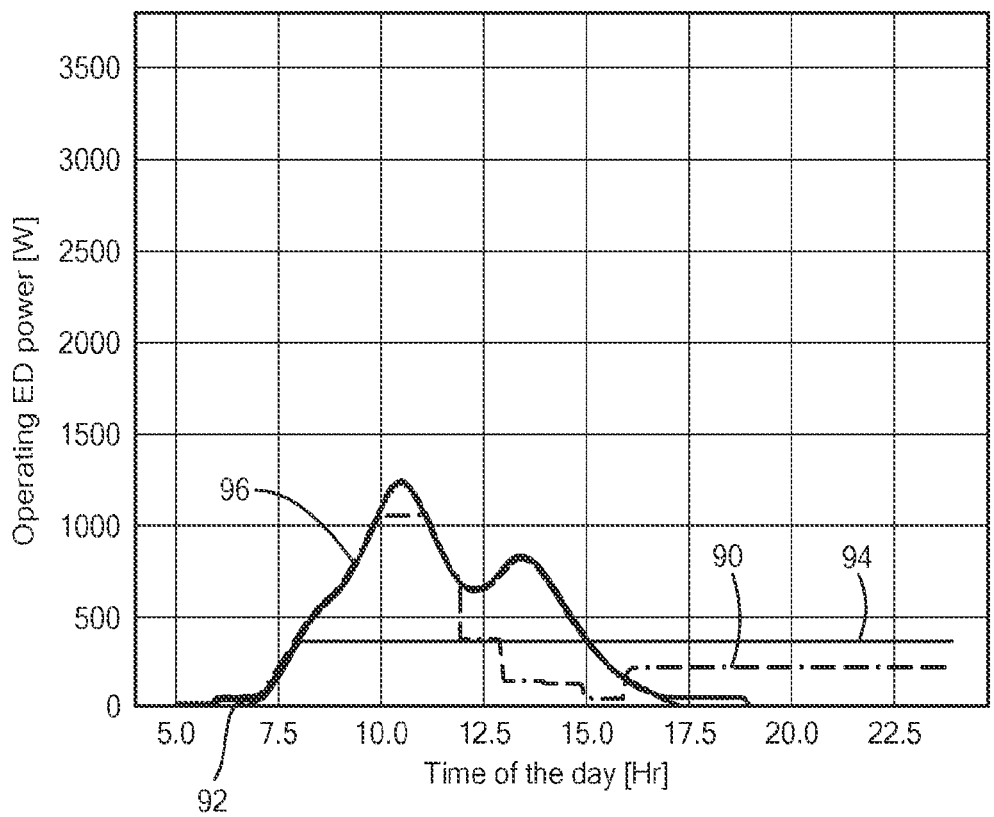

Above, we justified that controlling a PV-EDR system with batteries can be done by a two-stage decision process. In a first step, a decision is made to allocate $P_{ED,op}(t)$ to the ED module out of the total solar power available $P_{sol}(t)$. This decision uses the online routine summarized in FIG. 15. In a second step, the optimal voltage and flow rate (V(t), Q(t)) are computed using the optimal control strategy explained, above. We simulated the yearly behavior of a PV-EDR system that would implement in real-time this two-stage decision. The control time step is three seconds, similar to experimental conditions. In FIG. 17, we compare the control informed by online predictions 90 to the following three reference strategies:

the direct-drive control strategy 92, which always allocates $P_{ED,op}(t)=P_{sol}(t)$ to the ED module;
the ideal strategy 94 that would have been implemented with foreknowledge of the solar power profile; and
a "rule-of-thumb" strategy 96 that uses the same power threshold for every day of the year, based on the average irradiance profile.

FIG. 17 shows the reshaped profile of ED operating power, $P_{ED,op}$ on two different days with a comparison between various control strategies of the PV-EDR-battery system. In this scenario, the latest system shut-down time was set to 12 AM.

In the first plot of FIG. 17, the online prediction strategy 90 deviates from the ideal strategy 94 at the beginning of the day, probably because it anticipates a relatively low irradiance day, which causes it to set a lower power threshold. However, later in the day, it is able to predict the high amount of solar energy generated and, accordingly, increases the power threshold. At the end of the charging phase, a higher power threshold than the ideal one is implemented to correct for earlier prediction errors and to avoid wasting solar energy. This implementation confirms that the post-processing routine effectively takes into account the current SOC of the battery. The inverse behavior is observed on the second day. Similar profiles were computed for the entire testing set.

The metric of interest for assessing the concrete performance of a control strategy is the daily water production achieved under various solar-irradiance conditions. For each of the 182 days of the test set, we compared the daily water production for each strategy using a very high-level model of the PV-EDR system, which assumes that the daily production is a function of the average operating ED power, $P_{ED,op,avg}$, on that day and total solar energy available, $E_{sol,day}$, only. By using the mapping from ED power to specific energy consumption (SEC), the daily production, $V_{day}$, is as follows:

$$V_{day} = \frac{E_{sol,day}}{SEC(P_{ED,op,avg})}. \quad (12)$$

Figure 18:
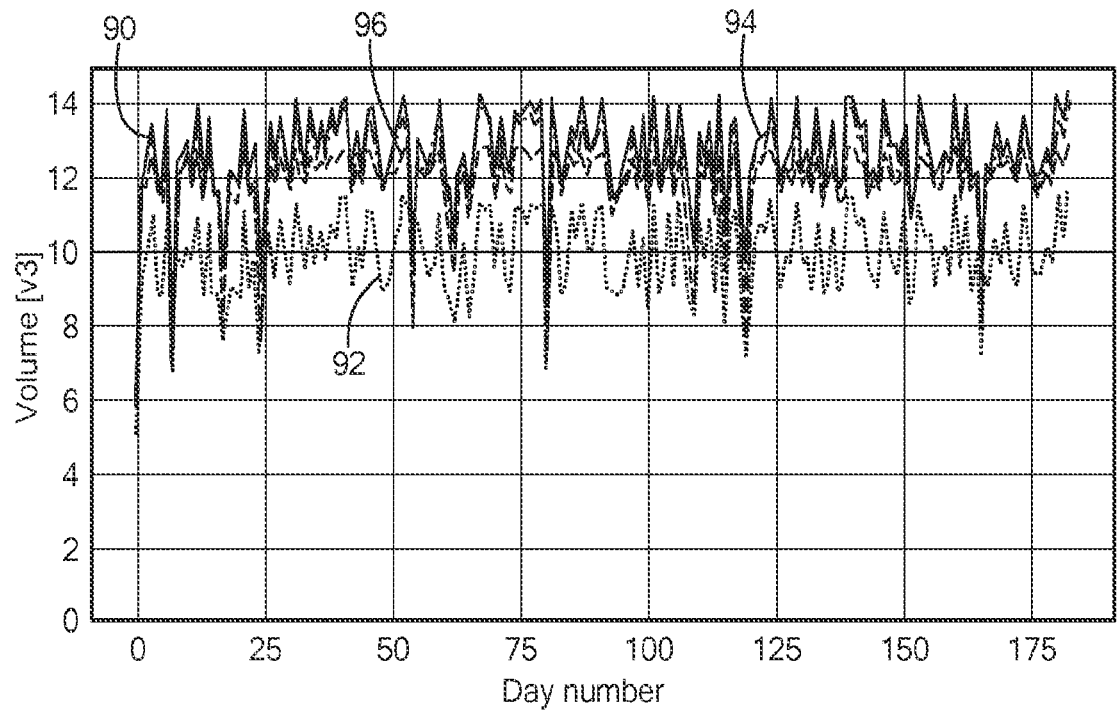
FIG. 18 plots water production for various control strategies of a PV-EDR-battery system, over 182 days.

The resulting time series of daily water production are displayed in FIG. 18. The direct-drive strategy 92 consistently produces less water than the other strategies that use batteries. This result is expected because batteries allow reshaping solar power over a longer operational window, thereby lowering the average operating ED power and increasing energy-to-water conversion efficiency. The direct-drive strategy 92, however, is also cheaper because it does require batteries. As expected, the best-performing strategy is the one using the full daily solar profile to predict the optimal reshaped profile. Adding a 3-kWh battery and allowing longer operation time can potentially increase the average daily production by up to 25%. This 25% improvement can only be achieved if the online control strategy performs close enough to the ideal strategy 94.

The strategy using online prediction 90 performs, on average, 4% better than the rule-of-thumb strategy 96y, and 20% better on a cloudy day. Cloudy-day performance is decisive for a reliable design and drives the sizing (and, therefore, the cost) of the power and ED module components. Similarly, for a given design, the reliably supplied volume, $V_{day}$, of a renewable-powered system is driven by its performance on cloudy days. By using the online prediction algorithm 90, $V_{day}$ can be significantly increased at no additional cost; and, therefore, the LCOW can be decreased compared to "rule-of-thumb" battery-management strategies 96.

The performance of the control strategy using online prediction 90 is only 0.2% lower than the performance of the ideal strategy 94 in terms of water production, both on average and on cloudy days. This near match means that the predictive algorithm, implemented as is, would already achieve most of the improvement benefits expected from shifting to the "rule of thumb" strategy 96 or to an ideal control strategy 94. In reality, we expect the performance of the online strategy to be lower than that predicted because the simple model used for evaluating performance did not take into account the daily variations in the operating ED power, which could bring up to about a 5% drop in performance.

Possible improvements include merging the models, $M_i$, into a unique model taking as input the continuous time, t, for more frequent updates, as well as optimizing the architecture of ML algorithms. These results, however, already suggest that the performance of the ideal strategy is almost matched using the predictive algorithm running online, as developed herein. Infra, we, therefore, consider an implemented online strategy that achieves the same performance as the ideal strategy. When running simulations, this strategy enabled us to use the foreknowledge of solar irradiance to compute the daily profile of ED operating power with low computational cost. Below, this optimal control strategy is included for PV-EDR-battery systems to produce a high-level design optimization framework. This framework provides insights as to the cost-optimal trade-off between batteries (for increased water production) and purely direct-drive operation (with lower upfront and operational costs).

Impact: Reduced Levelized Cost of Water for Improving Off-Grid Access to Clean Water Making the desalination load flexible leads to a significant shift in the economics of water treatment. By minimizing the required battery capacity, the capital expenditure and maintenance cost (including hardware replacement) of the PV-EDR system are reduced. Reduction in daily operation time also lowers the cost of operation. In this section, we derive the impact of shifting from constant to flexible operation on the levelized cost of water (LCOW) in the concrete case of a rural village in India (Chelluru, near Hyderabad). We compare this result to the cost and feasibility of implementing conventional commercial on-grid RO for groundwater desalination in the same context, and we explain the high potential of this technology to improve clean water access in remote areas.

The levelized cost of water (LCOW, in $/m³) measures the full cost of building and operating a system over its lifetime scaled by the total water production. As shown in Bhojwani, et al., "Technology review and data analysis for cost assessment of water treatment systems," 651 Science of the Total Environment 2749-2761 (2019), the LCOW (or unit product cost of water) can combine capital and operating expenditures in a single indicator measuring their respective ability to treat and render usable water. Looking at LCOW is particularly useful for investigating the cost-optimal system design for a given technology and application. It also facilitates comparison across technologies, such as RO and ED, that have different balances between capital expense (capex) and operating expense (opex). The performance metric that we ultimately chose to benchmark the benefits of the flexible operation of PV-EDR systems is the lowest LWOC possibly achieved by a system designed to meet the daily water demand of a representative target community. We verified, a posteriori, that the resulting system capital cost is within an acceptable range for practical implementation.

The test location we considered is the village of Chelluru, India. We justified, above, that India has the natural resources that make solar-powered groundwater desalination a particularly promising solution for solving the urgent water crisis in the country. The specific location of Chelluru is representative of villages where this solution can be implemented. Its population of 2,000 people places it in the median village population range of 2000-5000 people, and the feedwater salinity (1350 mg/L) is within brackish water salinity levels. With an average direct normal irradiance of 4.84 kWh/m²/day, the solar conditions in Chelluru are less favorable, but close to the Indian average (5.4 kWh/m²/day). Chelluru also allows a true side-by-side comparison with existing technologies; an on-grid RO system has been operated in the village by Tata Projects Ltd. for 10 years, and a state-of-the-art PV-EDR system in constant operation was tested there in 2018 by W. He, et al., "Field Demonstration of a Cost-Optimized Solar Powered Electrodialysis Reversal Desalination System," 476 Desalination 114217 (15 Feb. 2020).

A parametric model for predicting the LCOW achieved by a given PV-EDR system was created. The parametric model combines an economic model of capital, operational, and maintenance costs incurred by the water-system operator with an assessment of the long-term reliable water production of the system. This model reflects the framework established by S. Bhojwani, et al., "Technology review and data analysis for cost assessment of water treatment systems," 651 Science of the Total Environment 2749-2761 (2019), where depreciation is taken as the system lifetime without salvage value:

$$LCOW = \frac{C_{capital} + C_{maintenance}}{V_{day}T_{life}} + c_{operational}, \quad (13)$$

where $C_{capital}$ [US$] is the system capital cost, $C_{maintenance}$ [US$] is the cost of replacing components with a lower lifetime than the system lifetime $T_{life}$, $c_{operational}$ [US$/m³] is the operational cost, and $V_{day}$ [m³] is the daily volume of freshwater supplied. These costs can be broken up per component, i (e.g., solar panel). They depend on the unit cost, $VC_i$, the corresponding system design or operating variable Van (e.g., panel area) and the number of replacements required over $T_{Life}$, Ni (e.g., solar panels last more than $T_{life}$, so Ni=0) as follows:

$$C_{capital} + C_{maintenance} = \sum_i C_i(Var_i)(1 + N_i) \quad (14)$$

$$C_{operation} = \sum_j c_j(Var_j)$$

TABLE 4

Detailed cost model for PV-EDR systems-continuous design variables for the system-level optimization of the flexible PV-EDR system are marked in bold RR is the recovery ratio of the system

| Component, i | Cost, $C_i$ | Design/Operation Variable, $Var_i$ | Number of Replacements, $N_i$ |
|---|---|---|---|
| *capex and maintenance* | | | |
| solar panel | $98/m² | $A_{sol}$ [m²] | 0 |
| battery | $150/kWhr | $C_{batt}$ [kWhr] | 1 |
| water storage tank | $98/m³ of freshwater | $V_{tank}$ [m³] | 0 |
| electrode | $4,225/m² | $A_{stack}$ [m²] | 0 |
| membrane | $180/m² | $A_{stack}N_{CP}$ [m²] | 0 |
| pump | pump-dependent | $P_{pump,max}$ [W] | 1 |
| VFD | $250-360 for $P_{VFD,max}$ (1-3 horsepower) | $P_{VFD,max}$ [W] | 0 |
| power supply** | $370-$1,000 | ($V_{max}$, $I_{max}$) [V, A] | 0 |
| piping, sensing, and control | $4,350 | — | 0 |
| evaporation pond (brine management) | $1,650/m³ of brine | $\frac{V_{day}(1-RR)}{RR}$ [m³] | 0 |
| *opex* | | | |
| operator | $0.37/hr | $T_{day}$ [hr] | |
| feed water | $$0.14/m³ of feed water | $\frac{V_{day}}{RR}$ [m³] | |
| filter | $9/month | — | |
| acid for brine dosing | $0.03/m³ of brine | $\frac{V_{day}(1-rr)}{RR}$ [m³] | |

The detailed parameters of this model (Table 4, above) have been informed by cost data collected on the field in India during a PV-EDR pilot in Chelluru (May 2017) and an on-grid EDR pilot in Medchal (January 2019) in partnership with Tata Projects Ltd. The system is predicted to have a 10-year lifetime, which is a conservative estimate of the ED membranes lifetime. Moreover, this assumption facilitates a direct comparison with the LCOW estimated by Tata Projects Ltd. for their RO small-scale plant calculated over a 10-year period. The cost of brine management was not taken into account given the high uncertainty on the evaporation-pond cost estimation (Table 4) compared to other cost components of the model. However, the sensitivity of the computed LCOW with respect to brine-management cost is shown and discussed in the Summary.

Water produced by the PV-EDR system in flexible operation varies daily with the shape of the solar-power profile. A water-storage tank is used to buffer these variations at large time scales and to ensure that a minimal amount of water, $V_{day}$, can be consistently supplied to the community every day of the year. The evaluation of $V_{day}$ for a given PV-EDR system requires capturing the effects of seasonal weather dynamics on flexible PV-EDR performance and its sensitivity to various design parameters beyond fixed experimental conditions. For this purpose, we conducted full-year simulations based on the validated parametric design theory of flexible PV-EDR systems. These simulations used the following as input:

local parameters (referred to as LP, infra), such as weather, water quality, and water demand, described in Table 5, below; and a given set of design variables (referred to as DV, infra) for the PV-EDR system: the solar panel area, $A_{sol}$; the battery capacity, $C_{batt}$; the storage tank size, $V_{tank}$; the daily operation time, $T_{day}$; and the pump model;

and predicted successively for the given system:

the yearly time series of solar power generated by the solar panels, $\{P_{sol}(t)\}$, from the local parameters, ($\{GHI(t)\}$, $\{T(t)\}$, $\eta_{PV,norm}$), and the design variable, $A_{sol}$, as follows:

$$\frac{P_{sol}(t)}{A_{sol}(t)} = \eta_{PV}(t)GHI(t) \text{ with} \qquad (15)$$

$$\eta_{PV}(t) = \eta_{PV,nom} * (1 + \alpha_p T_{amb}(t) + kGHI(t) - T_{std}),$$

where $\alpha_p$ is the temperature coefficient [1/K], $T_{amb}(t)$ is the ambient temperature [° C.], k is the Ross coefficient [K m²/W], which relates irradiance to module temperature, and $T_{std}$ is the standard testing temperature;

the maximum amount of water, $V_{day,LP}(DV)$, that can be withdrawn daily from the storage tank, with 99% reliability, during a full year; above this reliability level, the cost of water is not impacted by failures in achieving the daily water production. For example, for daily capacities on the order of 10 m³, water can exceptionally be delivered by a water tank for $2.8/m³ on average, and for no more than $7/m³ (peak price of truck water reached in June 2019 in Chennai), which entails a negligible increase in LCOW (about +$0.01/m³); and the associated levelized cost of water, $LCOW_{LP}(DV)$, using the cost model previously presented.

TABLE 5

Local parameters used as input to the full-year simulation of the water production achieved by a given PV-EDR system

| Parameter | Value |
|---|---|
| Weather | |
| Global Horizontal Irradiance, GHI [W/m$^2$] | {GHI(t)}$_{2014, Chelluru}$ |
| Temperature, T [° C.] | {T(t)}$_{2014, Chelluru}$ |
| Water quality | |
| Input TDS [mg/L] | 1350 |
| Output TDS [mg/L] | 300 |
| Production requirement | |
| Daily water demand, V$_{demand}$ [m$^3$] | 6 |
| Required reliability, r$_{req}$ | 99% |
| Hardware efficiency | |
| Solar panel nominal efficiency, $\eta_{PV,nom}$ | 15% |
| Inverter efficiency, $\eta_{V\,FD}$ | 90% |
| Power supply efficiency, $\eta_{power\,supply}$ | 52% |
| Pump efficiency, $\eta_{pump}$ | pump-dependent |

In the above table, V$_{demand}$ was determined based on Chelluru's population (about 2,000 people) and on the recommended water-intake minimum per day per capita of 3 L, which amounts to a daily 6 m$^3$ supply requirement. The daily water consumption recorded in Chelluru on May 2, 2018, by He was close to 4 m$^3$, which confirms that our requirement suffices to answer daily water needs.

Figure 19:
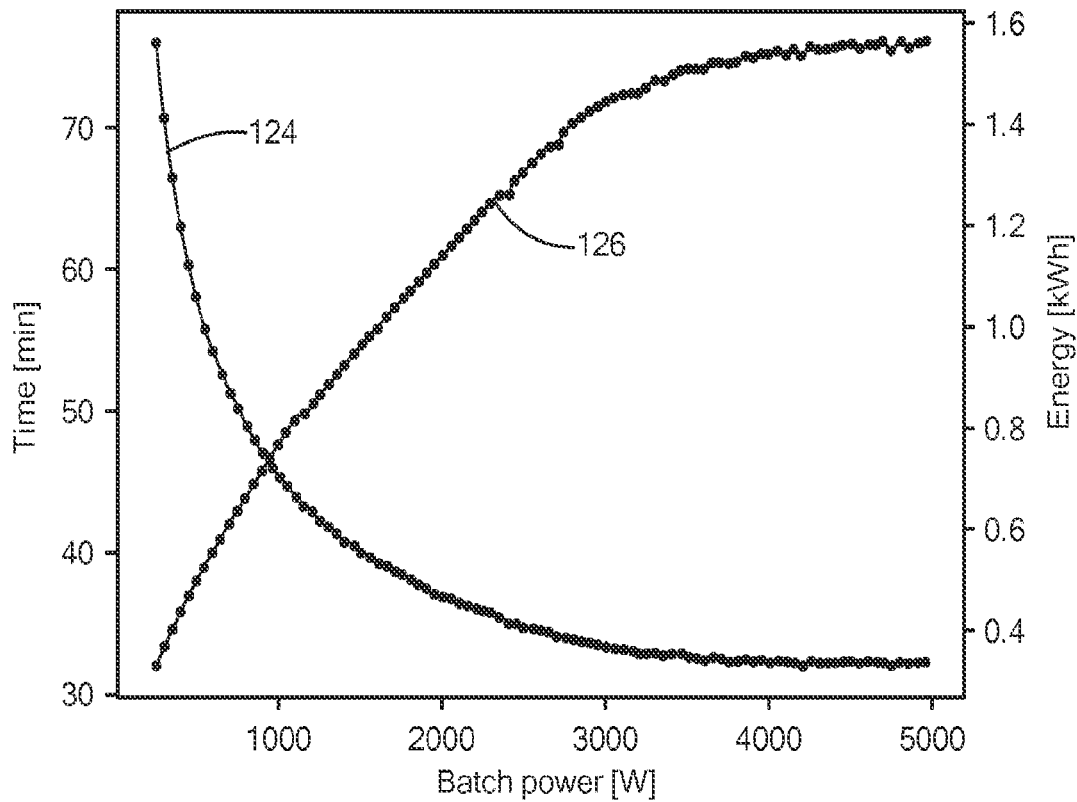
FIG. 19 is a graphical representation of the look-up table used for modeling the ED module behavior in yearly simulations. The range of powers on the x-axis corresponds to the range of solar power values for all solar panel areas, $A_{sol}$, considered while running the particle swarm optimization (PSO).

For maintaining reasonable simulation times, we used a pseudo-model, comprising a look-up table of batch-wise performance computed beforehand using the robust ordinary-differential-equations-based ED model validated by Wright 2018. The look-up table predicts the batch time [min] and energy consumption [kWh] as a function of the average power available for the ED module during the batch. This pseudo-model is validated in FIG. 19, which plots batch time 124 and batch energy consumption 126 as a function of batch power and time. Similarly to the experimental set-up, these simulations can be seamlessly run in constant or flexible operation mode.

Determining the lowest LCOW possibly achievable by a system designed to answer the daily water demand of Chelluru is a design-optimization problem, formulated with the following:

$$\min_{DV} LCOW_{LP}(DV) \quad (16)$$

subject to $V_{day,LP}(DV) \geq V_{demand}$

Because this work aims at being directly applicable for improving water access in remote locations, the only design variables are those that, in practice, can be easily varied at the design stage using off-the-shelf components, exclusively. The ED-stack parameters, A$_{stack}$ and N$_{CP}$, are held fixed and reflect the only stack sized for small-scale batch ED that is being manufactured today (Suez Water Technologies, model COM-P-000000-MQ-01). For a given solar-panel area, A$_{sol}$, the maximum solar power is derived and determines the maximum pumping flow rate, Q$_{max}$. Pumps are then selected from a discrete list of commercially available pumps compiled by D. Bian, et al., "Optimization and design of a low-cost, village-scale, photovoltaic-powered, electrodialysis reversal desalination system for rural India," 452 Desalination 265-278 (2019) (hereafter, "Bian") for achieving Q$_{max}$ with enough pressure head. For enabling operation at various flow rates, Q≤Q$_{max}$, a VFD with suitable maximum power, $$P_{V\,FD,max} = P_{pump,max} \cdot \frac{P_{pump,max}}{\eta_{pump}}$$

is added for each pump. The solar-panel area, A$_{sol}$; battery size, C$_{batt}$; storage tank volume, V$_i$ and daily operation time, T$_{day}$, are, therefore, the only independent design variables.

The particle swarm optimization (PSO) [K. James, et al., "Particle swarm optimization, Proceedings of the IEEE International Conference on Neural Networks, pages 97-102 (1995)] was selected for solving the minimization problem formalized in Equation 16. It is a heuristic approach where a population of candidate particles (here, designs) is expected to evolve in the search-space towards the least-cost configuration. Each particle's movement is influenced by both its local best-known position and the best-known position in the search-space so far. This algorithm is particularly suited for this non-convex optimization problem where both the objective function, LCOW(DV), and the feasible space have a complex, implicit dependency on the design variables, DV.

In order to quantify the improvements enabled by the fully flexible operation created herein, we benchmark it against two reference PV-EDR systems (i.e., a conventional PV-EDR system and a state-of-the-art PV-EDR system) in constant operation, as well as a conventional commercial on-grid RO system. We detail, below, how each of these systems would be designed for meeting Chelluru's daily water demand and derive the corresponding LCOW. To guarantee a fair comparison with the flexible-operation mode, both constant PV-EDR systems use the recent COM-P-000000-MQ-01 stack from Suez Water Technologies, which is the cheapest available ED stack for small-scale operation.

The design of a conventional PV-EDR system, as it would be installed in the field today, is derived using the 'rule-of-thumb' design practices described by Bian. The number of cell pairs in the EDR module is chosen so that the daily water demand can be met within the average operation time for on-grid RO systems (8 to 10 hours), without exceeding 150 (mechanical limit), and while maintaining a typical linear flow velocity of 6 cm/s. Using the commercial pumps database previously mentioned, a pump is chosen that can deliver the corresponding constant flow rate. The constant voltage is optimized to operate at maximum desalination rate (i.e., i=r$_i$ i$_{lim}$) at the end of the batch. This ED module is coupled with the solar area required to produce on average 6 m$^3$ of fresh water at the constant voltage and flow rate. Energy intermittencies are managed by adding a battery capable of backing up the system operation for two days. Using the cost model previously described, we derived that this system may produce freshwater at a LCOW of $2.99/m$^3$.

A state-of-the-art PV-EDR system reflects the improvements realized by Bian, who optimized the PV-EDR system design for lowest capital cost. The two takeaways from their optimal design theory for PV-EDR systems in constant operation can be applied for designing a cost-optimal constant system. Because of the dominant cost of membranes, a cost-optimal constant PVEDR system favors a small number of ED cell pairs, which entails a lower flow rate and longer operation, over a high-flow-rate configuration where water production and solar-power generation could be synchronized. In other words, the cost-optimal ED module for off-grid operation is generally very close to the on-grid optimal configuration. Thus, the number of cell pairs in the state-of-the-art PV-EDR system was made identical to the conventional PV-EDR system. A lower number of cell pairs could have been chosen to further reduce capital cost, but maintaining operation time below 10 hours (single work shift) prevails over capital-cost reduction. Bian also showed that there is a cost-optimal trade-off between solar-panel area and battery capacity for maintaining reliability year-round. Some of the expensive battery capacity required for buffering energy intermittencies can be traded off for over-sized, cheaper solar panels that boost production on cloudy days. The cost-optimal battery and solar panel sizes for reliably answering a 6-$m^3$ water demand given local weather and feedwater characteristics were determined. This system may produce freshwater at a LCOW of \$2.12/$m^3$. The design parameters for the conventional and state-of-the-art systems are summarized in Table 6.

The design parameters and component cost for a commercial on-grid RO system sized for a 600-LPH production flow rate in continuous mode. We calculated that these systems may produce freshwater at a LCOW of \$1.71/$m^3$.

TABLE 6

Compared design variables for the conventional, state-of-the-art and fully flexible PV-EDR systems for installation in Chelluru, India

| Design Variable | Conventional PV-EDR | State-of-the-Art PV-EDR | Fully Flexible PV-EDR |
|---|---|---|---|
| ED module | | | |
| membrane width [cm] | 22.6 | 22.6 | 22.6 |
| membrane length [cm] | 31.5 | 31.5 | 31.5 |
| cell pair number, $N_{CP}$ | 30 | 30 | 30 |
| Power and storage module | | | |
| solar panel area, $A_{sol}$ [$m^2$] | 21 | 37 | 16 |
| battery capacity, $C_{batt}$ [kWh] | 30 | 5.9 | 0.56 |
| storage tank size, $V_{tank}$ [$m^3$] | 5 | 5 | 2 |

The yearly time series of water production both for the state-of-the-art, constant PV-EDR system and for the optimized, flexible PV-EDR system evidenced the capacity of the flexible system to scale water production across the full range of solar power profiles. In contrast, the amount of energy captured by the constant system is limited on high-irradiance days by its cost-optimal battery capacity.

Therefore, despite the additional expenses required to implement flexible operation (more powerful pumps and power supply, VFDs), the capital cost of the flexible system remains lower than that of the constant system from the reductions in solar panel area and battery capacity. The \$12,600 capex value achieved is much closer to the target mentioned by Bian. The cost of operating the flexible system is also lower than in constant operation, because the water-production schedule is synchronized with solar hours and, therefore, only requires the presence of an operator during 11 hours instead of 14.5 hours in constant operation.

The flexible PV-EDR system achieves a critical milestone for off-grid water-treatment systems; our results show that the off-grid flexible EDR module is cost-competitive with on-grid RO modules currently commercialized in Indian villages. The capital cost of the off-grid flexible PV-EDR system is substantially higher than the on-grid RO module because the ED module, itself, has higher cost, the active control requires dedicated expensive hardware; and the energy cost is an upfront cost in off-grid systems. The grid electricity required for powering the RO system, however, generates an additional \$0.36/$m^3$ operational cost, comparable with the amortized cost of the optimal PV-EDR power module. This brings the LCOW for on-grid RO 3% above the LCOW of flexible off-grid ED. The environmental and societal repercussions are significant—not only can already installed on-grid RO systems be replaced by off-grid EDR modules powered by clean energy, but also these small-scale desalination plants can be made available for the first time to the 200 million people in India (and elsewhere) living in rural areas without access to reliable grid electricity. This technology, therefore, offers enormous potential for increasing access to potable water in rural India and elsewhere.

Figure 20:
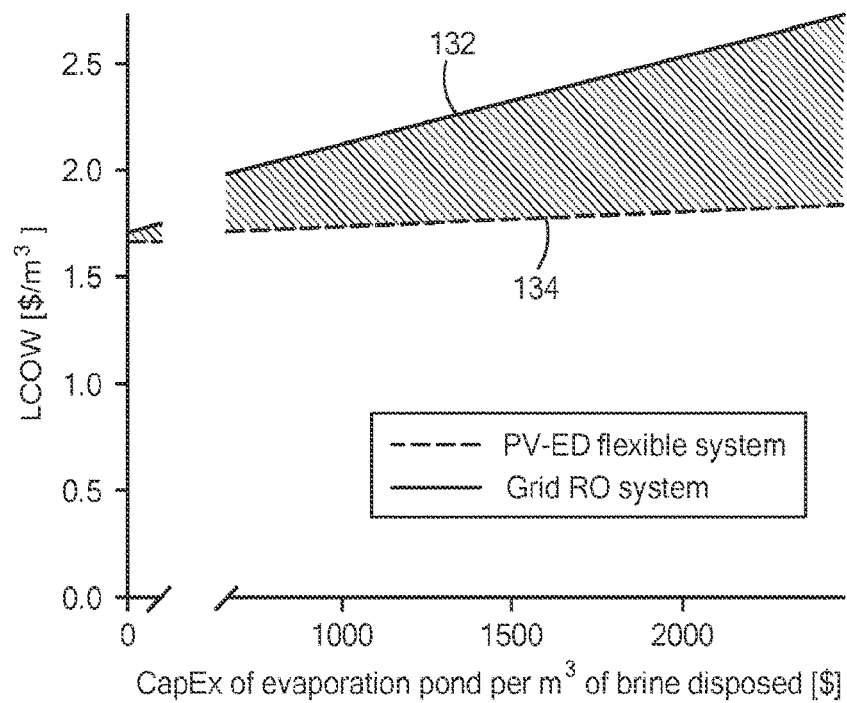
FIG. 20 is a plot showing the sensitivity of the levelized cost of water to the capital cost of evaporation ponds built to dispose of the brine volume for both the currently commercialized on-grid RO system 132 and a flexible PV-EDR system 134 described herein.

Photovoltaic electrodialysis technology may bring significant improvements for freshwater supply in remote areas in the near and far-off future. Regulations are evolving towards stricter brine-disposal policies for limiting environmental impact of inland groundwater desalination. The cost benefits of electrodialysis compared to reverse osmosis for small-scale systems are even more significant when including the capital cost of evaporation ponds installed for managing brine. PV-EDR can achieve 80% recovery and, therefore, requires evaporation ponds for 20% of the feedwater volume only, whereas village-scale RO systems reject 60% of the feedwater on average. If brine management costs are included, the LCOW of PV-EDR 134 may become up to 37% lower than the LCOW of on-grid RO systems 132 (see FIG. 20). The high recovery ratio of EDR entails that its cost is relatively insensitive to brine management and guarantees that PV-EDR will remain an affordable option, while the cost of RO is significantly impacted by brine-disposal cost.

Reductions in capital cost can also be expected as PV-EDR system production scales up. Not only does the respective capital cost of the RO and ED modules reflect two distinct desalination technologies, but they also reflect two different stages of technology development. Today, RO dominates the desalination market with 65% of the global installed capacity. RO membrane technology and capital cost have benefited from this large-scale commercialization—the membrane costs dropped by a factor of about 4 between 1975 and 1990 and by roughly another 75 percent between 1990 and 2002. If similar trends were to be observed for ED membranes and electrode materials, the capex for the PV-EDR system could be as low as \$8,600 and the LCOW could be below 1.45\$/$m^3$. The cost of sensors and controls will likely decrease as the general level of automation in industry systems increases. In parallel, the irrigation industry will increasingly design water systems capable of adapting to a time-variant renewable power by varying flow rate in real time, which, will eventually lower the cost of variable frequency drives. We can, therefore, reasonably expect an additional \$2,000 savings in capex over the next decade. This cost-efficiency would enable a PV-EDR system to produce freshwater at a water cost as low as \$1.33/$m^3$ without brine management and about \$1.45/$m^3$ with an evaporation pond for brine, which is almost 40% cheaper than what the small-scale on-grid RO module would achieve today.

Additional Discussion of Optimal Time-Variant Operation of a PV-ED System Power Consumption and Desalination Rate in the ED System Controlling the instantaneous desalination rate and power consumption involves an understanding of how they vary with controllable parameters (stack voltage V(t) and pumping flow rate Q(t)), and which physical limits apply to them. Salt removal from the diluate channels in the stack comes from ion transport through alternating cation and anion-exchange membranes and is driven by the current density in each stack segment y:

$$i_y(t) = \frac{v(t)}{R_y(t)}, \qquad (17)$$

which scales with the voltage V(t) applied to the stack, where v(t) is the specific voltage (voltage divided by area), and where R)(t) is the total resistance of the stack channels in segment, y. The flow rate, Q(t), transports water through the stack and back into the tanks and, therefore, has positive control over the desalination rate in the diluate tank. These two ion-removal mechanisms split the total power consumed by ED between the electrical power, $P_{el}(t)$ and the pumping power $P_{pump}(t)$. The scaling laws for those terms are given by Equations 18 and 19, as follows:

$$P_{el}(t) \propto V(t)^2 \qquad (18)$$

$$P_{pump}(t) \propto Q(t)^3 \qquad (19)$$

In each stack segment, y, the current density in the stack must not exceed the limiting-current density above which water splitting occurs in ion-depleted boundary layers, with a safety factor, r. In this study, we take r=70% to follow common industry practice. He shows that this condition is satisfied if the most ion-depleted diluate channels located in the last segment, Y, verify:

$$i_y(t) < r^* i_{T,lim}(t) \propto C_{dil,Y}(t) \sqrt{Q(t)} \qquad (20)$$

Because the current density, i(t), results from the applied voltage, V(t) (Eq. 17), this enforces a concentration and flow-rate-dependent upper bound for the stack voltage:

$$V(t) = V(Q(t), c_{dil,Y}(t)) \propto R_y(t) c_{dil,Y}(t) \sqrt{Q(t)} \qquad (21)$$

The available input power to the system limits the overall power consumption, which enforces a $2^{nd}$ upper bound constraint on (V(t),Q(t)).

$$P_{el}(t) + P_{pump}(t) + P_{floor} \leq P_{in}(t), \qquad (22)$$

where $P_{floor}$ is the background power consumption of the system (rinse pump, phase transformer for pumps, controls). Those two constraints imply that for a given power input, there is a unique optimal control strategy $(Q_0(t), V_0(Q_0(t), c_{dil,Y}((t)))$ that maximizes the instant desalination rate. By applying this control strategy, the power consumption of the system matches the available power input—i.e., Eq. 22 becomes:

$$P_{el}(t) + P_{pump}(t) + P_{floor} = P_{in}(t). \qquad (23)$$

Time-Variant Control of the PV-ED System

In order to maximize the desalination rate subject to an arbitrary power input $P_{in}(t)$, the ED stack voltage and water flow rate, (V(t),Q(t)), are optimally controlled considering both constraints Equations 20 and 22) and scaling relationships (Equations 17-19 and 21). This determines the unique voltage, $V_0(t)$, and flow rate, $Q_0(t)$, such that the system consumes exactly $P_{in}(t)$ with maximum desalination performance.

In practice, fully utilizing the input power is only feasible if the optimal flow rate and voltage $(Q_0(t), V_0(t))$ are within the operational limits of the pumps and the power supply. Otherwise, the fraction of input power used for desalination, expressed as follows:

$$\eta(t) = \frac{P_{el}(t) + P_{pump} + P_{floor}}{P_{in}(t)}, \qquad (24)$$

decreases compared to the 100% solar energy utilization case described in Eq 23. The practical control of voltage and flow rate incorporates those practical limits, as follows:

$$\begin{cases} Q_c(t) = \min(Q_0(t), Q_{max}) \\ V_c(t) = \min(V_0(Q_c(t), c_{dil,Y}(t)), V_{max}) \end{cases} \qquad (25)$$

By applying this control strategy to the case of a time-variant solar-power input, $P_{sol}(t)$, tracked in realtime, we are able to concomitantly maximize the desalination rate of the PV-ED system and the fraction of solar power directly used for desalination at every instant.

Simulated Performance of Time-Variant PV-ED Systems
Framework Used for Analyzing the Performance of Time-Variant PV-ED This section demonstrates the concrete benefits of time-variant operation over the conventional, constant operation of PV-ED systems implemented by Bian for a given community-scale PV-ED system. By simulating the system operation with high time resolution at increasing time scales (day, multiday, year) for both constant and time-variant operation, we derive performance metrics quantifying the energy efficiency, the water production, and the system cost at those time scales. These simulations use the robust ED model presented by Wright 2018 extended to the time-variant case and validated experimentally for various ED size scales.

The PV-ED system was sized for a freshwater demand of six cubic meters per day according to standard design rules where the ED and PV sub-systems are designed sequentially to answer a given demand and use available off-the-shelf components. Design parameters are summarized in Table 8, below. A simplified water demand profile is assumed, where the daily freshwater demand is evenly spread over ten hours. The time-variant solar power input is simulated from the irradiance and temperature five-minute time series for 2014 in Chelluru, India. At each time step, the solar panel efficiency is expressed as follows:

$$\eta_{pv}(t) = \eta_{pv,norm}[1 + \alpha(T_{amb}(t) + k \cdot GHI(t) - T_{std})], \qquad (26)$$

where $\eta_{pv,nom}$ is the nominal efficiency of the panels (15% was assumed in this analysis); a is the temperature coefficient [1/K] (−0.42% assumed in this analysis; $T_{sol}(t)$ is the ambient temperature; k is the Ross coefficient, which relates irradiance to module temperature (k=0.025 K·m²/W was used for this analysis); GHI(t) is the global horizontal irradiance; and $T_{std}$ is the standard testing temperature of 25° C. The instantaneous solar power is then given by the following:

$$P_{sol}(t) = A_{pv} \eta_{pv}(t) GHI(t), \qquad (27)$$

where $A_{pv}$ is the solar panel area.

Virtual controllers corresponding to each operation mode determined the control inputs $(V_c(t), Q_c(t))$ at each time-step (Table 7), based on the instantaneous solar availability. These inputs were used to then model evolution of the system state and concentrations in time, through the day.

TABLE 7

The two operation modes considered and their respective flow rate and voltage control method

|  | Constant operation (CVCQ) | Time-variant operation (VVVQ) |
|---|---|---|
| Voltage control | $V_c(t) = 19$ V, $\forall t$ | Optimized following (Eq. 24) |
| Flow rate control | $Q_c(t) = 25$ LPM, $\forall t$ |  |

TABLE 8

PV-ED conventional design for a freshwater demand of 6,000 L per day

| Design parameter | Value |
|---|---|
| Design requirements |  |
| Feed salinity [ppm] | 845 |
| Product salinity [ppm] | 325 |
| Daily water demand [L] | 6000 |
| ED system constant operation |  |
| Linear velocity [cm/s] | 12 |
| Flow rate [LPM] | 25 |
| Batch size [L] | 420 |
| Recovery ratio | 60% |
| ED system design |  |
| Membrane height [cm] | 168 |
| Membrane width [cm] | 19.7 |
| Number of cell pairs | 30 |
| Power system design |  |
| Energy consumption per batch [kWh] | 1.23 |
| Required average daily solar energy [kWh] | 17.75 |
| Solar panel area [m²] | 24.35 |
| Battery capacity [kWh] (for 2 days back-up) | 71 |
| Storage tank [L] (industry standard) | 5,000 |

Compared Performance of Constant and Time-Variant Operation During a Standard Daily Operation As explained above, time-variant control of the PV-ED system maximizes the fraction of direct solar energy use $\eta(t)$ at very instant $t$ by adapting the power drawn to the input power $P_{in}(t)$. Therefore, at the end of the day, the overall fraction of available solar energy directly used for desalination is also maximal.

$$\eta_{day} = \frac{E_{ED,direct}}{E_{sol}} = \frac{\int_{day} \eta_{max}(t) P_{in}(t) dt}{\int_{day} P_{in} dt}, \quad (28)$$

where $E_{ED,direct}$ is the desalination energy directly pulled from the solar panels during one day and $E_{sol}$ is the total daily solar energy available. This suggests that a time-variant system can use a larger amount of energy without intermediate storage compared to the same system in constant operation, and thus produce more water per day.

Figure 21:
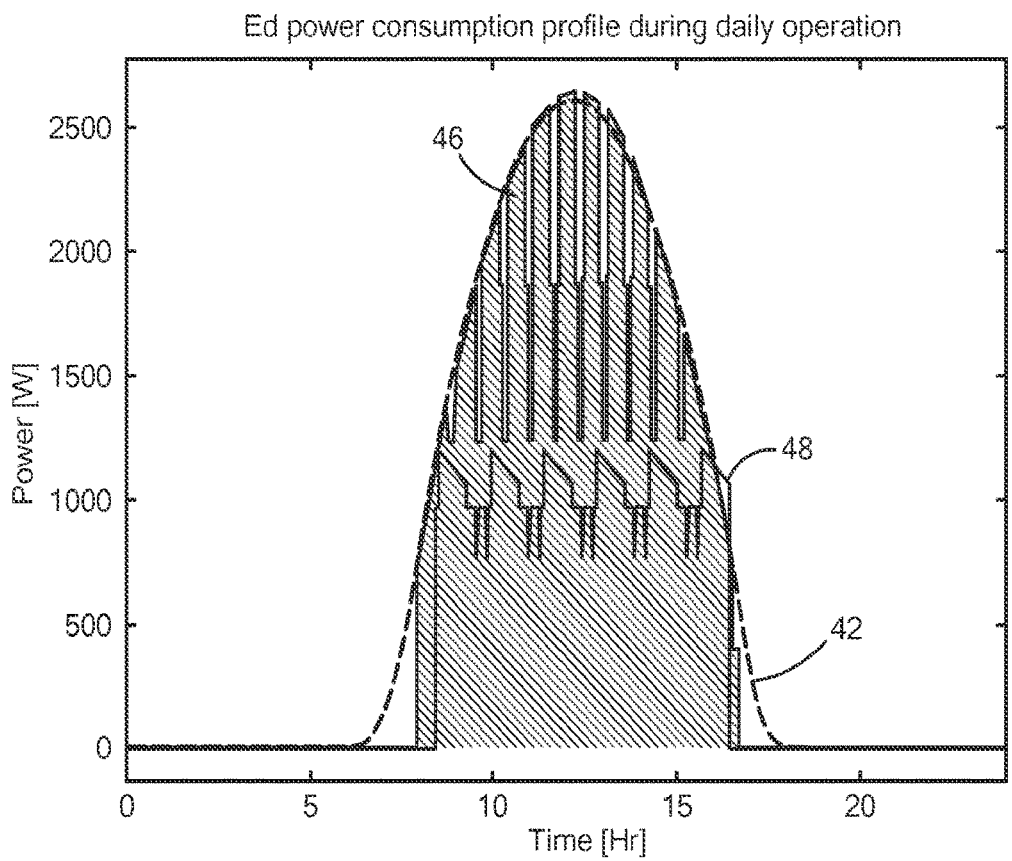
FIG. 21 is a plot of a power consumption profile of a PV-ED system under average daily irradiance conditions and without energy storage in constant and time-variant operation.

A comparative simulation of the time-variant and constant operations of the PV-ED system previously introduced was done for a one-day operation case. The objective was to quantify the total fraction of solar energy directly used, $\eta_{day}$, and the daily water production, $V_{day}$, that can be achieved without energy storage for both constant and time-variant operations. One daily solar input was selected from the yearly solar input so that the average irradiance on that day matches the yearly average solar irradiance and both operations can be compared in 'standard' weather conditions. The corresponding solar energy available from the solar array during that day is 17.4 kWh. FIG. 21 compares the energetic performance of constant 48 and time-variant 46 operations by showing the desalination power-consumption profile in each case for the daily solar-power profile 42 considered, where the fraction of solar energy used for desalination is 89.25% in the time-variant case 46 and 46.53% in the constant case 48. In constant operation 48, the desalination power profile during the batch is fixed by the constant voltage and flow rate and does not depend on the input solar power available. Instead, in time-variant operation, the desalination power matches the solar power input ($\eta_{max}(t) = 100\%$) up until a certain point when it is limited by the maximum pumping flow rate and corresponding voltage. As a result, in time-variant operation, the ED system directly captures $\eta_{day} = 89.25\%$ of the solar energy available, whereas in constant operation only 46.53% is directly used by the ED system.

Figure 22:
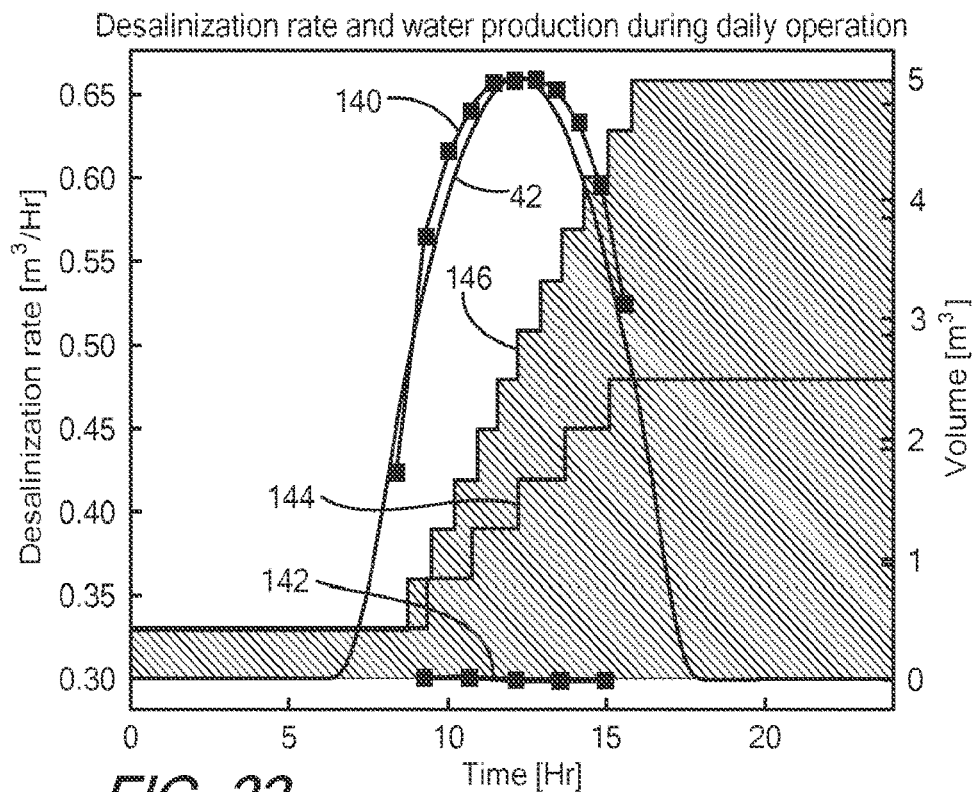
FIG. 22 is a plot of desalination rate and cumulative water production over time of a PV-ED system under average daily irradiance conditions and without energy storage, in constant and time-variant operation.

FIG. 22 compares the average desalination rate 142 and cumulative water production 144 over time in constant operation as well as and the average desalination rate 140 and cumulative water production 146 over time in time-variant operation. For a given solar power input 42, $P(t)$, the higher fraction of solar energy directly used, $\eta(t)$ compared to constant operation entails additional power available, PED(t) for desalination. Moreover, constantly operating close to limiting current density maximizes the desalination rate given the desalination power PED(t). As a result, the overall time required to desalinate the batch volume from the feed salinity to the target salinity is lower in time-variant operation, and 11 batches can be completed during daylight hours (and therefore produces 4,620 L) versus only 5 batches for constant operation (producing 2,100 L only). In particular, in time-variant operation, the desalination rate is adaptive to the solar input, which confirms the ability of time-variant operation to match the desalination load to the time-variant energy source at the daily time scale, resulting in 120% increase in daily water production.

Performance of the Time-Variant Operation Over Multiple Days and Adaptability to Seasonal Variations The flexibility of the time-variant system to accommodate solar power variations within the same day is also true at larger time scales. Using the yearly historical solar power data, the daily production of the PV-ED system in time-variant operation has been simulated for various daily solar profiles characterized by different total daily solar energy available $E_{sol}$, and power-profile shapes.

Figure 23:
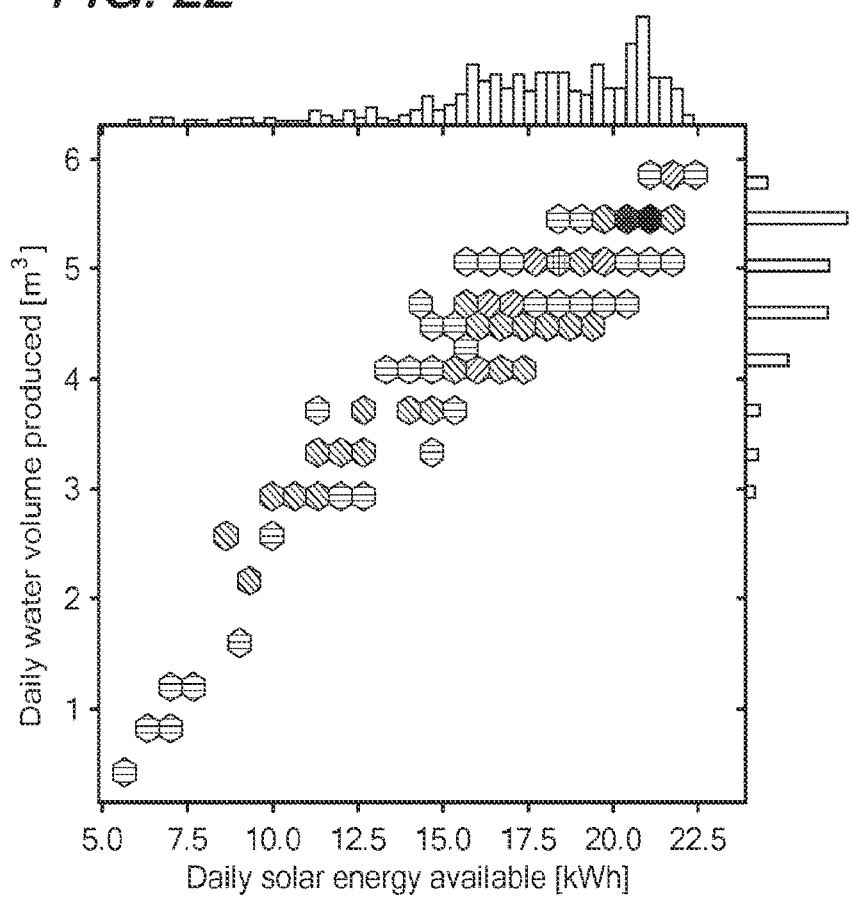
FIG. 23 plots the statistical distributions and correlation between the daily solar energy available and the volume of water produced in a time-variant operation.

FIG. 23 shows the statistical distributions of the daily solar energy available and the corresponding water volume produced by the system in time-variant operation over 364 distinct days, illustrating that the PV-ED system, in time-variant operation, provides flexibility to vary its production rate depending upon the available renewable energy source. Those distributions are strongly correlated, which shows that the benefits of time-variant operation are maintained over a wide range of solar profiles.

Figure 24:
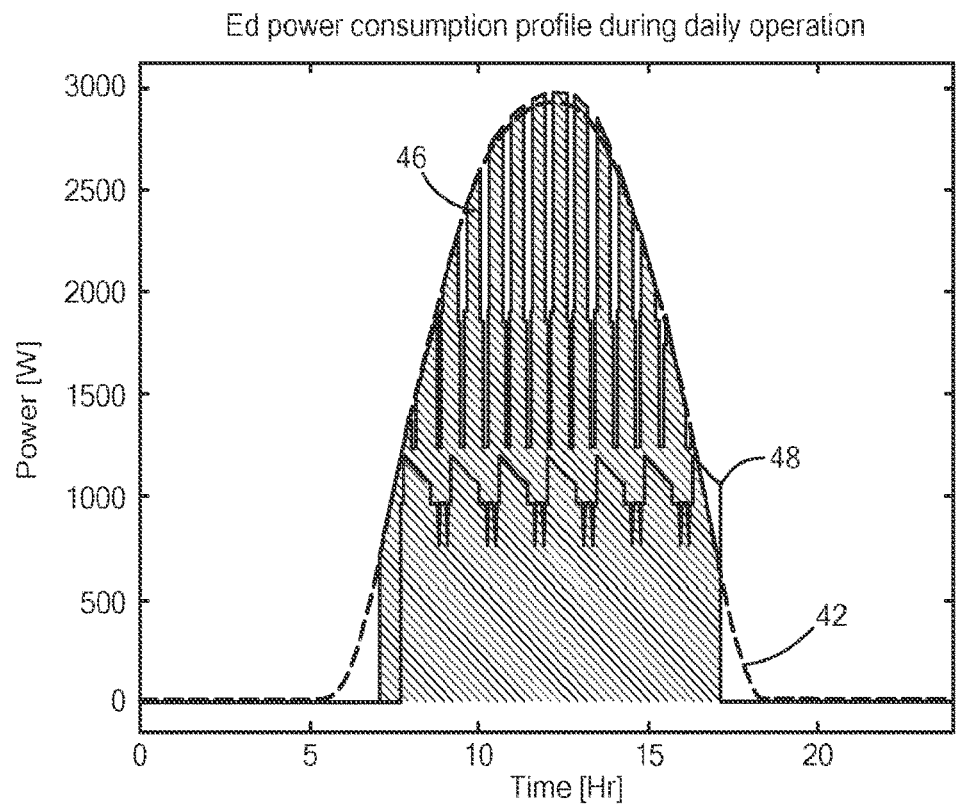
FIG. 24 is a plot of a daily desalination power profile in a high-irradiance scenario with 22.45 kWh total of daily solar energy.
Figure 25:
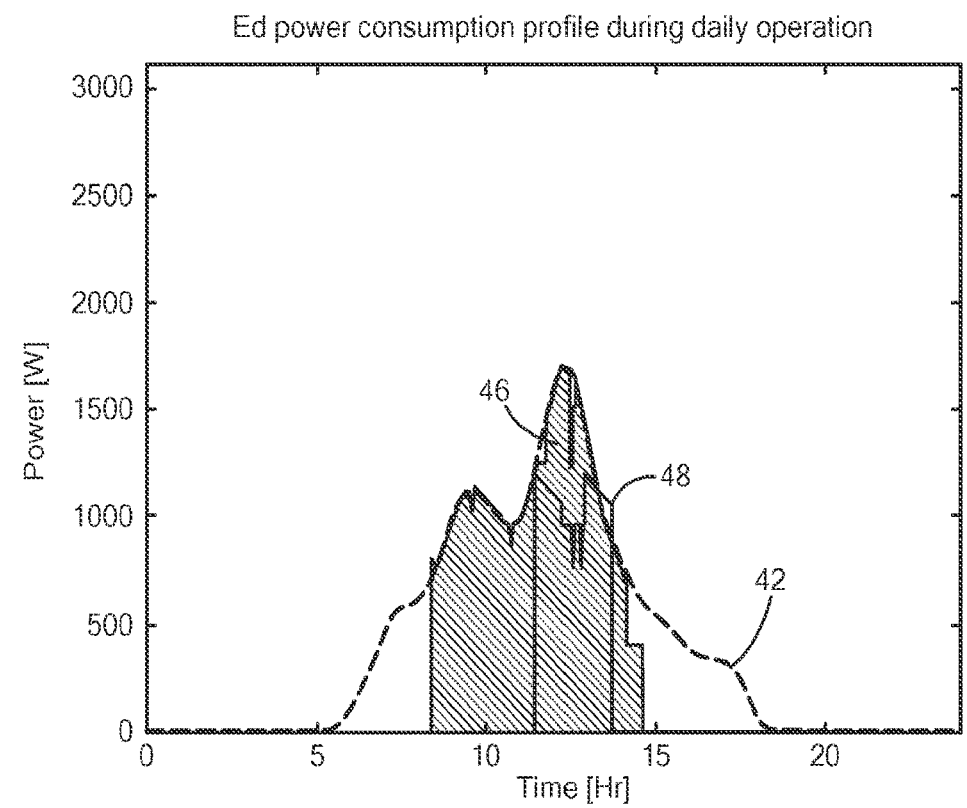
FIG. 25 is a plot of a daily desalination power profile in a low-irradiance scenario with 9.45 kWh total of daily solar energy.

In FIGS. 24 and 25, the detailed ED behavior (in time-variant/flexible operation 46 and in constant operation 48) for two extreme daily solar profiles 42 during the same year illustrates how that the PV-ED system in time-variant operation accommodates various solar-irradiance patterns by flexibly adapting the ED-power consumption. A high-irradiance scenario with 22.45 kWh total daily solar energy is shown in FIG. 24, while a low-irradiance scenario with 9.45 kWh total daily solar energy is shown in FIG. 25.

Towards Affordable Solar-Powered Desalination Volumetric Water Cost Estimation from an Average Day The high capital cost of off-grid desalination systems designed for conventional constant operation prevents large-scale adoption of such systems. Time-variant operation is expected to drastically reduce the battery capacity needed and corresponding cost by directly using a maximal portion of the solar energy for desalination. Comparing the water production for both constant and time-variant operation during a day with standard-irradiance conditions provides insight on the potential capital cost savings enabled by time-variant operation. For each operation type, battery storage may be used in order to capture some or all of the excess solar energy during the day, and power the desalination system beyond daylight hours to produce additional water, $V_{batt}$.

In the time-variant case, the remaining 11% of the solar energy can be stored in a $E_{batt, VVQ}=1.90$ kWh battery capacity. Because the time-variant system has flexible power consumption, the battery energy can be consumed by the ED system at the operating power that minimizes the specific energy consumption for desalinating water. At 1700 W, $V_{batt}=620$ L additional liters of water can be desalinated (specific energy consumption of 2.77 kWh/m$^9$), which entails $V_{tot, VVVQ}=5.2$ m$^3$, where:

$$V_{tot}=V_{day}+V_{batt}. \tag{29}$$

In the constant case, the remaining 56% of the solar energy can be stored in a battery with capacity $E_{batt, CVCQ}=10.0$ kWh. The desalination specific energy consumption in constant operation is fixed and equals 3.0 kWh/m$^3$ for the considered system. The additional volume produced is then $V_{batt}=3370$ L, which brings the total daily volume to: $V_{tot, CVCQ}=5.47$ m$^3$. In order to provide an estimation of the corresponding water cost, we consider the daily amortization $CC_{day}$ of the total system capital cost CC of a 15-year lifetime L. The volumetric cost of water, cv, can then be estimated from the following:

$$c_v = \frac{cc_{day}}{v_{tot}} = \frac{cc}{LV_{tot}}. \tag{30}$$

The total system capital cost is estimated using the methodology and India local cost data presented by Bian, with the design parameters specified in Table 8, and the battery capacity, $E_{batt}$. The cost of shifting to time-variant hardware components is estimated of $1,000, which reflects the order of magnitude of the total cost for high-speed pumps, variable power supply and variable frequency drive, but needs further refinement based on local quotes. The control logic can be run on a RASPBERRY PI computer with simple analog commands, hence the related cost increase compared to current PLC-based system automation for constant systems is negligible. The resulting water volumetric water costs are $c_{v,cvcq}=0.291$ $/m$^3$ and $c_{v,vvvq}=0.221$ $/m$^3$, which means that the time-variant operation enables a 24% capital cost reduction compared to constant operation based on the average-day simulated performance.

Yearly Reliability of the PV-ED System

Figure 26:
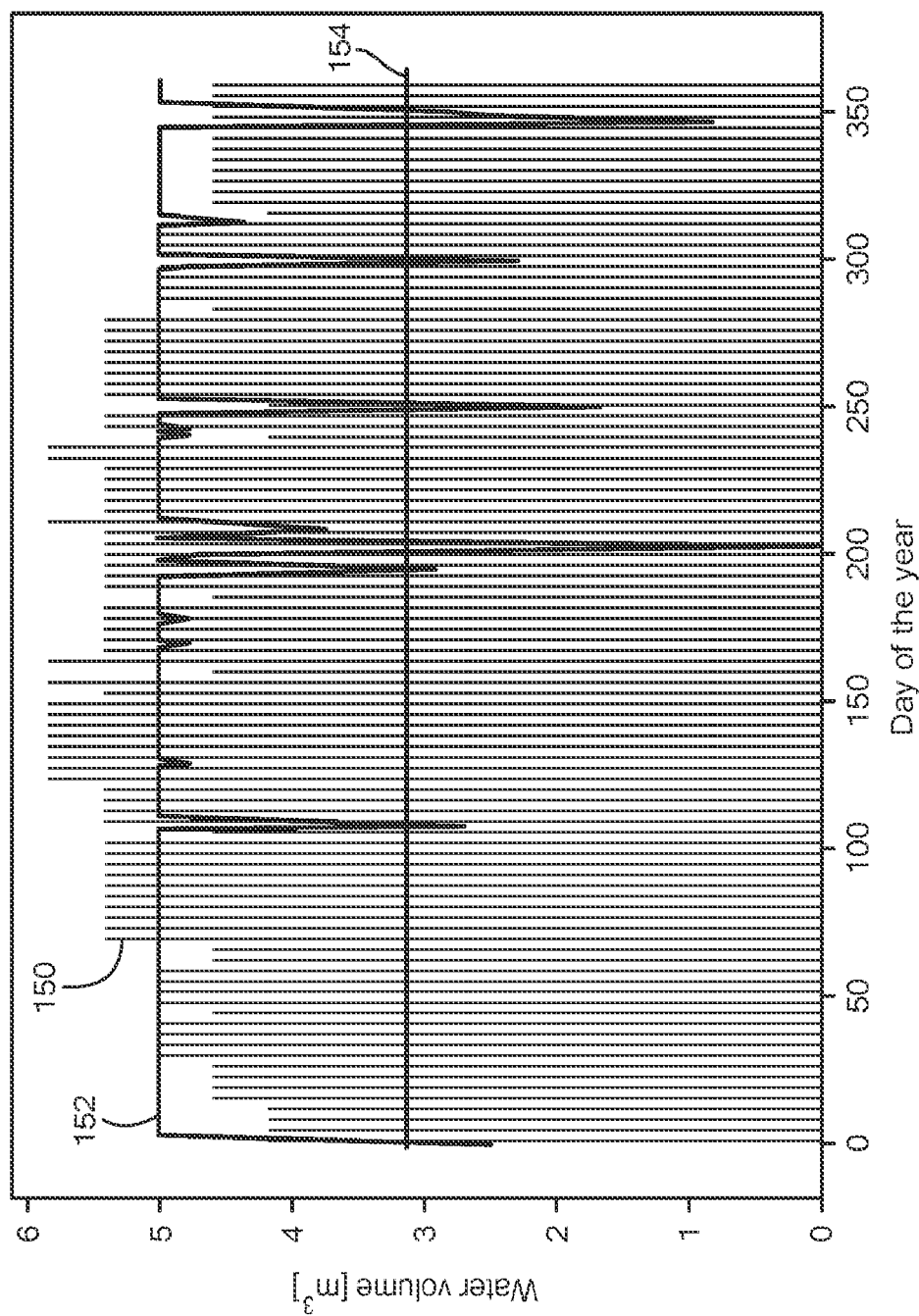
FIG. 26 is a plot illustrating the reliability, in terms of daily water production, of a flexible PV-ED system over the course of a year.

As shown above, the seasonal variability of the solar energy input results in variability of the daily volume of freshwater produced, such that the average daily performance does not suffice to predict the long-term system reliability. The freshwater storage tank (volume V tank) acts a buffer, storing the excess water produced on high-irradiance days in order to supplement the PV-ED system production on low-irradiance days. A realistic estimation of the volumetric water cost should assess the minimal daily amount of water that can be consistently drawn from the storage tank on any day—i.e., the reliable daily water production of the PV-ED system, $V_{day,r}$. For this purpose, the PV-ED system operation was simulated for one entire year for the time-variant case, using the standard storage tank size used in industry for similar-size systems, $V_{tank}=5$ m$^3$, and without battery. The reliability level of the direct-drive PVED system is: $V_{day,r}=3.13$ m$^3$<$V_{day}$)=4.62 m$^3$, which confirms that the yearly reliability constraint significantly restricts the system performance (32%). FIG. 26 shows the state of fill 152 of the storage tank given a daily water demand at the reliability level 154 and the yearly water production 150 (by day) of the PV-ED system.

Improvements in Power Utilization

Described above is a time-variant operation of solar-powered electrodialysis water desalination system, including an innovative way to design and control the system by adapting the amount of power used throughout the day. In turn, time-variant operation increases solar-power utilization. To this end, the effectiveness of a new theory that formulates how to change flow rate and voltage was demonstrated along with the capacity for maximizing water conversion.

In the early stage of this development, the control system directly coupled the power available from the photovoltaic panel and the actuators (power supply and pump). In this configuration, the maximum power used is what is available from the photovoltaic panel, as shown in FIG. 6. This strategy proved to increase power utilization from 38 to 72%. This increment in the power utilization yielded a drop of the levelized cost of water (LCOW) by 22%.

The control system, described above, decouples power generation and consumption using an energy buffer (e.g., a battery) that increases the plant's overall efficiency by operating the system around the most-efficient operating point for the available input energy (see FIGS. 13 and 14). By decoupling the energy consumed and what available from the solar system, LCOW was cut by another 22% while maintaining a comparable level of power utilization. These improvements were obtained using a single data-driven algorithm that was trained through simulation data for a given system and location. Thanks to the experience gained through examples, the algorithm sets its control action using only simple data—e.g., the time of the year and the weather in the past hour.

Figure 27:
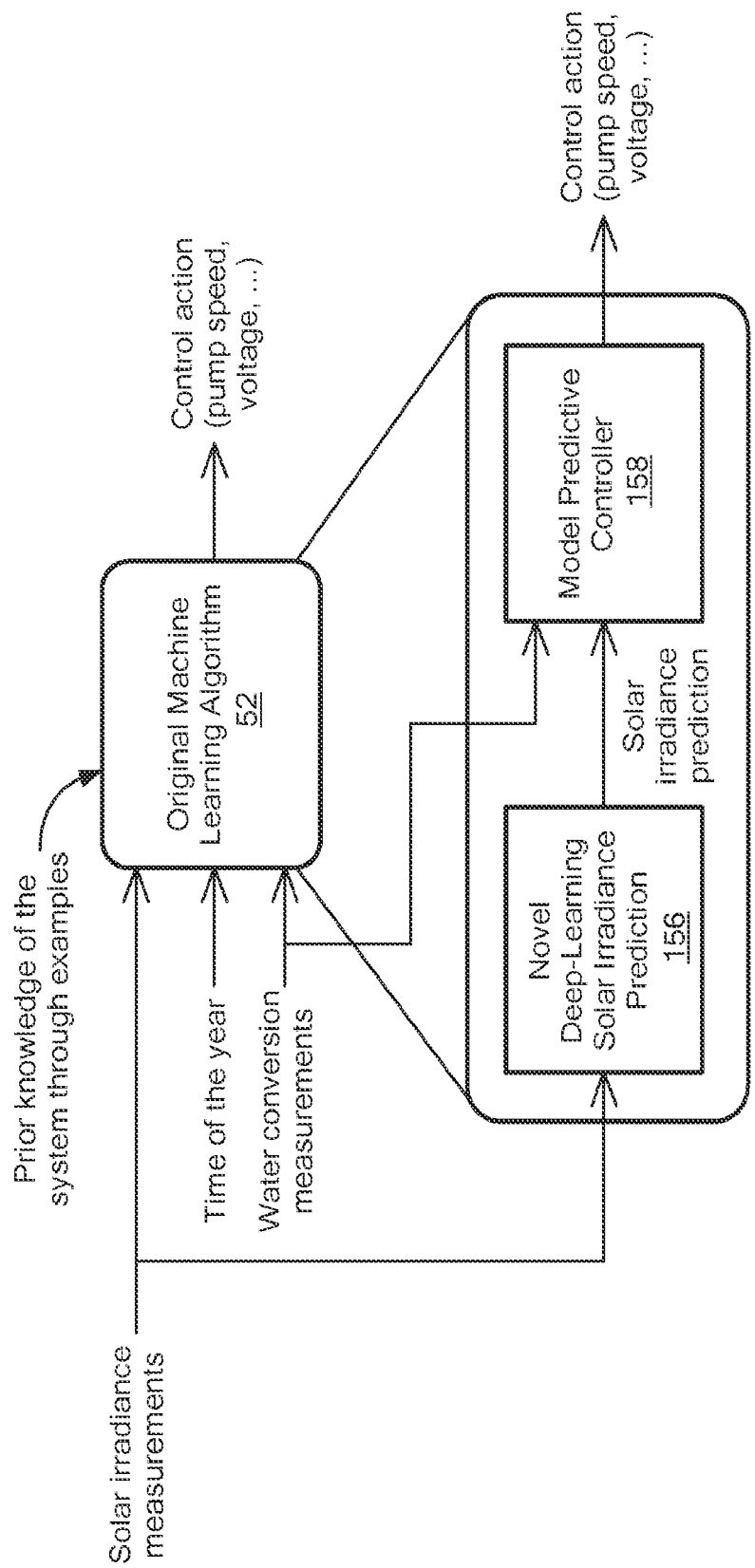
FIG. 27 shows (at top) the original machine-learning (ML) controller with its input and output signals and (at bottom) an alternative control architecture, in which the solar irradiance prediction algorithm and the controller have been separated.
Figure 28:
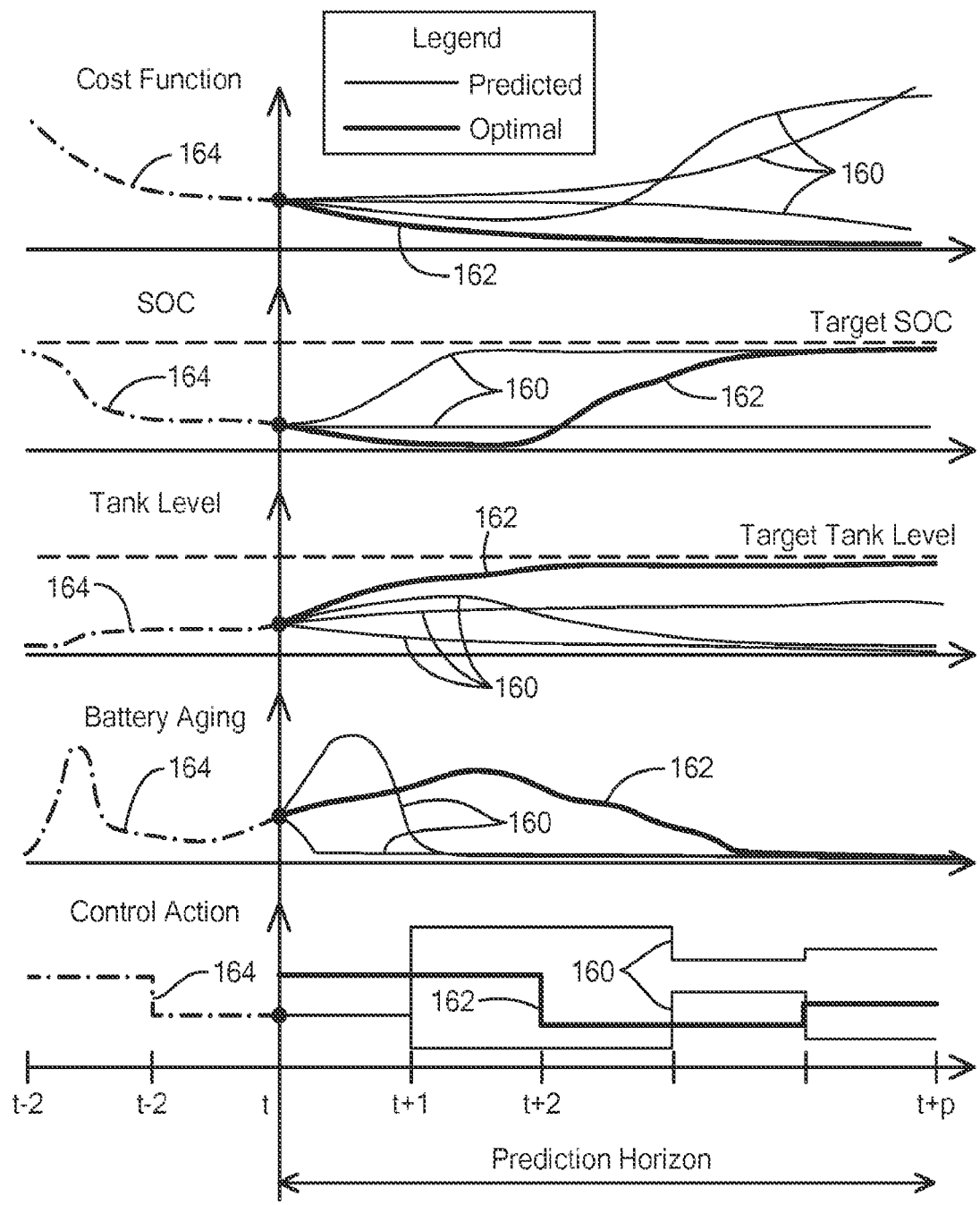
FIG. 28 provides an overview, showing how a model predictive controller (MPC) works. At each time step, the control action (bottom plot—accounting for the stack power and the battery charge and discharge) is numerically obtained such that the predicted system response is optimized with respect to a cost function (top plot). Here, the cost function is a linear combination of the battery aging, and the mismatch between the SOC and the tank level with respect to their target value. The sequence of future control actions that provides the minimum cost function is executed. The entire process is iterated at every time step.

In this section, we exploit the use of a different control architecture to enhance design flexibility and improve system performance. To this end, we have replaced the machine learning controller 52 of the previous design into two submodules 156 and 158 (FIG. 27). First, a deep-learning algorithm 156 predicts the solar power in the future for a known prediction horizon (e.g., 24 hours). Second, a model predictive controller (MPC) 158 optimizes the system response by predicting the system response in the future (FIG. 28). Both predicted responses 160 and optimal responses 162 are included, along with preceding data 164, for each plot (top-to-bottom: cost function, state of charge, diluate tank level, battery aging, and control action) in FIG. 28.

The former submodule is location dependent, but it is not changed for any modification of the system. The goal is to accurately predict solar irradiance only for the prediction horizon. Instead, the latter algorithm depends only on the system design and desired optimization, regardless of the plant location. It leverages prior knowledge using mathematical models of the system dynamics and the solar irradiance prediction from the other submodule to optimize the system response.

The new control architecture has proved several improvements. The system design has been significantly simplified. The algorithm training phase is performed only when a plant is designed for a new location, cutting design time significantly. These improvements cut the optimal plant design significantly. The algorithm can be formally verified, whereas previous development could only be validated statistically. More specifically, it's possible to evaluate whether constraints are satisfied and if the cost function is indeed minimized. It is also easier to verify which submodule of the system is underperforming and take actions to improve it. Furthermore, it is easier to update or perform code maintenance. Variations of the constraints or of the objective function can be updated on the fly. Accuracy of the solar irradiance forecast can be improved when advancements in the field are available.

Furthermore, thanks to the control paradigm we have described, prior knowledge of the system behavior is better used than in previous prototypes. Indeed, preliminary results demonstrate that the proposed control architecture further reduces LCOW by 28% with respect to the controller 52. However, reliability is maximized, meaning that the controller accommodates weather changes to meet the water conversion target for the day.

An overview of how MPC works is shown in FIG. 28. At each time step, the control action (bottom plot—accounting for the stack power and the battery charge and discharge) is numerically obtained such that the predicted system response 160 is optimized with respect to a cost function (top plot). In this exemplary approach, the cost function is a linear combination of the battery aging, and the mismatch between the SOC and the tank level with respect to their target value. The sequence of future control actions that provides the minimum cost function is executed. The entire process is iterated at every time step. An optimal response 162 is also plotted.

Further Details on the Controller Behavior

Figure 29:
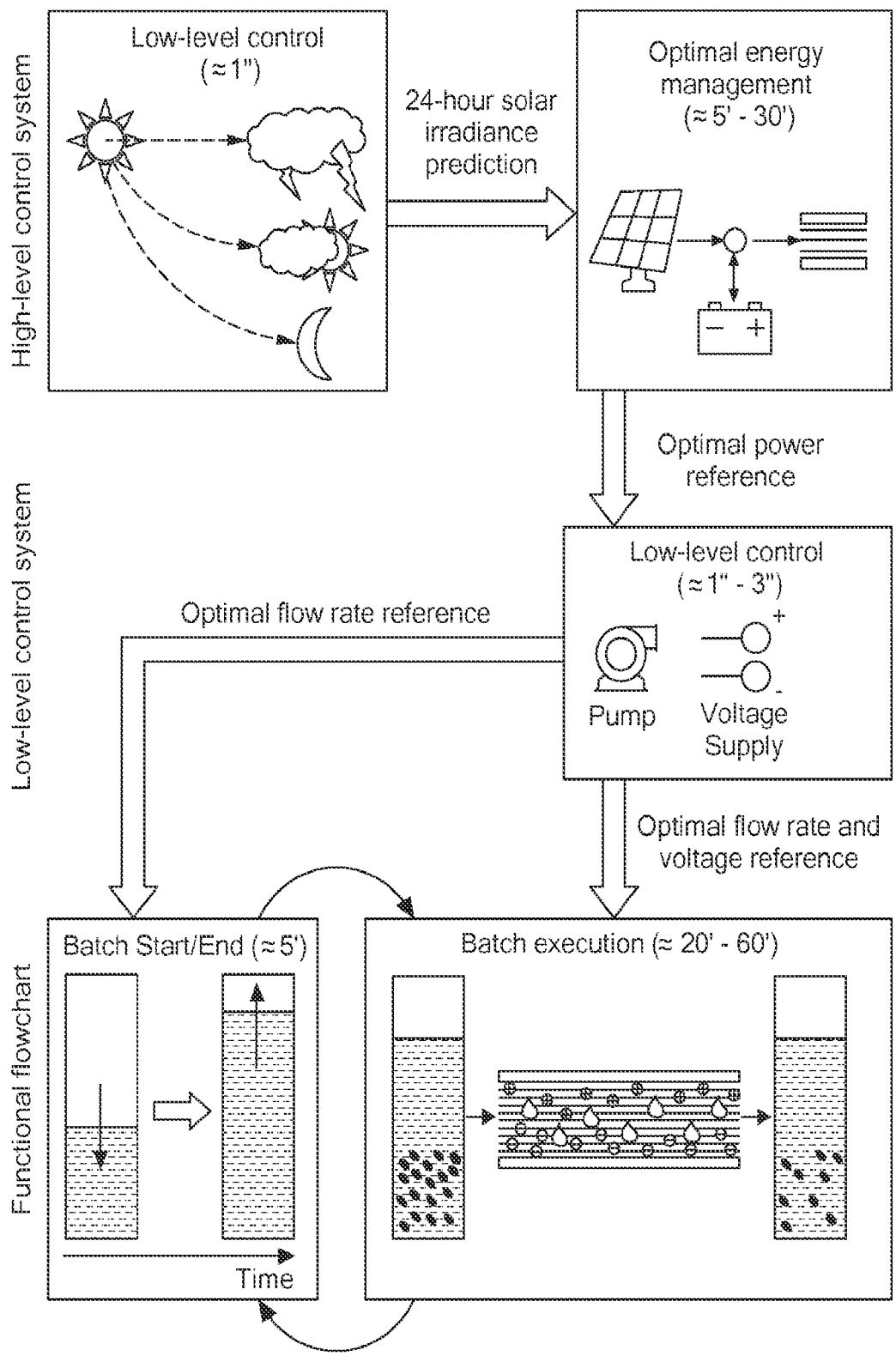
FIG. 29 shows a controller architecture layout. At a higher level, a deep-learning weather forecast predicts the solar irradiance in the future hours (execution time in the scale of 1 second), whereas the MPC is in charge of the optimal energy management. Meanwhile, the lower control layer constitutes actuator control algorithms. At the bottom is a desalination system that switches between water production in batches and the tanks emptying and filling process.

In this section we will comment on how the control architecture functions in real time. More specifically, the entire controller is structured in two layers (FIG. 29). At the higher level 165 of control, there is the solar-irradiance prediction using machine learning and the model predictive controller (MPC) 158. In this higher level 165 of control, a deep-learning weather forecast predicts the solar irradiance in the future hours (where the execution time is in the scale of 1 second), whereas the MPC is in charge of the optimal energy management (where the execution time is every 30 minutes).

Figure 30:
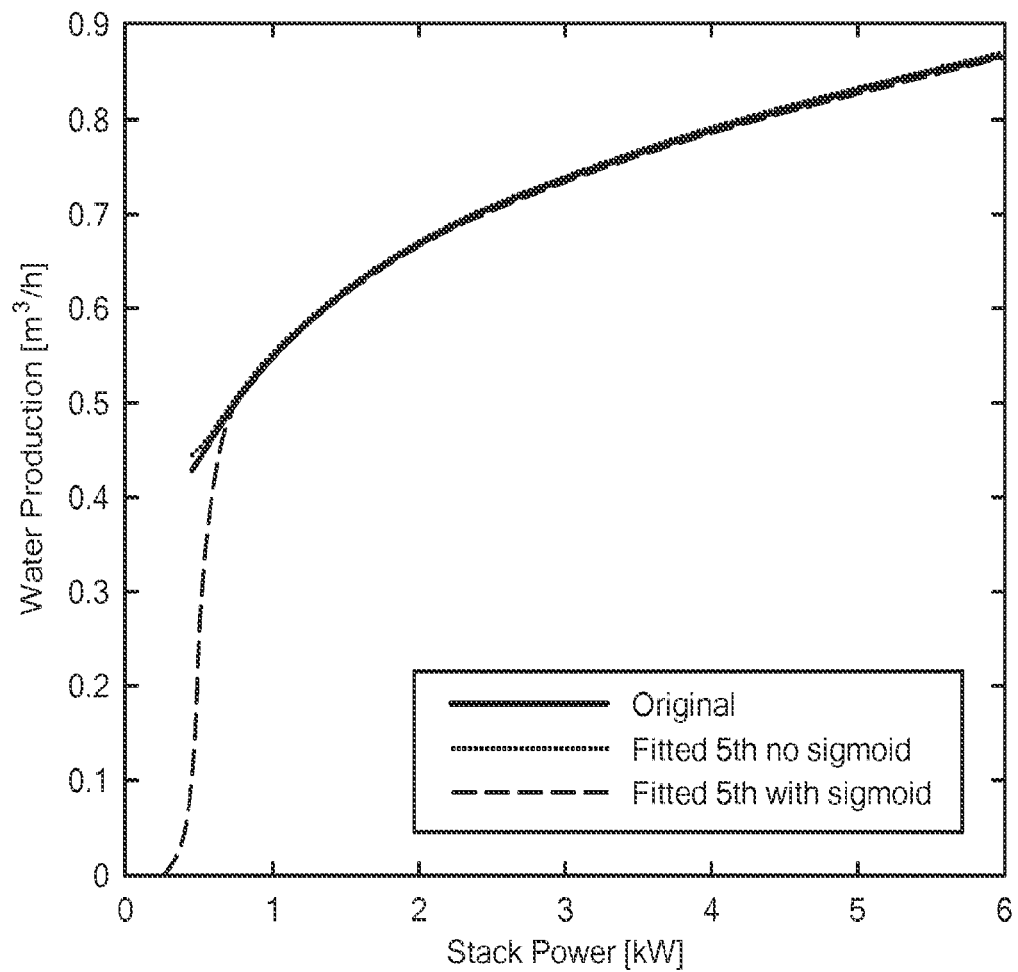
FIG. 30 is a plot of a nonlinear function that maps the power available for the stack onto the amount of water produced. This function is central for the MPC to plan the water production for the 24 hours ahead.

This higher layer 165 optimizes the system performance by balancing the amount of energy to be used now or stored for use sometime in the future. The necessity for this tradeoff is threefold. First, as further discussed later in this section, water is produced less efficiently when more power is used, as the specific energy consumption increases nonlinearly with power (FIG. 30). Second, batteries age the more they are used, as their lifetime is a function of the number of charges and discharges. Third, the battery and diluate tank act as energy and mass buffers; due to their limited size, the controller needs to balance their use in order to never reach their limits (i.e., totally full or empty).

At a lower level 167 of control (as seen in FIG. 29), the actuation controller takes the power reference set by the upper control layer and—based on that power reference—decides the pump speed and voltage applied to the stack. The lower control layer 167 constitutes actuator control algorithms, where execution time is shorter than a second. This layer 167 is in charge of maximizing the water production for the power available to use. It's worth noting that this second layer 167 of control, also called the actuation control layer, is executed instantaneously—voltage and flow rate are updated every 1 second and 3 seconds, respectively. This layer has been improved from that described above by accounting for the initial power overshooting. In the original work, the set point for the actuators was found by solving a system of equations based on the power available and the estimated limiting current density of the stack via the conductivity measurements of the stack. In the version described in this section, we have also included the estimation of the stack resistance, limiting the spike at the batch startup.

At the bottom level 169 is the desalination system, which switches between water production in batches and emptying and filling the diluate and brine tanks.

High-Level Control System

At each time instant (currently, every 30 seconds), the MPC controller solves an optimization problem in which we try to maximize the battery state of charge (SOC in FIGS. 31 and 32) and the amount of water in the product tank (tank level), while minimizing the power in and out from the battery (battery charge and discharge), knowing the dynamics and the physical limits of the system. The success of this optimization is based on a nonlinear function that relates the power used by the stack and the water desalinated (FIG. 30), intrinsically describing how efficient the system would operate if requested to operate for a specific power. Specifically, the nonlinear function maps the power available for the stack onto the amount of water produced in FIG. 30. The controller numerically finds the optimal sequence of control actions (i.e., what the algorithm can control—power threshold for the stack, battery charge, and battery discharge power) for a 24-hour horizon by predicting the response of the system. This operation is repeated at every time instant, and then the controller is updated with a set of measurements from the system, ensuring generation of a reliable prediction.

Figure 31:
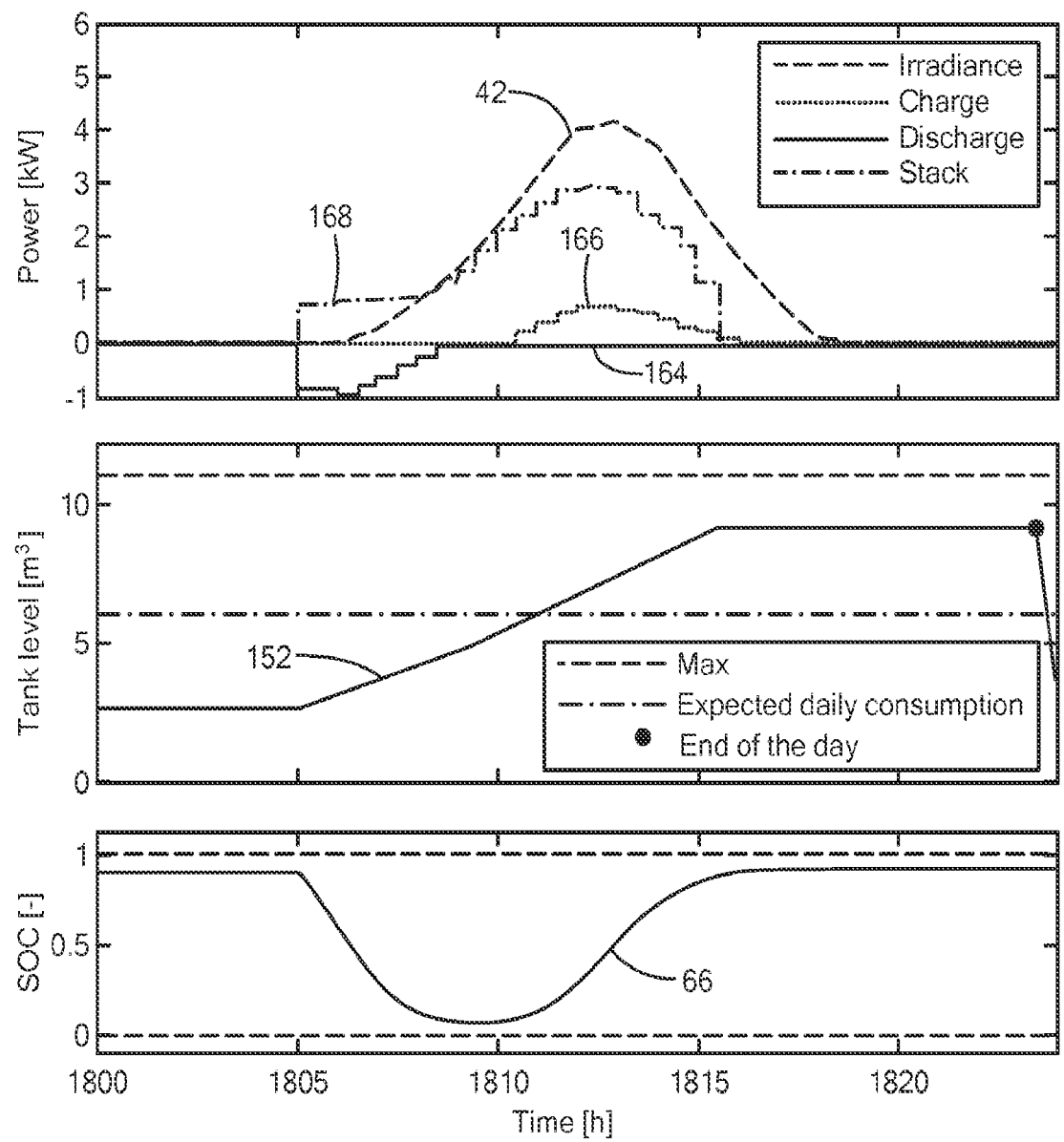
FIGS. 31 and 32 provide a performance comparison during a high- and low-irradiance day, respectively.
Figure 32:
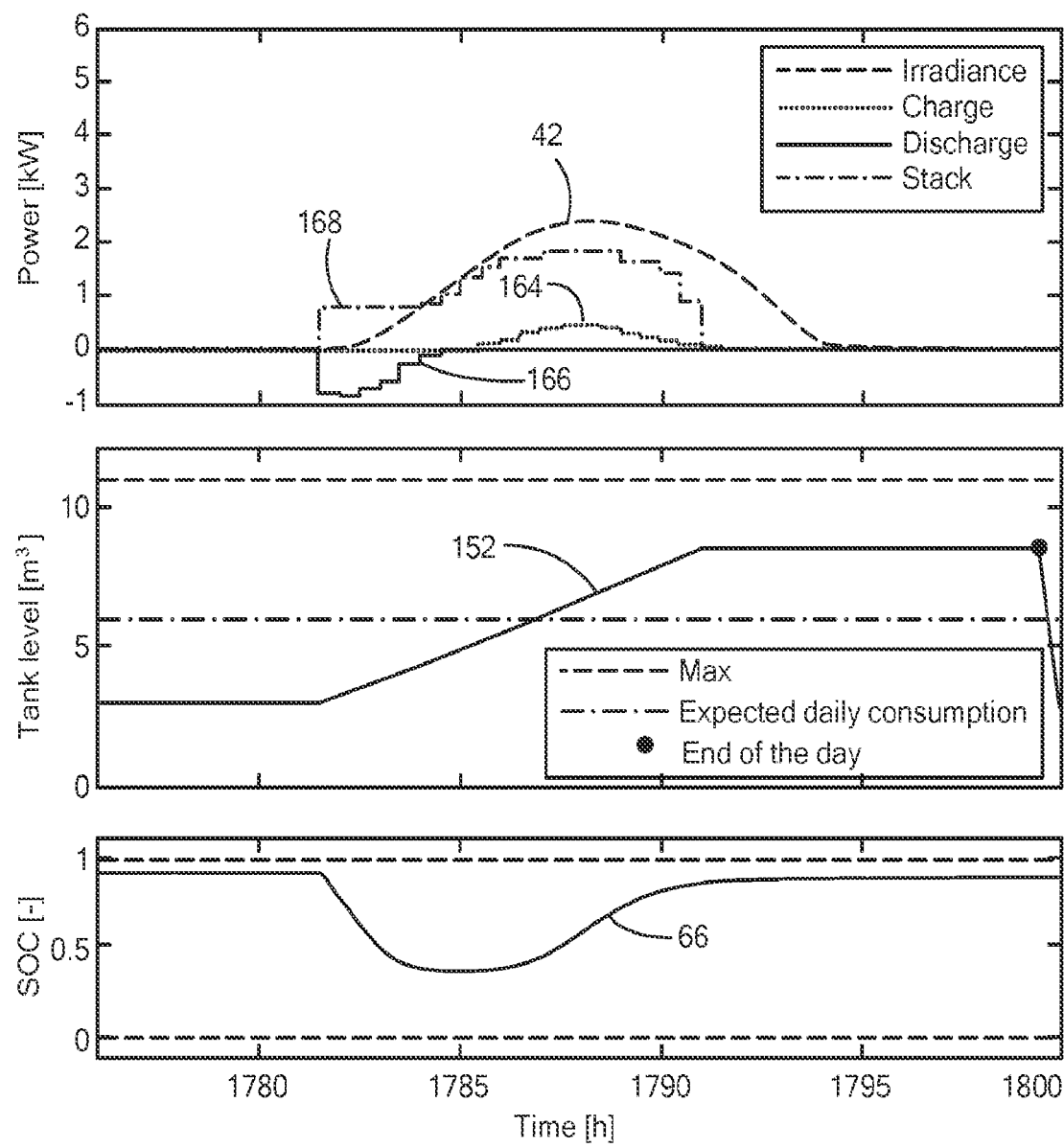

An example of how the high-level control system works is illustrated in FIGS. 31 and 32, in which the performance of the controller is analyzed for a high-irradiance day (FIG. 31) and a low-irradiance day (FIG. 32). In the two cases, the controller keeps the system powered off until the solar irradiance 42 will recharge 164 the battery before it is entirely depleted. Therefore, the system is powered on only at 5 am to prevent discharging 166 the battery fully before there is enough solar irradiance to operate the system. The stack starts producing water with the predetermined system minimum power, which is also a very efficient operating point. When more solar power is available than the most efficient operating point, the controller increases the stack power 168 in order to raise water production. Increasing the stack power 168 would force the system to operate less efficiently, but the product tank would be filled quickly. Moreover, the system could achieve a higher desalination rate, forecasting sufficient solar irradiance to recharge the battery and fill the product tank without discharging the battery before the end of the day. In fact, starting from 10:30 am, the solar power unused for desalination is stored in the battery, increasing the likelihood of being able to meet the water-production target even for low-irradiance days. The system is automatically turned off when there is enough water in the product tank and the battery has been recharged almost completely. The level 152 of the product tank and the state of charge 66 of the battery are also plotted as a function of time for each case in FIGS. 31 and 32.

It is interesting to point out that the controller automatically adjusts the stack and battery power based on the solar irradiance. Comparing the two case studies in FIGS. 31 and 32, on a low-irradiance day (FIG. 32), the controller operates the stack at lower power 168, producing water more efficiently and leaving enough power to recharge 164 the battery, which was also discharged 166 less than during the high-irradiance counterpart (FIG. 31). These decisions are automatically performed by the controller based on the forecasted solar irradiance and the pursued objective.

Low-Level Control System and Power Overshoot

The work described in earlier sections describes a method to maximize the available power for water desalination and describes how to set the pump speed and voltage applied to the stack by means of a set of equations that are solved online. By leveraging an electrochemical model of the electrodialysis system, one can obtain the maximum voltage and current to be applied and the maximum pump power.

The methodology, described here, adds an improved estimate of the current necessary to reduce the initial power demand that (1) exceeds the power available (in case no batteries are used), or (2) increases the battery stress, which leads to rapid battery aging, which previously occurred at the start of each batch. To this end, the electrical resistance of the stack is estimated, and adjustments are made, based on the flow-rate change, to improve the power overshoot and eliminate the need for batteries.

In fact, the earlier-described work used to evidence power overshoots at every batch startup, as the solution to the system of equations provided a reference power to the electrodes, Pet, that, when combined with the pumping power, $P_{pump}$, was larger than either the solar power available or the solar-power threshold set. To avoid overshoots, the sum of the pumping power and the power to the electrode must be equal to $P_{sol}$ or $P_{stack}$, either the solar power available or the allocated available stack power.

It was determined that this overshoot came from a poor estimate of the current, which is used to calculate the power to the electrodes ($P_{el}$=V*I). The current was originally estimated using previous conductivity measurements to determine the current and adjusted for the change in flow rate between time steps. This approach was improved by calculating the previous resistance of the stack, and the resistance was proven to not change between individual time steps. This improvement increases robustness against current measurements that are unreliable at the beginning of each batch. Combined with an initial guess of the current at startup obtained from an electrochemical model that accounts for the resistances of the membranes, spacers, and bulk fluids, the magnitude of the overshoots is decreased quite significantly.

Also, to diminish the effects of overshoots, the pump controller is updated less frequently (e.g., every 3 seconds), as the hydraulic time constant is larger than the electrochemical one. Thus, the applied voltage is updated every second, ensuring a prompt response of the system to this side effect.

Figure 33:
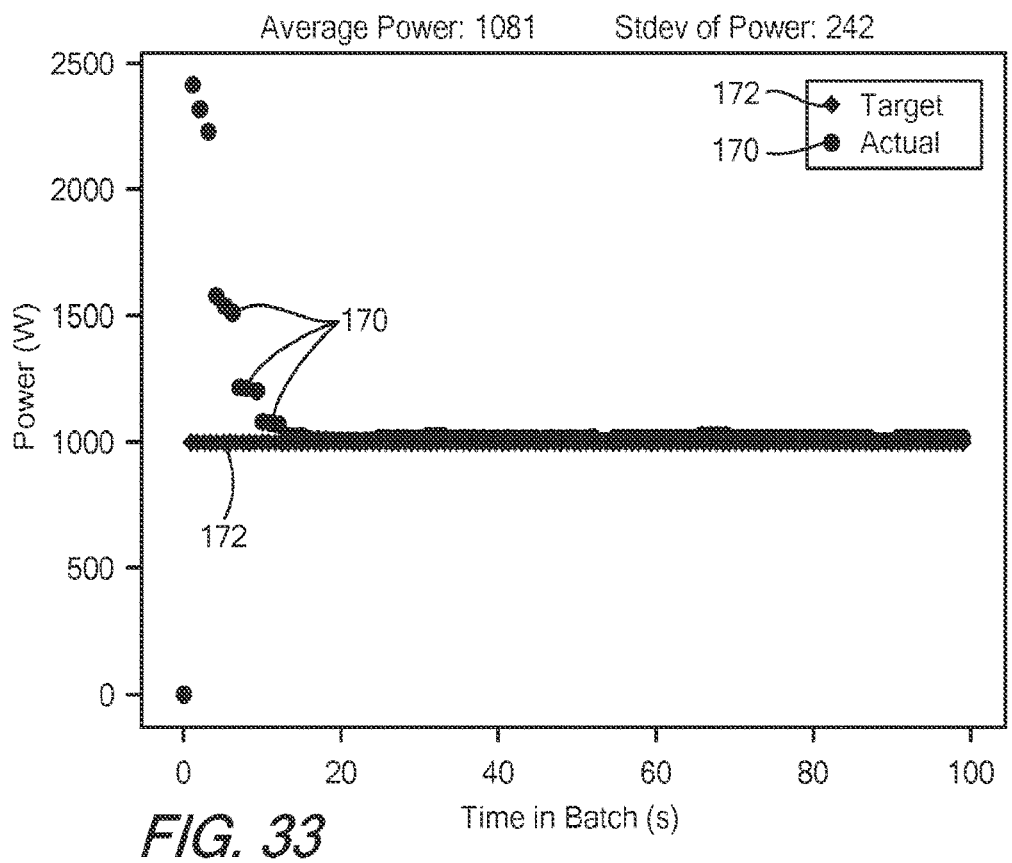
FIGS. 33 and 34 show a power overshoot (FIG. 33) and its improvement (FIG. 34) as a result of estimating the resistance of the stack.
Figure 34:
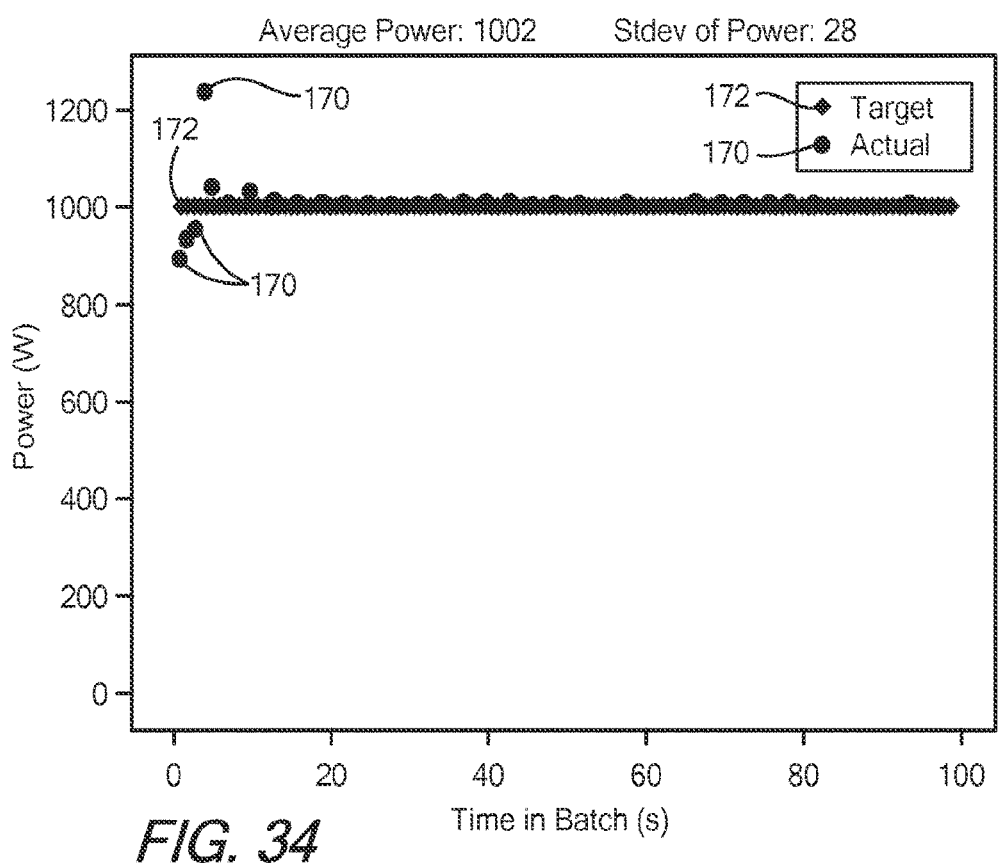

As shown in FIG. 33 (showing a power overshoot) and 37 (showing improvement with the above approach), which include both target power 170 and actual power 172, the peak of the overshoot drops by almost 50% with the above approach compared with what was obtained with the original controller, described earlier. This reduction constitutes a significant improvement for the successful implementation of the low-level controller on a real system.

A variable-powered electrochemical desalination system includes a power module configured to generate electrical power based on variable inputs. The system also includes an electrochemical desalination module, comprising first and second electrodes, selectively permeable ion-exchange membranes that define diluate and concentrate channels for liquid flow between the membranes and between the membranes and the electrodes, and at least one pump configured to drive flow of a feed liquid through the channels. The system further includes a control system configured to control flow rates of the feed liquid through the channels and to control distribution of electrical power from the power module to generate and apply a control voltage to at least one of the electrodes to generate an electrical charge in response to variations in power or an absence of power generated by the power module or to achieve optimized production of product water from the diluate channels.

While the invention is described through the above-described exemplary embodiments, modifications to, and variations of, the illustrated embodiments may be made without departing from the inventive concepts disclosed herein. For example, although specific parameter values, such as cycle times, may be recited in relation to disclosed embodiments, within the scope of the invention, the values of all parameters may vary over wide ranges to suit different applications. Unless otherwise indicated in context, or would be understood by one of ordinary skill in the art, terms such as "about" mean within ±20%.

As used herein, including in the claims, the term "and/or," used in connection with a list of items, means one or more of the items in the list, i.e., at least one of the items in the list, but not necessarily all the items in the list. As used herein, including in the claims, the term "or," used in connection with a list of items, means one or more of the items in the list, i.e., at least one of the items in the list, but not necessarily all the items in the list. "Or" does not mean "exclusive or."

As used herein, including in the claims, an element described as being configured to perform an operation "or" another operation is met by an element that is configured to perform only one of the two operations. That is, the element need not be configured to operate in one mode in which the element performs one of the operations, and in another mode in which the element performs the other operation. The element may, however, but need not, be configured to perform more than one of the operations.

Although aspects of embodiments may be described with reference to flowcharts and/or block diagrams, functions, operations, decisions, etc. of all or a portion of each block, or a combination of blocks, may be combined, separated into separate operations or performed in other orders. References to a "module," "operation," "step" and similar terms are for convenience and not intended to limit their implementation. All or a portion of each block, module, operation, step or combination thereof may be implemented as computer program instructions (such as software or a non-transitory computer-readable medium encoded with instructions that, when executed by a processor, establish processes for performing a computer-implemented method), hardware (such as combinatorial logic, Application Specific Integrated Circuits (ASICs), Field-Programmable Gate Arrays (FPGAs), processor or other hardware), firmware or combinations thereof.

The predictor 3614, first controller 3500, second controller 3600, etc. or portions thereof may be implemented by one or more suitable processors executing, or controlled by, instructions stored in a memory. Each processor may be a general-purpose processor, such as a central processing unit (CPU), a graphic processing unit (GPU), digital signal processor (DSP), a special purpose processor, etc., as appropriate, or combination thereof.

The memory may be random access memory (RAM), read-only memory (ROM), non-volatile memory (NVM), non-volatile random access memory (NVRAM), flash memory or any other memory, or combination thereof, suitable for storing control software or other instructions and data. Instructions defining the functions of the present invention may be delivered to a processor in many forms, including, but not limited to, information permanently stored on tangible non-transitory non-writable storage media (e.g., read-only memory devices within a computer, such as ROM, or devices readable by a computer I/O attachment, such as CD-ROM or DVD disks), information alterably stored on tangible non-transitory writable storage media (e.g., floppy disks, removable flash memory and hard drives) or information conveyed to a computer through a communication medium, including wired or wireless computer networks. Moreover, while embodiments may be described in connection with various illustrative data structures, database schemas and the like, systems may be embodied using a variety of data structures, schemas, etc.

Disclosed aspects, or portions thereof, may be combined in ways not listed herein and/or not explicitly claimed. In addition, embodiments disclosed herein may be suitably practiced, absent any element that is not specifically disclosed herein. Accordingly, the invention should not be viewed as being limited to the disclosed embodiments.

As used herein, including in the claims, numerical terms, such as "first," "second" and "third," are used to distinguish respective processes 3504-3508 and respective portions 3618-3622 of power from one another and are not intended to indicate any particular order or total number of processes or portions in any particular embodiment. Thus, for example, a given embodiment may include only a second process and a third process or second and third portions. Furthermore, use of these numerical terms do not necessarily indicate a maximum number of processes or portions in any given embodiment. Thus, although only first, second and third portions 3618-3622 of power are described as being allocated by the second controller 3600, additional portions may be allocated by the controller 3600.

What is claimed is:

1. A control system comprising:
   an input port configured to receive time-varying electric power;
   a plurality of output ports, each output port configured to supply electric power to a respective associated process of a plurality of processes;
   a first controller configured to automatically allocate, in real time, at least a portion of the time-varying electric power received at the input port between respective output ports of the plurality of output ports, based on respective characteristics of the plurality of processes, so as to maximize instantaneous aggregate production by the plurality of processes;
   a predictor configured to automatically predict future availability of the time-varying electric power;
   an electric energy storage unit; and
   a second controller configured to automatically allocate, in real time: (a) a first portion of the time-varying electric power received at the input port to the electric energy storage unit, (b) a second portion of the time-varying electric power received at the input port to the first controller for allocation to the plurality of processes and (c) a third portion of power from the electric energy storage unit to the first controller for allocation to the plurality of processes, wherein the second controller is configured to allocate the first, second and third portions based on the predicted future availability of the time-varying electric power and a function.

2. A control system according to claim 1, wherein:
   a first process of the plurality of processes comprises an electrochemical desalination process; and
   a second process of the plurality of processes comprises a pumping process configured to pump a fluid within the first process.

3. A control system according to claim 1, wherein production by at least one process of the plurality of processes is non-linear, with respect to power input into the process.

4. A control system according to claim 1, wherein the second controller comprises a model predictive controller.

5. A control system according to claim 1, wherein the second controller comprises an optimal controller.

6. A control system according to claim 1, wherein the second controller is configured to allocate the first, second and third portions so as to minimize the function.

7. A control system according to claim 6, wherein the function is configured to represent a cost of failing to meet a predetermined aggregate production goal by the plurality of processes.

8. A control system according to claim 1, wherein the function is a cost function.

9. A control system according to claim 1, wherein the function is an objective function.

10. A control system according to claim 1, wherein the second controller is configured to allocate the first, second and third portions so as to meet a predetermined aggregate production goal by the plurality of processes.

11. A control system according to claim 1, wherein the second controller is configured to allocate the first, second and third portions so as to meet a predetermined aggregate production goal by the plurality of processes currently and in the future.

12. A control system according to claim 1, wherein the function is configured to represent a likelihood of meeting a predetermined aggregate production goal by the plurality of processes.

13. A control system according to claim 12, wherein the second controller is configured to allocate the first, second and third portions so as to maximize the likelihood of meeting the predetermined aggregate production goal.

14. A control system according to claim 12, wherein the second controller is configured to allocate the first, second and third portions so as to maximize the likelihood of meeting the predetermined aggregate production goal currently and in the future.

15. A control system according to claim 1, wherein the second controller is configured to allocate the first, second and third portions so as to maximize the function.

16. A control system according to claim 15, wherein the function is configured to represent reliability of at least one process of the plurality of processes.

17. A control system according to claim 1, wherein the predictor comprises a data-driven algorithm.

18. A control system according to claim 1, wherein the predictor comprises a model of solar irradiance variance over a day.

19. A control system according to claim 1, wherein the predictor comprises a model of solar irradiance variance over a year.

20. A control system according to claim 1, wherein the predictor comprises a weather forecast that includes predicted cloud cover information.

21. A control system according to claim 1, wherein the predictor is configured to receive weather forecasts via a radio link.

22. A control system according to claim 1, wherein the predictor is configured to receive weather forecasts via a computer network link.

23. A control system according to claim 1, wherein the predictor is configured to automatically predict the future availability of the time-varying electric power at least in part based on current weather.

24. A control system according to claim 1, wherein the electric energy storage unit comprises a battery.

25. A control system according to claim 1, wherein the electric energy storage unit comprises a capacitor.

26. A control system according to claim 1, wherein the electric energy storage unit comprises a mechanical energy storage unit configured to convert between electrical and mechanical energy.

27. A control system according to claim 1, wherein:
a first process of the plurality of processes comprises an electrochemical desalination process; and
a second process of the plurality of processes comprises a pumping process configured to pump a fluid within the first process.

28. A control system according to claim 27, wherein a third process of the plurality of processes is configured to fill a tank with irrigation water.

29. A control system according to claim 1, wherein production by at least one process of the plurality of processes is non-linear, with respect to power input into the process.

30. A control system according to claim 1, further comprising:
a product storage unit coupled to at least one process of the plurality of processes and configured to store, for future use, a product produced by the process; and
wherein:
the second controller is configured to allocate the first, second and third portions based at least in part on capacity of the product storage unit.

31. A control system according to claim 1, further comprising:
a product storage unit coupled to at least one process of the plurality of processes and configured to store, for future use, a product produced by the process; and
wherein:
the second controller is configured to allocate the first, second and third portions based at least in part on an amount of product currently stored in the product storage unit.

32. A control system according to claim 1, further comprising a data-driven control algorithm configured to automatically adjust parameters, according to which the second controller allocates the first, second and third portions.

33. A control system according to claim 1, further comprising a data-driven control algorithm configured to automatically adjust parameters, according to which the first controller allocates the second and third portions between the respective output ports.

34. A control system comprising:
an input port configured to receive time-varying electric power;
a plurality of output ports, each output port configured to supply electric power to a respective associated process of a plurality of processes; and
a first controller configured to automatically allocate, in real time, at least a portion of the time-varying electric power received at the input port between respective output ports of the plurality of output ports, based on respective characteristics of the plurality of processes, so as to maximize instantaneous aggregate production by the plurality of processes;
wherein
a first process of the plurality of processes comprises an electrochemical desalination process;
a second process of the plurality of processes comprises a pumping process configured to pump a fluid within the first process; and
the first controller comprises a feedforward controller configured to solve a system of equations at an interval:

$$\begin{cases} i(V) = r_i i_{lim}(Q), \\ P_{el}(V) + P_{pump}(Q) = P_{sol}(t) \end{cases},$$

where:
V is a voltage applied to a stack in the electrochemical desalination process;
O is a flow rate of water through the stack in the pumping process;
i is local current density in the stack;
$i_{lim}$ is limiting current density of the stack;
$r_i$ is a predetermined fraction less than 1;
$P_{pump}$ is pumping power of the pumping process;
$P_{el}$ is electric power utilized by the stack; and
$P_{sol}(t)$ is instant available power available from the time-varying electric power.

35. A control system according to claim 34, wherein the first controller is configured to calculate $P_{el}$ according to $P_{el}=VI$, using a previous resistance of the stack, where I is total current drawn by the stack.

36. A non-transitory computer-readable medium encoded with instructions that, when executed by a processor, establish processes for performing a computer-implemented method, the processes comprising:
a process configured to receive time-varying electric power at an input port;
a process configured to output power at a plurality of output ports, each output port configured to supply electric power to a respective associated process of a plurality of processes;
a process configured to automatically allocate, in real time, at least a portion of the time-varying electric power received at the input port between respective output ports of the plurality of output ports, based on respective characteristics of the plurality of processes, so as to maximize instantaneous aggregate production by the plurality of processes;
a process configured to automatically predict future availability of the time-varying electric power;
a process configured to send and receive electric power to and from an electric energy storage unit; and
a process configured to automatically allocate, in real time: (a) a first portion of the time-varying electric power received at the input port to the electric energy storage unit, (b) a second portion of the time-varying electric power received at the input port to a first controller for allocation to the plurality of processes and (c) a third portion of power from the electric energy storage unit to the first controller for allocation to the plurality of processes, wherein the second controller is configured to allocate the first, second and third portions based on the predicted future availability of the time-varying electric power and a function.

37. A control system comprising:
an input port configured to receive time-varying electric power;
a predictor configured to automatically predict future availability of the time-varying electric power;
a plurality of output ports, each output port configured to supply electric power to a respective associated process of a plurality of processes;
an electric energy storage unit;
a second controller configured to automatically allocate, in real time: (a) a first portion of the time-varying electric power received at the input port to the electric energy storage unit, (b) a second portion of the time-varying electric power received at the input port to the plurality of processes and (c) a third portion of power from the electric energy storage unit to the plurality of processes, wherein the second controller is configured to allocate the first, second and third portions based on the predicted future availability of the time-varying electric power and a function; and
a first controller configured to automatically allocate, in real time, the second and third portions between respective output ports of the plurality of output ports, based on respective characteristics of the plurality of processes, so as to maximize instantaneous aggregate production by the plurality of processes.

38. A method for sizing components of a system that comprises a plurality of components that perform a plurality of processes and are controlled by a controller according to a plurality of operational parameters, where various sized components have respective associated costs, the method comprising:
for each combination of component sizes and operational parameters, of a plurality of combinations of component sizes and operational parameters, automatically modeling operation of the system over a time period, including:
modeling an input port configured to receive time-varying electric power; modeling a predictor configured to automatically predict future availability of the time-varying electric power;
modeling a plurality of output ports, each output port configured to supply electric power to a respective associated process of a plurality of processes;
modeling an electric energy storage unit;
modeling a second controller configured to automatically allocate, in real time: (a) a first portion of the time-varying electric power received at the input port to the electric energy storage unit, (b) a second portion of the time-varying electric power received at the input port to the plurality of processes and (c) a third portion of power from the electric energy storage unit to the plurality of processes, wherein the second controller is configured to allocate the first, second and third portions based on the predicted future availability of the time-varying electric power and a function;
modeling a first controller configured to automatically allocate, in real time, the second and third portions between respective output ports of the plurality of output ports, based on respective characteristics of the plurality of processes, so as to maximize instantaneous aggregate production by the plurality of processes; and
modeling production by the plurality of processes; and
selecting a combination of component sizes and operational parameters, of the plurality of combinations of component sizes and operational parameters, in which the modeled production by the plurality of processes meets a predetermined criterion, and cost of the modeled components is minimized.

\* \* \* \* \*